US011329532B2

United States Patent
Bastian, II et al.

(10) Patent No.: US 11,329,532 B2
(45) Date of Patent: May 10, 2022

(54) HIGH TORQUE ECCENTRIC ELECTRIC MOTOR

(71) Applicant: Bastian Solutions, LLC, Indianapolis, IN (US)

(72) Inventors: William A. Bastian, II, Carmel, IN (US); Paul D. Burgeson, Brownsburg, IN (US); Gabriel Michael Riggs, Boise, ID (US)

(73) Assignee: Bastian Solutions, LLC, Indianapolis, IN (US)

( * ) Notice: Subject to any disclaimer, the term of this patent is extended or adjusted under 35 U.S.C. 154(b) by 453 days.

(21) Appl. No.: 16/249,154

(22) Filed: Jan. 16, 2019

(65) Prior Publication Data

US 2019/0222096 A1 Jul. 18, 2019

Related U.S. Application Data

(60) Provisional application No. 62/617,746, filed on Jan. 16, 2018.

(51) Int. Cl.
*H02K 7/12* (2006.01)
*H02K 26/00* (2006.01)
(Continued)

(52) U.S. Cl.
CPC .......... *H02K 11/0141* (2020.08); *H02K 1/27* (2013.01); *H02K 7/12* (2013.01); *H02K 26/00* (2013.01);
(Continued)

(58) Field of Classification Search
CPC ...... H02K 1/27; H02K 2201/03; H02K 26/00; H02K 41/06; H02K 7/12; H02K 11/01; H02K 11/0141
(Continued)

(56) References Cited

U.S. PATENT DOCUMENTS 3,770,997 A * 11/1973 Presley ................. H02K 41/06
                                                  310/82
3,894,255 A *  7/1975 Newton, Jr. ........... H02K 41/06
                                                  310/80
(Continued)

FOREIGN PATENT DOCUMENTS

CN       103490555 A      1/2014
JP       H10336996 A     12/1998
(Continued)

OTHER PUBLICATIONS

Translation of foreign document CN 103490555 A (Year: 2014).*
(Continued)

*Primary Examiner* — Alex W Mok
(74) *Attorney, Agent, or Firm* — Woodard, Emhardt, Henry, Reeves & Wagner, LLP

(57) ABSTRACT

A drive system for a high torque mechanical load includes a power supply, a controller, and a high torque electric motor. The electric motor includes a rotor that is oriented eccentrically relative to a stator. In one form, the electric motor has a crankshaft that transmit the torque to the mechanical load. In other variations, the electric motor includes at least two electric motor lobes with opposite stroke positions to provide a smoother output at higher speeds. During operation, the rotor is magnetically attracted to the energized electromagnet. With the rotor attracted to the electromagnet in the stator, the rotor contacts or comes in close proximity to the stator at a contact area. The close proximity between the rotor and stator at the contact area allows very large magnetic forces to be utilized to produce torque without increasing the size or weight of the electric motor.

22 Claims, 37 Drawing Sheets

(51) Int. Cl.
*H02K 11/01* (2016.01)
*H02K 1/27* (2022.01)
*H02K 41/06* (2006.01)

(52) U.S. Cl.
CPC ......... *H02K 41/06* (2013.01); *H02K 2201/03* (2013.01)

(58) Field of Classification Search
USPC ........................................................ 310/40.5
See application file for complete search history.

(56) References Cited

U.S. PATENT DOCUMENTS

| | | | | |
|---|---|---|---|---|
| 4,031,421 | A * | 6/1977 | Geiger | H02K 19/34 310/112 |
| 4,055,789 | A * | 10/1977 | Lasater | H02J 7/14 320/124 |
| 4,412,794 | A * | 11/1983 | Presley | H02K 41/06 310/82 |
| 6,211,593 | B1 * | 4/2001 | Nashiki | H02K 1/278 310/114 |
| 6,455,975 | B1 | 9/2002 | Raad et al. | |
| 7,973,441 | B2 * | 7/2011 | Atallah | H02K 49/102 310/103 |
| 2003/0062785 | A1 * | 4/2003 | Vasudevan | H02K 53/00 310/152 |
| 2007/0210659 | A1 * | 9/2007 | Long | H02K 49/10 310/80 |
| 2007/0284478 | A1 * | 12/2007 | Soderberg | H02K 7/14 244/103 R |
| 2008/0098588 | A1 * | 5/2008 | Bremner | H02K 21/029 29/598 |
| 2009/0167106 | A1 | 7/2009 | Hashimoto et al. | |
| 2010/0019711 | A1 * | 1/2010 | Yen | H02K 19/12 318/400.41 |
| 2011/0121669 | A1 * | 5/2011 | Lacour | H02K 7/116 310/51 |
| 2012/0258834 | A1 * | 10/2012 | Winiasz | F03D 15/00 475/159 |
| 2013/0276575 | A1 * | 10/2013 | Hoebel | F16H 35/00 74/640 |
| 2014/0028147 | A1 * | 1/2014 | Murray | H02K 1/24 310/216.074 |
| 2014/0184002 | A1 * | 7/2014 | Levin | H02K 7/08 310/90 |

FOREIGN PATENT DOCUMENTS

| | | |
|---|---|---|
| JP | 2013-027099 A | 2/2013 |
| JP | 2013-118814 A | 6/2013 |
| WO | WO 2016/130467 A1 | 8/2016 |
| WO | WO 2017/142940 A1 | 8/2017 |

OTHER PUBLICATIONS

Alibeik, M. et al., "Airgap-less Electric Motor: A Solution for High-Torque Low-Speed Applications." IEEE 978-1-5090-4281-4 (2017). 7 pages.
PCT, App. No. PCT/US2019/013736 International Preliminary Report on Patentability and Written Opinion. 8 pages., dated Jul. 30, 2020.
Sadegh, Ali M. and Worek, William M., "Marks' Standard Handbook for Mechanical Engineers, 12th Edition." 2018. McGraw Hill Education. pp. 638-641. 6 pages.
International Patent Application PCT/US2019/013736 International Search Report dated May 8, 2019. 3 pages.
International Patent Application PCT/US2019/013736 Written Opinion dated May 8, 2019. 6 pages.

* cited by examiner

HIGH TORQUE ECCENTRIC ELECTRIC MOTOR

CROSS REFERENCE TO RELATED APPLICATIONS

This application claims the benefit of U.S. Provisional Patent Application No. 62/617,746, filed on Jan. 16, 2018, which is hereby incorporated by reference.

BACKGROUND

Electric motors are commonly used in a wide variety of industries and environmental conditions. A number of types of electric motors are capable of operating at high and/or variable speeds, but usually these types of motors produce low torques. To produce higher torques, these of types electric motors can be made larger or incorporate heavy gear boxes. Either way, these electric motors are usually too heavy and thus are unsuitable for a wide range of applications that require higher torque, light weight motors, such as in robotic, material handling, and/or automotive systems.

Thus, there is a need for improvement in this field.

SUMMARY

A high torque electric motor with a rotor that is oriented eccentrically relative to a stator has been developed to address the above-mentioned as well as other issues. In most traditional electric motors, the axis of the rotor is aligned with the axis of the stator such that a consistent and even air gap is maintained between the rotor and stator around the circumference of the motor to facilitate high speed rotation. In contrast, the rotor in this eccentric high torque electric motor developed by the inventors is oriented in an eccentric manner relative to the stator so that the rotor is able to maintain rolling contact with the stator. This causes the rotation axis of the rotor to travel parallel to the axis of the stator and traces a circular path around the axis of the stator. The stator in one example has sets of electromagnetic coils to produce a magnetic field that attracts the rotor. This magnetic field acts axially to the coils. Successive coils are excited causing the rotor to roll along the stator. In one variation, the rotor is made of pairs of permanent magnets and/or ferritic materials with high magnetic permeability. The electric motor in other variations includes a crankshaft with bearings or bushings that allow the rotor to rotate smoothly relative to the crankshaft.

In one form, the rotor is located in the interior of the stator. In another form, the opposite approach is taken where the rotor is located around the exterior of the stator. This close interface between the rotor and stator allows the rotor to maintain very close proximity (e.g., <1.0 mm or <0.040 inches) without making contact between the coils of the stator and magnets/ferritic material of the rotor. The close proximity allows very large magnetic forces to be utilized to produce torque without increasing the size and/or weight of the coils relative to traditional motors. The eccentric motion of the rotor and the torque produced is translated into pure rotary motion via the crankshaft. In one embodiment, the motor includes a single rotor or a single "lobe".

The torque-speed characteristics of the motor in other variations can be altered electromagnetically, such as by changing the number of turns on the coils, or mechanically, such as by changing the difference in the diameters between the rotor and the stator. In other examples where permanent magnets are utilized on the rotor, the torque can be applied to the crankshaft to allow the device to generate electric power. This effect can also be used when the motor is slowing down to generate power using a regenerative technique (e.g., regenerative braking). The motor can also be operated such that the coils attract the rotor causing the rotor to roll along the stator and push the rotor tangentially along the stator in a method similar to traditional electric motors. In broad terms, this technique is generally a superposition of the rolling contact of the motor and the sliding contact of the rotor magnets tangent to the diameter of the stator found in traditional electric motors.

In other variations, the eccentric motor assembly includes multiple rotors and stators (i.e., lobes). The lobes can be utilized and placed out of phase relative to each other so that the motor can operate at high speeds without excessive vibration due to unbalanced rotating mass. Generally speaking, there is no practical limit to the number of lobes that can be used. Moreover, the rotors and stators in the lobes do not necessarily have to maintain the same size and/or speed characteristics in other variations.

This eccentric high torque electric motor system can be used in a wide variety of applications that require a lightweight motor with high torque output. For example, these applications include, but are not limited to, robotic systems including robotic arms, automated ground vehicles, material handling shuttles, and/or powered exoskeletons. Other use cases include motorized drive rollers like those found in material handling systems, forklifts, and electric vehicles.

Aspect 1 generally concerns a system that includes an electric motor with a rotor eccentrically oriented relative to a stator.

Aspect 2 generally concerns the system of aspect 1 in which the rotor is disposed inside the stator and contacts the stator at a contact area.

Aspect 3 generally concerns the system of aspect 2 in which the rotor is spaced apart from the stator by a gap opposite the contact area.

Aspect 4 generally concerns the system of aspect 1 in which the rotor is spaced at most 1 mm from the stator at a contact area.

Aspect 5 generally concerns the system of aspect 4 in which the rotor is spaced apart from the stator by a gap opposite the contact area that is greater than 1 mm.

Aspect 6 generally concerns the system of aspect 1 in which the rotor has a central rotor axis that is offset from a central stator axis of the stator.

Aspect 7 generally concerns the system of aspect 1 in which the electric motor includes a crankshaft to which the rotor is coupled.

Aspect 8 generally concerns the system of aspect 7 in which the electric motor includes a bearing disposed between the rotor and the crankshaft.

Aspect 9 generally concerns the system of aspect 1 in which the electric motor includes at least two electric motor lobes.

Aspect 10 generally concerns the system of aspect 9 in which the electric motor includes at least two crank pins on a crankshaft.

Aspect 11 generally concerns the system of aspect 9 in which the at least two electric motor lobes include a first lobe and a second lobe.

Aspect 12 generally concerns the system of aspect 11 in which the rotor is a first rotor of the first lobe and the second lobe includes a second rotor opposite the first rotor.

Aspect 13 generally concerns the system of aspect 12 in which the electric motor has a mid-link connecting the first rotor to the second rotor.

Aspect 14 generally concerns the system of aspect 12 in which the first rotor is a south rotor having permanent magnets with south poles facing radially outward.

Aspect 15 generally concerns the system of aspect 14 in which the second rotor is a north rotor having permanent magnets with north poles facing radially outward.

Aspect 16 generally concerns the system of aspect 9 in which the electric motor has a shield disposed between the first lobe and the second lobe.

Aspect 17 generally concerns the system of aspect 1 in which the electric motor includes an indexing mechanism.

Aspect 18 generally concerns the system of aspect 17 in which the indexing mechanism includes a ring gear and a planet gear eccentrically disposed in the ring gear.

Aspect 19 generally concerns the system of aspect 18 in which the ring gear includes a ring body and a series of pins extending from the ring body in a longitudinal direction.

Aspect 20 generally concerns the system of aspect 1 in which the electric motor has a universal joint.

Aspect 21 generally concerns the system of aspect 20 in which the universal joint includes a mid-link with guide slots on opposite sides arranged in a transverse manner.

Aspect 22 generally concerns the system of aspect 20 in which the universal joint includes a planet gear with an opening and an output adapter pin in the opening.

Aspect 23 generally concerns the system of aspect 1 in which the stator includes a series of electromagnets circumferentially disposed around the rotor.

Aspect 24 generally concerns the system of aspect 23 in which the electromagnets each include a pole pair with at least two coils wound in opposing directions.

Aspect 25 generally concerns the system of aspect 24 in which the rotor includes a rotor body made of material configured to be magnetically attracted by the pole pair.

Aspect 26 generally concerns the system of aspect 23 in which the electromagnets include a first pole pair and a second pole pair.

Aspect 27 generally concerns the system of aspect 26 in which the controller with a drive circuit is configured to provide opposite currents to the first and second pole pairs.

Aspect 28 generally concerns the system of any previous aspect in which the rotor is disposed inside the stator and contacts the stator at a contact area.

Aspect 29 generally concerns the system of any previous aspect in which the rotor is spaced apart from the stator by a gap opposite the contact area.

Aspect 30 generally concerns the system of any previous aspect in which the rotor is spaced at most 1 mm from the stator at a contact area.

Aspect 31 generally concerns the system of any previous aspect in which the rotor is spaced apart from the stator by a gap opposite the contact area that is greater than 1 mm.

Aspect 32 generally concerns the system of any previous aspect in which the rotor has a central rotor axis that is offset from a central stator axis of the stator.

Aspect 33 generally concerns the system of any previous aspect in which the electric motor includes a crankshaft to which the rotor is coupled.

Aspect 34 generally concerns the system of any previous aspect in which the electric motor includes a bearing disposed between the rotor and the crankshaft.

Aspect 35 generally concerns the system of any previous aspect in which the electric motor includes at least two electric motor lobes.

Aspect 36 generally concerns the system of any previous aspect in which the electric motor includes at least two crank pins on a crankshaft.

Aspect 37 generally concerns the system of any previous aspect in which the at least two electric motor lobes include a first lobe and a second lobe.

Aspect 38 generally concerns the system of any previous aspect in which the rotor is a first rotor of the first lobe and the second lobe includes a second rotor opposite the first rotor.

Aspect 39 generally concerns the system of any previous aspect in which the electric motor has a mid-link connecting the first rotor to the second rotor.

Aspect 40 generally concerns the system of any previous aspect in which the first rotor is a south rotor having permanent magnets with south poles facing radially outward.

Aspect 41 generally concerns the system of any previous aspect in which the second rotor is a north rotor having permanent magnets with north poles facing radially outward.

Aspect 42 generally concerns the system of any previous aspect in which the electric motor has a shield disposed between the first lobe and the second lobe.

Aspect 43 generally concerns the system of any previous aspect in which the electric motor includes an indexing mechanism.

Aspect 44 generally concerns the system of any previous aspect in which the indexing mechanism includes a ring gear and a planet gear eccentrically disposed in the ring gear.

Aspect 45 generally concerns the system of any previous aspect in which the ring gear includes a ring body and a series of pins extending from the ring body in a longitudinal direction.

Aspect 46 generally concerns the system of any previous aspect in which the electric motor has a universal joint.

Aspect 47 generally concerns the system of any previous aspect in which the universal joint includes a mid-link with guide slots on opposite sides arranged in a transverse manner.

Aspect 48 generally concerns the system of any previous aspect in which the universal joint includes a planet gear with an opening and an output adapter pin in the opening.

Aspect 49 generally concerns the system of any previous aspect in which the stator includes a series of electromagnets circumferentially disposed around the rotor.

Aspect 50 generally concerns the system of any previous aspect in which the electromagnets each include a pole pair with at least two coils wound in opposing directions.

Aspect 51 generally concerns the system of any previous aspect in which the rotor includes a rotor body made of material configured to be magnetically attracted by the pole pair.

Aspect 52 generally concerns the system of any previous aspect in which the electromagnets includes a first pole pair and a second pole pair.

Aspect 53 generally concerns the system of any previous aspect in which the controller with a drive circuit is configured to provide opposite currents to the first and second pole pairs.

Aspect 54 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
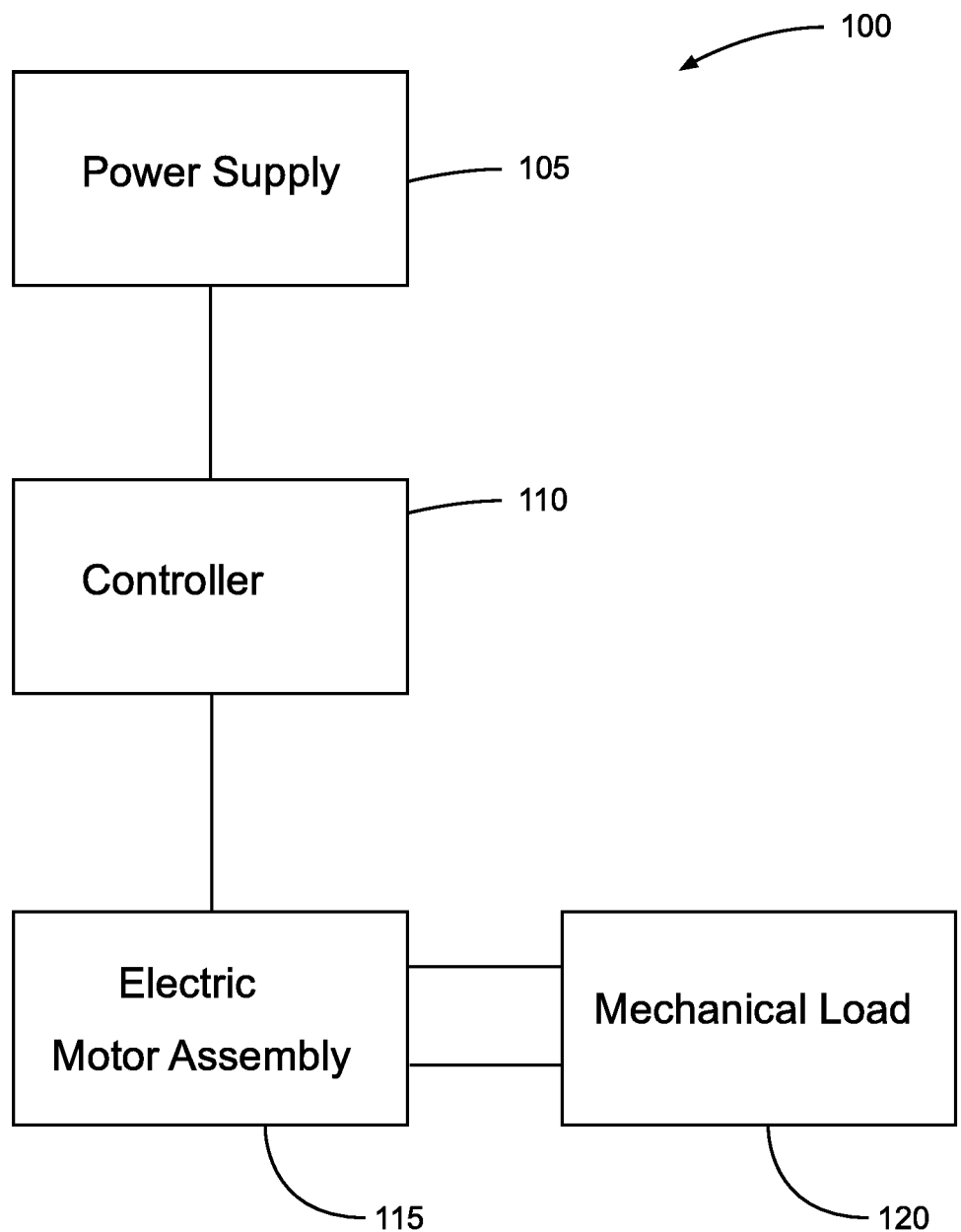
FIG. 1 is a diagrammatic view of an electric motor system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

An electric motor system 100 according to one example will now be described with respect to FIG. 1. As shown, the electric motor system 100 includes a power supply 105, a controller 110 electrically connected to the power supply 105, and an electric motor assembly 115 that is controlled by the controller 110. The electric motor assembly 115 receives electrical power supplied from the power supply 105 and converts the electrical power into mechanical power that is supplied to a mechanical load 120. As should be recognized, the mechanical load 120 can take many forms. For example, the mechanical load 120 can include robot arms, conveyor belts, vehicle wheels, powered joints such as those in exoskeletons, and/or tools, to name just a few examples. The controller 110 is for instance configured to control the operation and mechanical output of the electric motor assembly 115, such as the speed, rotational direction (i.e., clockwise or counterclockwise), and/or torque supplied by the electric motor assembly 115.

As will be explained in greater detail below, the electric motor assembly 115 is designed to provide high mechanical torques and be relatively lightweight, so the electric motor assembly 115 can be used in a number of environments, applications, and/or other situations. For instance, there has been recent interest in developing exoskeletons worn by individuals for both material handling and military applications. The exoskeleton is designed to provide additional strength and/or reduce muscle fatigue of the wearer of the exoskeleton. However, the strength and fatigue gains of the exoskeleton can be readily offset by the additional motor and/or gearbox weight of traditional electric motors. This added weight can reduce the operational life of the exoskeleton. There are needs for low weight and high torque motors in other applications, such as for robotics. To provide a high mechanical torque output for a given weight, the electric motor assembly 115 incorporates a unique eccentric motor design.

One example of the electric motor assembly 115 will be initially described with reference for FIG. 2. As shown, an electric motor 200 includes a rotor 205 received inside a stator 210. One or more bearings 215 rotatably couple the rotor 205 to a crankshaft 220. The rotor 205 is oriented and moves in an eccentric manner relative to the stator 210. In particular, the stator 210 has a central stator axis 225, and the rotor 205 is offset from the central stator axis 225 by a rotor axis 230. The rotor axis 230 extends generally parallel to the central stator axis 225, but the rotor axis 230 is spaced away from the central stator axis 225 by a throw or displacement distance 235. In other words, the central stator axis 225 forms the central rotational axis for the stator 210, and the rotor axis 230 generally forms the central rotational axis for the rotor 205. As the rotor 205 rotationally moves in a clockwise or counterclockwise direction during use, as is indicated by arrow 240, the rotor axis 230 of the rotor 205 orbits the central stator axis 225 so as to move in a circular path or orbit around the central stator axis 225.

As depicted, the rotor 205 is located in a rotor cavity 245 of the stator 210. The rotor 205 has a rotor outer surface 250 that contacts a stator inner surface 255 of the stator 210 formed around the rotor cavity 245 of the stator 210. At contact area 257, the rotor outer surface 250 of the rotor 205 contacts the stator inner surface 255 of the stator 210. In one form, the rotor outer surface 250 directly contacts the stator inner surface 255 at the contact area 257. In other examples, the rotor 205 is slightly spaced away from the stator inner surface 255 at the contact area 257 by 1 mm or less (at most 0.040 inches) to reduce the risk of wear and/or electrical shorts. For instance, the rotor 205 can be spaced away from the stator 210 at the contact area 257 by an air gap and/or insulative material. As can be seen, a gap 260 is formed between the rotor 205 and the stator 210 generally opposite the contact area 257. In one example, this gap 260 is greater than 1 mm. The stator 210 generates a series of magnetic fields that cause the rotor 205 to roll inside the rotor cavity 245 along the stator inner surface 255 in the circumferential direction indicated by arrow 240. As the rotor 205 rolls along the stator inner surface 255, the bearings 215 allow the rotor 205 to rotate smoothly around the rotor axis 230 on the crankshaft 220. This movement of the rotor 205 in turn generates a high mechanical torque on the crankshaft 220.

Figure 3:
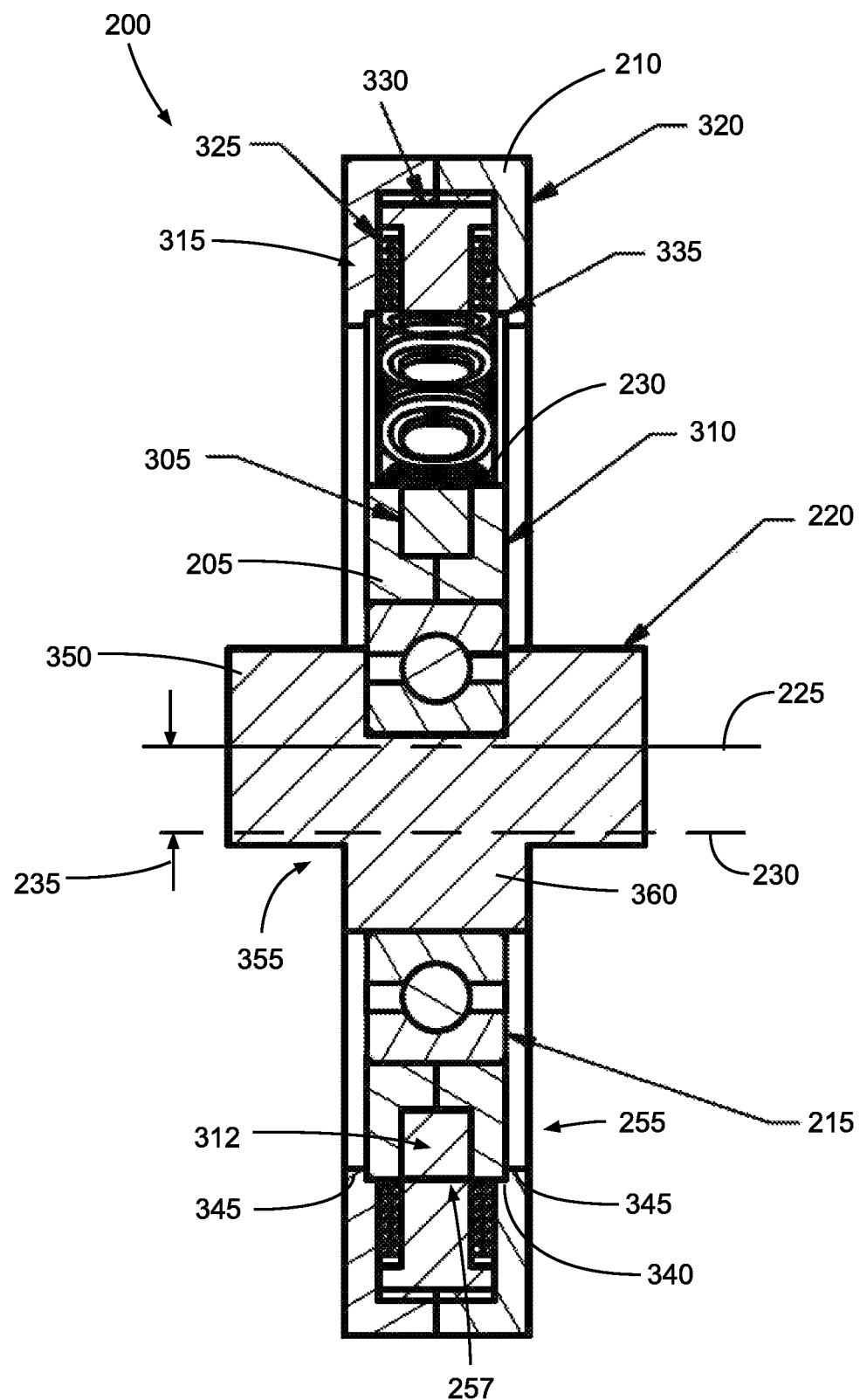
FIG. 3 is a cross-sectional view of the FIG. 2 electric motor as taken along line 3-3 in FIG. 2.

Looking at FIG. 3, the rotor 205 has one or more permanent magnets 305 spaced equally around the circumference of the rotor 205. The permanent magnets 305 in one form are made of ferromagnetic and/or ferrimagnetic material. In one particular example, the permanent magnets 305 are made of a ferromagnetic material, such as iron. Alternatively or additionally, some or all of the permanent magnets 305 can be replaced with other types of magnets and/or materials, such as electromagnets and/or materials that are magnetized on a temporary basis. As illustrated, the permanent magnets 305 are secured in a rotor housing 310. In particular, the rotor housing 310 defines a rotor groove 312 in which the permanent magnets 305 are arranged in a circumferentially alternating fashion such that the directly neighboring permanent magnets 305 are oriented with the opposite pole facing the stator 210. For instance, when the north pole of one of the permanent magnets 305 faces the stator 210 (i.e., in a radial direction), the two neighboring permanent magnets 305 will have their south poles facing the stator inner surface 255. The permanent magnets 305 in the illustrated example are arranged in a circumferentially uniform pattern around the rotor 205, but in other examples, the permanent magnets 305 can be arranged in non-uniform and/or other patterns.

The stator 210 has one or more electromagnets 315 secured inside a stator housing 320. The electromagnets 315 include a series of coils 325 that are wrapped around cores 330. The coils 325 are made of electrically conductive material like copper or silver, and the cores 330 are made of ferromagnetic or ferrimagnetic material, such as iron, that concentrates the magnetic flux of the electromagnets 315. In one form, the neighboring coils 325 are wrapped around their respective cores 330 in an opposite manner (i.e., clockwise or counterclockwise) so as to create opposite polarities when energized with a similar current flowing in the same direction. In other examples, some or all of the coils 325 of the stator 210 can be wrapped in the same direction, and the controller 110 individually controls the electrical current to create different desired electromagnetic field patterns in the stator 210. The electromagnets 315 in the illustrated example are arranged in a circumferentially uniform pattern around the stator 210, but in other examples, the electromagnets 315 can be arranged in non-uniform and/or other patterns.

At the stator inner surface 255, the stator housing 320 forms a stator raceway 335 in which a portion of the rotor 205 contacting at the contact area 257 is received during operation. Inside the stator raceway 335, the stator 210 has a rotor contact surface 340 where the rotor outer surface 250 of the rotor 205 contacts the stator 210. On opposite sides of the stator raceway 335, the stator housing 320 has rotor guide flanges 345 that align the rotor 205 with the stator 210. Again, the permanent magnets 305 of the rotor 205 at the contact area 257 contact or nearly (e.g., slight gap of at most 1 mm) contact the electromagnets 315 of the stator 210. This close interface between the rotor 205 and stator 210 allows the rotor 205 to maintain very close proximity without making contact between the coils 325 of the stator 210 and permanent magnets 305 of the rotor 205. The close proximity allows very large magnetic forces to be utilized to produce torque without increasing the size and/or number of the coils 325 relative to traditional motors. This in turn helps reduce the weight of the electric motor 200. In other words, the electric motor 200 is able to produce a greater mechanical torque output for a given weight as compared to traditional electric motors.

Figure 4:
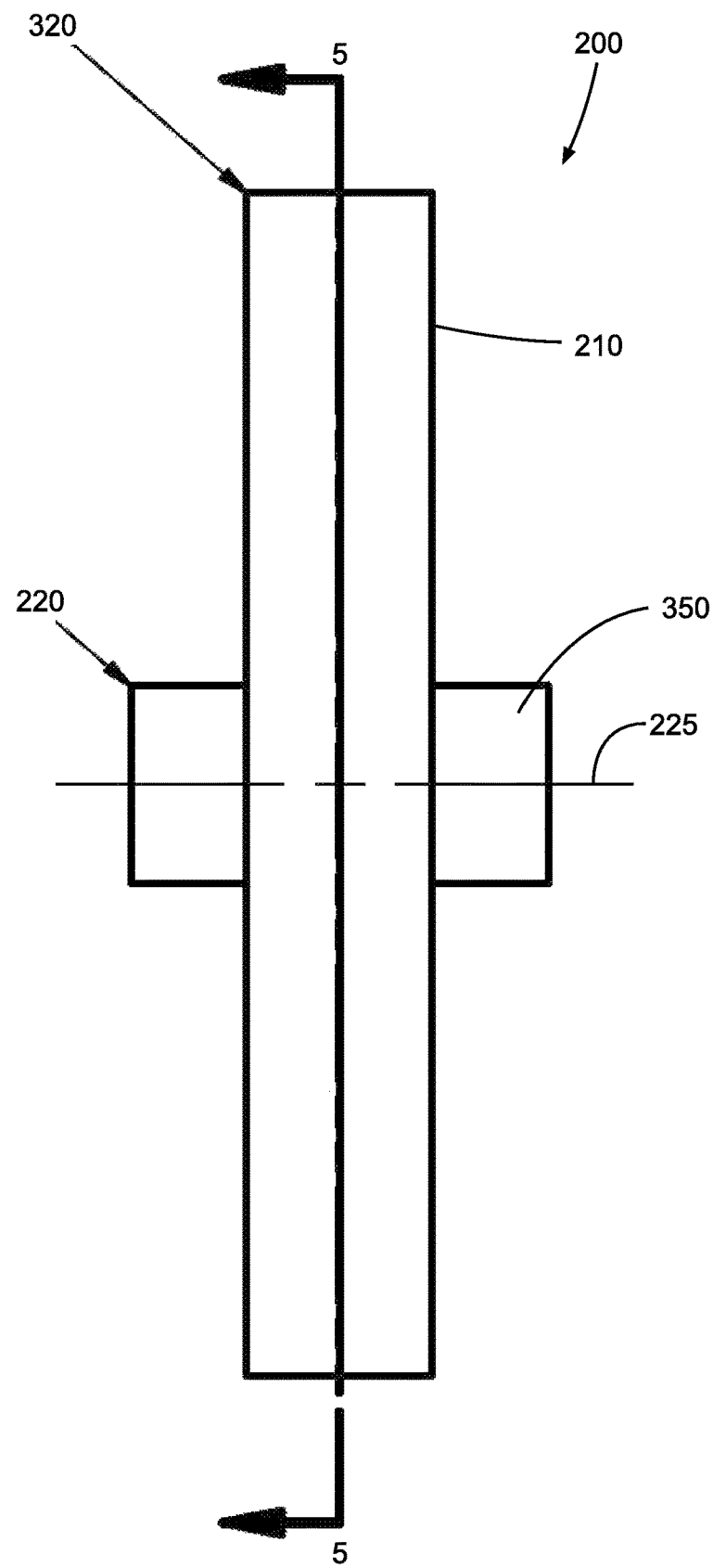
FIG. 4 is a side view of the FIG. 2 electric motor.

As shown in FIGS. 3 and 4, the crankshaft 220 has a shaft 350 that extends in a longitudinal direction along the central stator axis 225. The crankshaft 220 further has a crank throw 355 with a crank pin 360 that is aligned with and extends along the rotor axis 230. In other words, the crank pin 360 is generally offset from the shaft 350 by the displacement distance 235. By having the crankshaft 220 with the rotor 205 being offset or eccentrically oriented relative to the stator 210, the electric motor 200 is able to again produce greater torque. The mechanical output of the electric motor 200 is either directly or indirectly transferred to the mechanical load 120 via the shaft 350 of the crankshaft 220.

Figure 5:
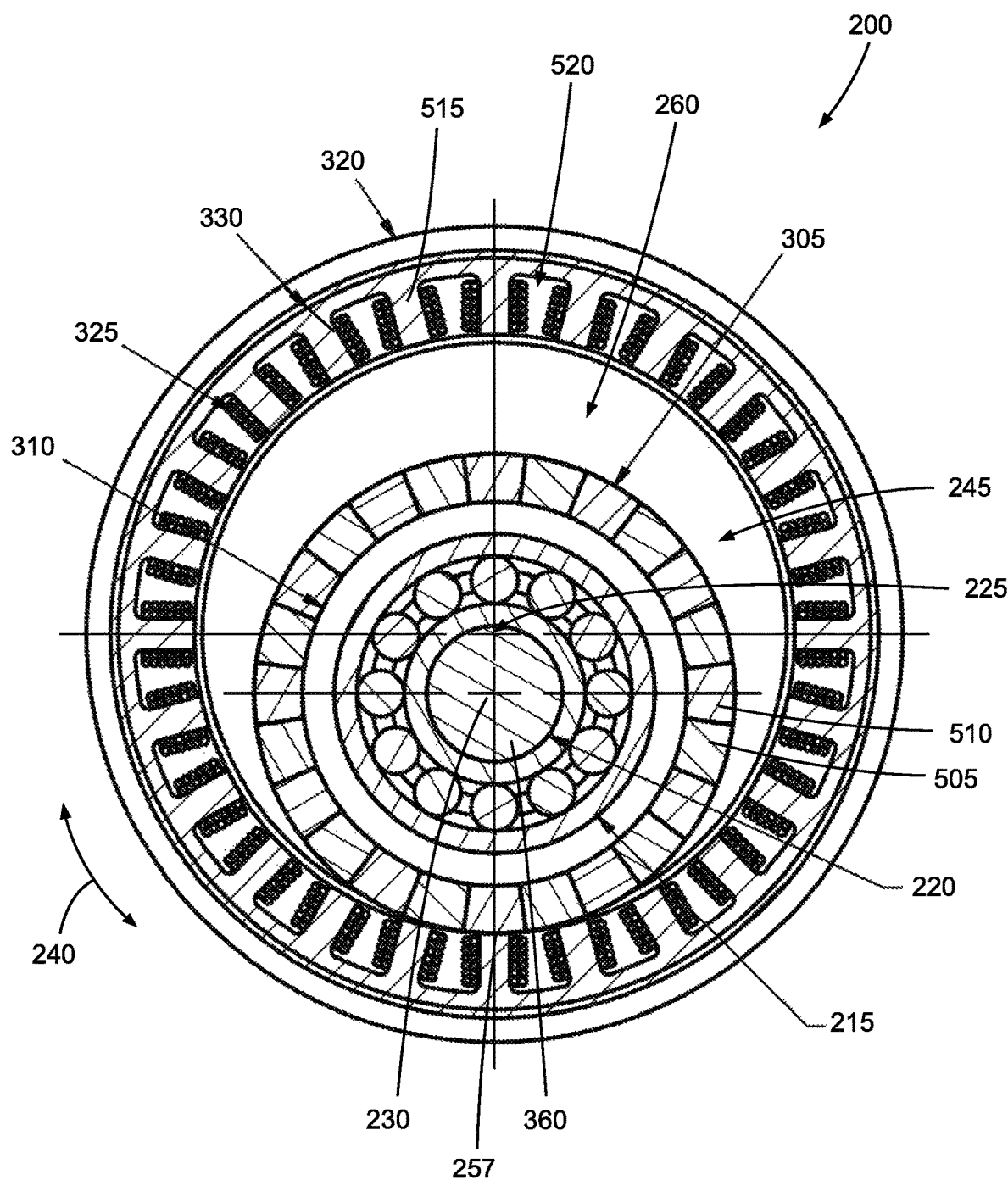
FIG. 5 is a cross-sectional view of the FIG. 2 electric motor as taken along line 5-5 in FIG. 4.

As was mentioned before, the permanent magnets 305 in the illustrated example are arranged in a circumferentially alternating fashion such that the directly neighboring permanent magnets 305 are oriented with the opposite pole facing the stator 210. Turning to FIG. 5, the permanent magnets 305 include one or more north magnets 505 that have their north poles facing the stator 210 and one or more south magnets 510 with their south poles facing the stator 210. In the illustrated example, the north magnets 505 and south magnets 510 are arranged in an alternating manner around the circumference of the rotor 205. The stator 210 has a core ring 515 with the cores 330 extending in an inner radial direction towards the rotor 205. Between the cores 330, the stator 210 has one or more coil cavities 520 in which the coils 325 are received when wrapped around the cores 330. Neighboring coils 325 of the electromagnets 315 are wrapped in opposite manners to create sets of electromagnets 315 forming pole pairs with opposite polarities when energized by the same current.

Once more, the rotor 205 is oriented in an eccentric manner relative to the stator 210 so that the rotor 205 is able to maintain rolling contact with the stator 210. This causes the rotor axis 230 of the rotor 205 to travel parallel to the central stator axis 225 of the stator 210 and traces a circular path around the central stator axis 225 of the stator 210. During operation, the controller 110 energizes various sets of the electromagnets 315 to cause the rotor 205 to roll around inside the stator 210. The electromagnets 315 produce a magnetic field that attracts the permanent magnets 305 of the rotor 205. This magnetic field acts axially to the coils 325 of the electromagnets 315. The controller 110 excites successive coils 325 of the electromagnets 315 to cause the rotor outer surface 250 of the rotor 205 to roll along the stator inner surface 255 of the stator 210. The crankshaft 220 with bearings 215 allows the rotor 205 to rotate smoothly relative to the crankshaft 220. The mechanical output or torque of the electric motor 200 is then transferred to the mechanical load 120 via the shaft 350 of the crankshaft 220. As should be recognized, the controller 110 can cause the shaft 350 to rotate in a clockwise or counterclockwise direction, as is indicated by arrow 240. Moreover, the controller 110 can change the speed of rotation of and/or the torque supplied by the crankshaft 220 by varying the energization sequence and/or power of the electromagnets 315 in the stator 210.

Figure 2:
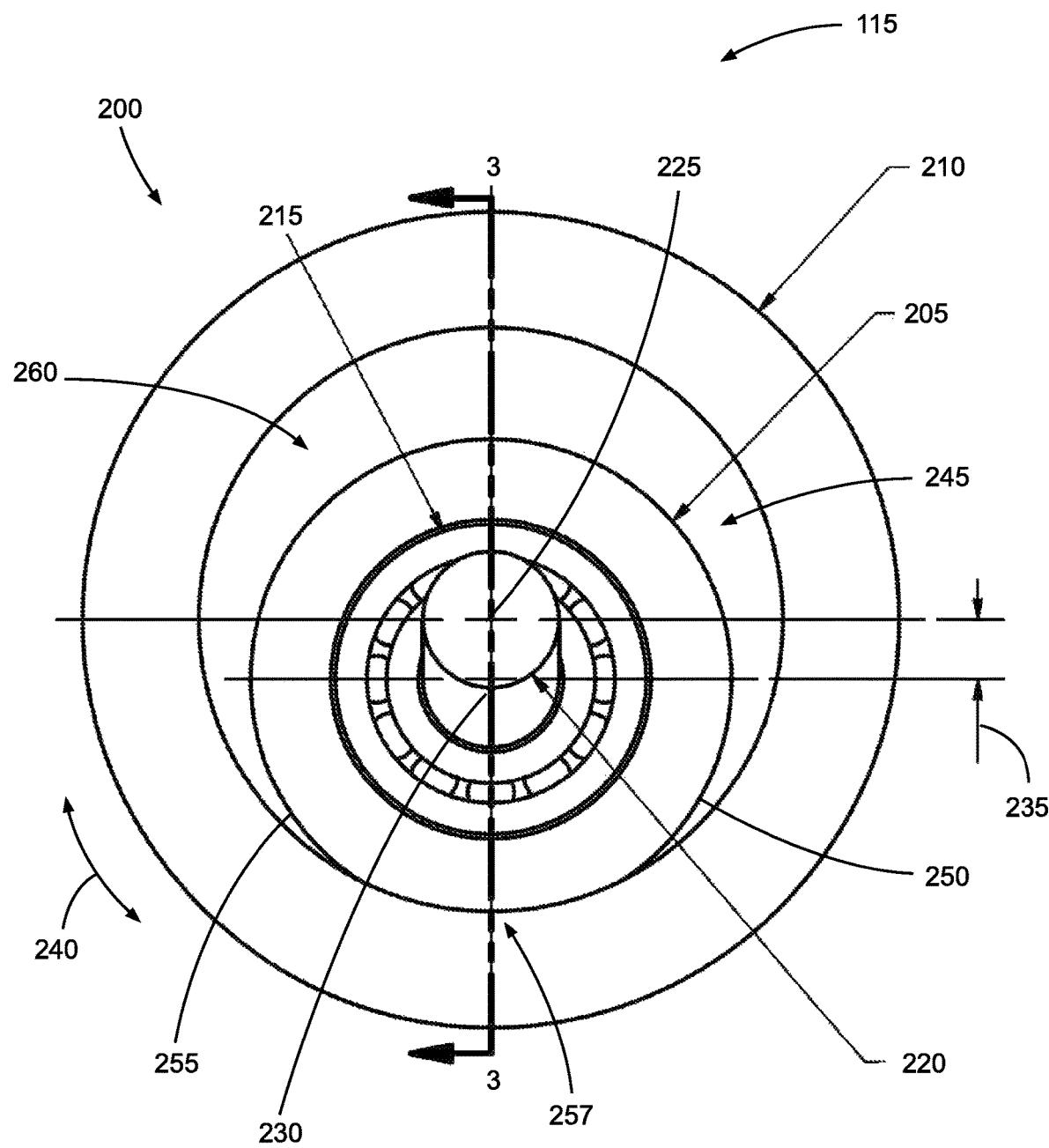
FIG. 2 is a front view of an electric motor that can be used in the FIG. 1 electric motor system.
Figure 6:
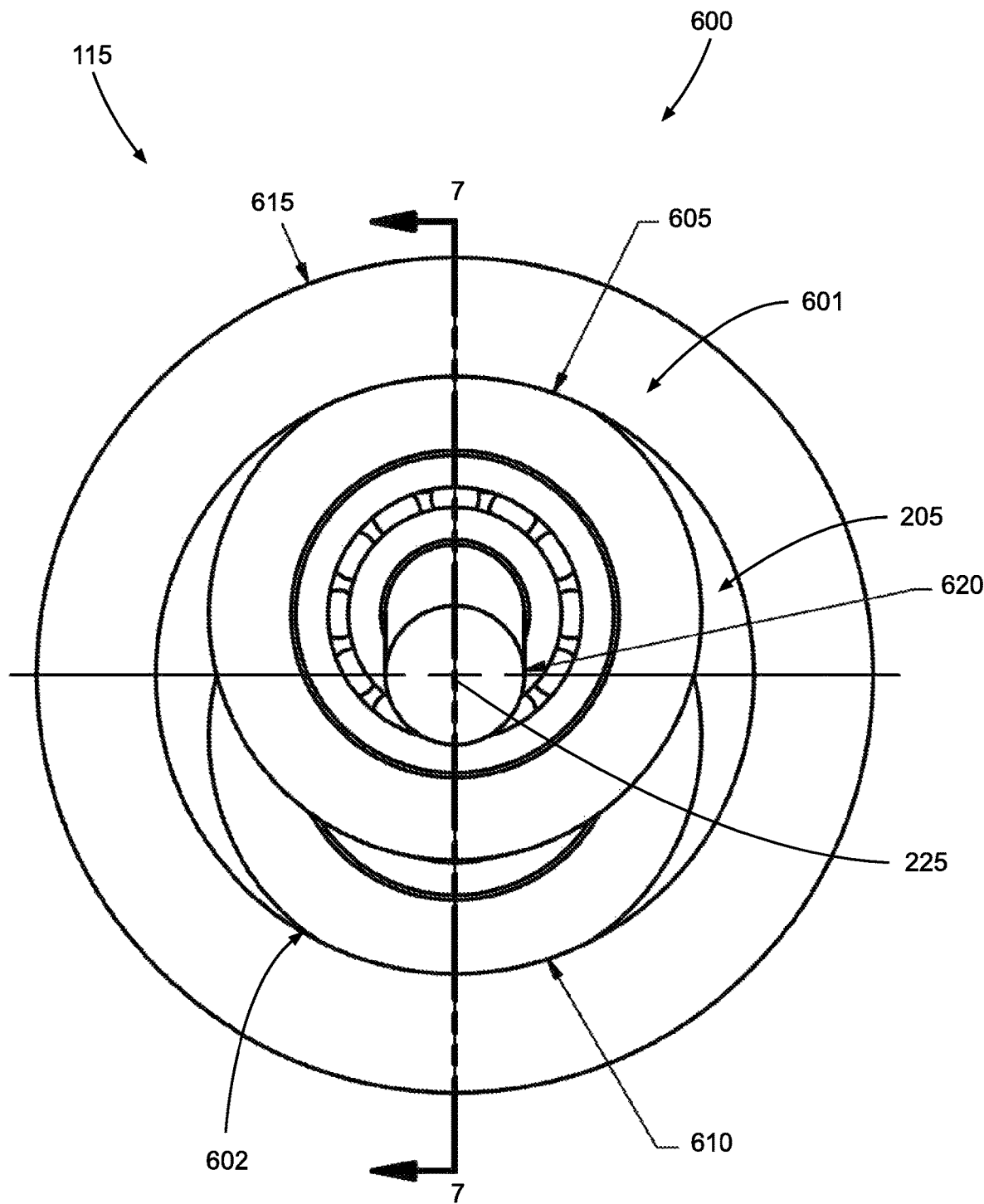
FIG. 6 is a front view of another electric motor that can be used in the FIG. 1 electric motor system.
Figure 7:
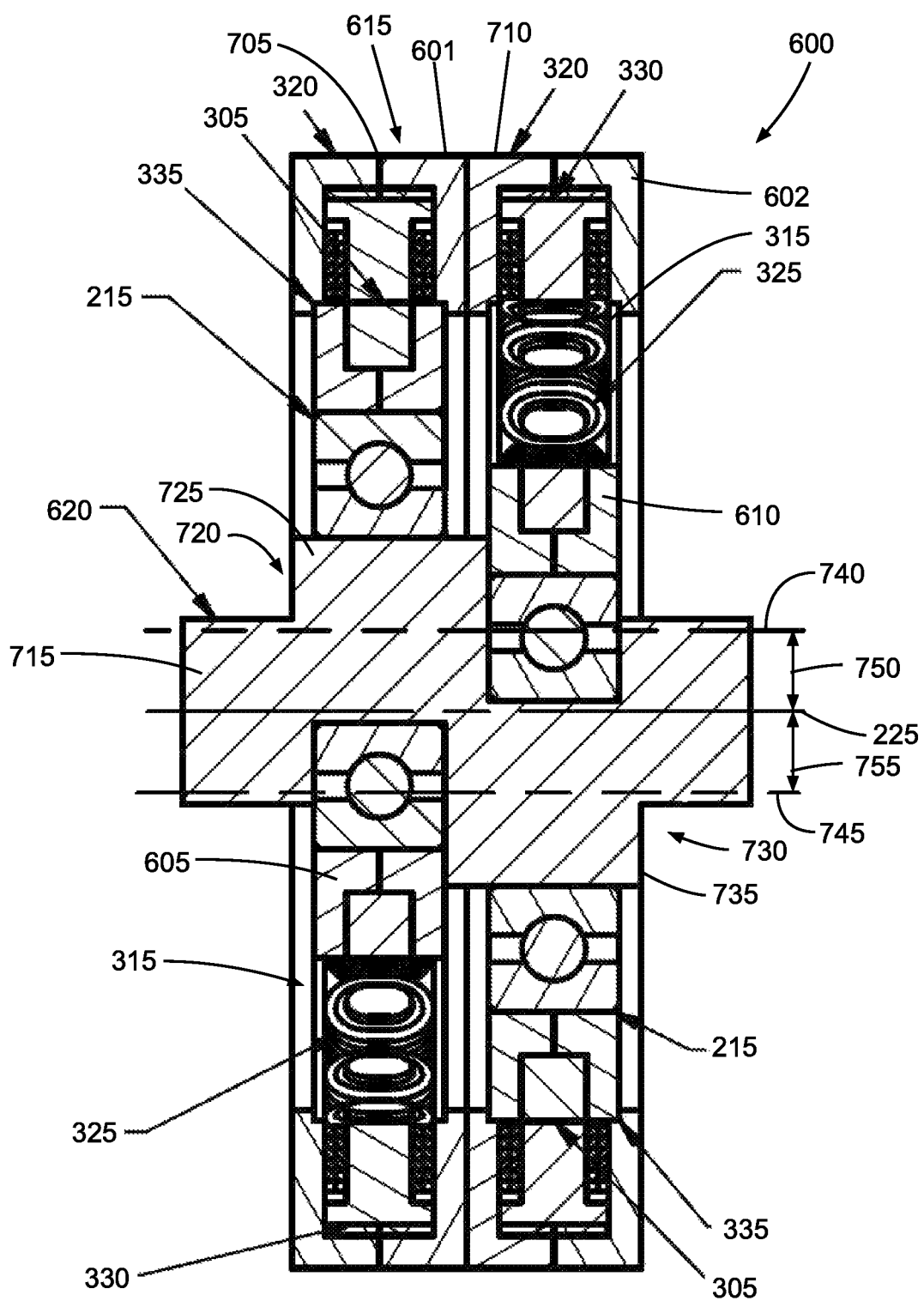
FIG. 7 is a cross-sectional view of the FIG. 6 electric motor as taken along line 7-7 in FIG. 6.

The electric motor 200 in FIG. 2 has a single rotor 205 or a single electric motor lobe. Other examples can include more than one electric motor lobe. By having multiple eclectic motor lobes, the lobes can be placed out of phase relative to each other so that the motor can operate at high speeds without excessive vibration due to unbalanced rotating mass. FIGS. 6 and 7 illustrate an example of an electric motor 600 having multiple electric motor lobes. As can be seen, the electric motor 600 includes a first electric motor lobe 601 and a second electric motor lobe 602. The first electric motor lobe 601 includes a first rotor 605, and the second electric motor lobe 602 includes a second rotor 610. The electric motor 600 further includes a stator assembly 615 and a crankshaft 620.

Turning to FIG. 7, with the exception of the crankshaft 620 and some other features, the first electric motor lobe 601 and second electric motor lobe 602 are each generally constructed in the same fashion as the electric motor 200 of FIG. 2. For instance, the electric motor 600 includes the bearings 215, permanent magnets 305, electromagnets 315, stator housings 320, coils 325, cores 330, and stator raceways 335 of the type described above with respect to the electric motor 200 shown in FIGS. 2-5. For the sake of brevity and clarity, these common features between the designs will not be again discussed in great detail below, but please refer to the previous description. As shown, the first electric motor lobe 601 includes a first stator 705 in which the first rotor 605 is received in an internally rolling manner and a second stator 710 in which the second rotor 610 is received in an internally rolling manner.

The crankshaft 620 includes a shaft 715 with a first crank throw 720 extending from the shaft 715. The first crank throw 720 has a first crank pin 725 around which the bearings 215 of the first rotor 605 are rotatably received. The crankshaft 620 further includes a second crank throw 730 extending from the shaft 715. The second crank throw 730 has a second crank pin 735 around which the bearings 215 of the second rotor 610 are rotatably received. The first crank pin 725 of the first crank throw 720 is radially offset from the central stator axis 225 of the electric motor 600 to create a first rotor axis 740 that is radially offset from and parallel to the central stator axis 225 of the stator assembly 615. The second crank pin 735 is radially offset from the shaft 715 on the opposite side of the central stator axis 225. As shown, the second crank pin 735 of the second crank throw 730 is radially offset from the central stator axis 225 of the electric motor 600 to create a second rotor axis 745 that is radially offset from and parallel to the central stator axis 225 of the stator assembly 615 on a side opposite to the first rotor axis 740. The first rotor axis 740 is offset from the central stator axis 225 by a first displacement distance 750, and the second rotor axis 745 is offset from the central stator axis 225 by a second displacement distance 755. With this arrangement, the first rotor 605 and second rotor 610 roll against opposite internal sides of the stator assembly 615 which in turn reduces vibration of the electric motor 600. In other words, with the first rotor 605 and second rotor 610 oppositely located, the forces from the first rotor 605 and second rotor 610 generally balance each other out as the crankshaft 620 is rotated.

In the first electric motor lobe 601, the first rotor 605 is oriented in an eccentric manner relative to the first stator 705 so that the first rotor 605 is able to maintain rolling contact with the first stator 705. This causes the first rotor axis 740 of the first rotor 605 to travel parallel to the central stator axis 225 of the first stator 705 and traces a circular path around the central stator axis 225 of the first stator 705. Likewise, the second rotor 610 in the second electric motor lobe 602 is oriented in an eccentric manner relative to the second stator 710 so that the second rotor 610 is able to maintain rolling contact with the second stator 710. This causes the second rotor axis 745 of the second rotor 610 to travel parallel to the central stator axis 225 of the first stator 705 and traces a circular path around the central stator axis 225 of the first stator 705. During this, the first rotor axis 740 and second rotor axis 745 are positioned on opposite sides of the central stator axis 225 to reduce an imbalanced force being applied to the crankshaft 620.

During operation, the controller 110 energizes various sets of the electromagnets 315 to cause the first rotor 605 to roll around inside the first stator 705, and the second rotor 610 to roll around inside the second stator 710. The electromagnets 315 produce a magnetic field that attracts the permanent magnets 305 of the first rotor 605 and the second rotor 610. This magnetic field acts axially to the coils 325 of the electromagnets 315. The controller 110 excites successive coils 325 of the electromagnets 315 to cause the first rotor 605 and second rotor 610 to roll along the interior of the first stator 705 and second stator 710, respectively. The crankshaft 620 with bearings 215 allows the first rotor 605 and second rotor 610 to rotate smoothly relative to the crankshaft 620. The mechanical output or torque of the electric motor 600 is then transferred to the mechanical load 120 via the shaft 715 of the crankshaft 620. As should be recognized, the controller 110 can cause the shaft 715 to rotate in a clockwise or counterclockwise direction. Moreover, the controller 110 can change the speed of rotation of and/or the torque supplied by the crankshaft 620 by varying the energization sequence and/or power of the electromagnets 315 in the electric motor 600. In other examples, the electric motor 600 can include more than two electric motor lobes. Moreover, the rotors and stators in the lobes can have different sizes and/or speed characteristics in other variations.

Figure 9:
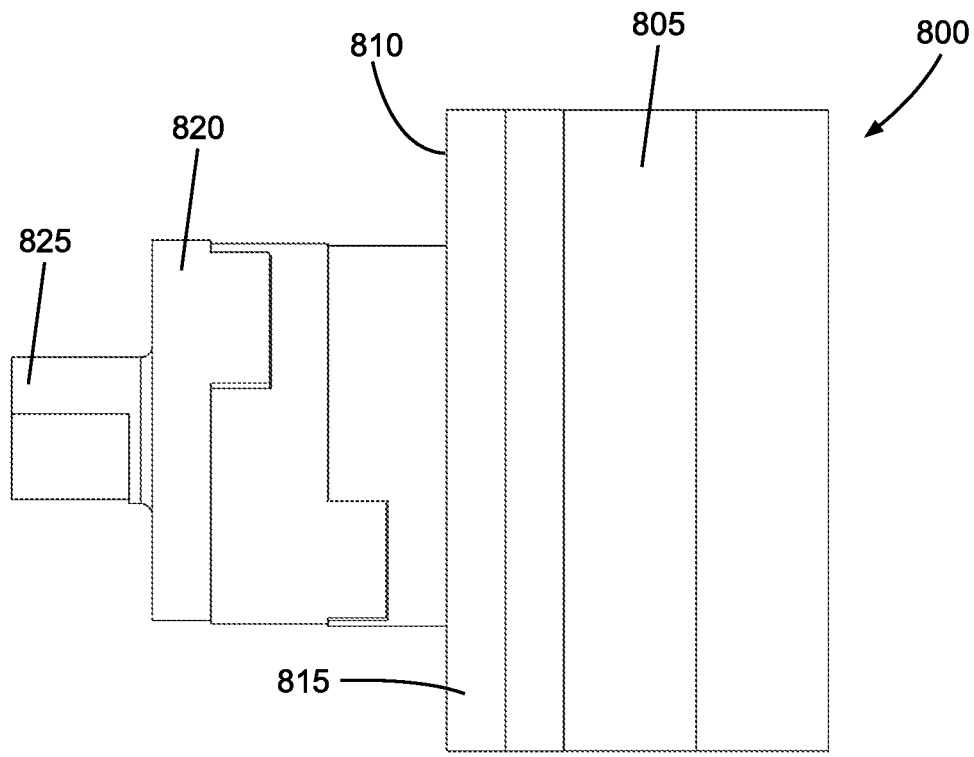
FIG. 9 is a side view of the FIG. 8 electric motor assembly.
Figure 10:
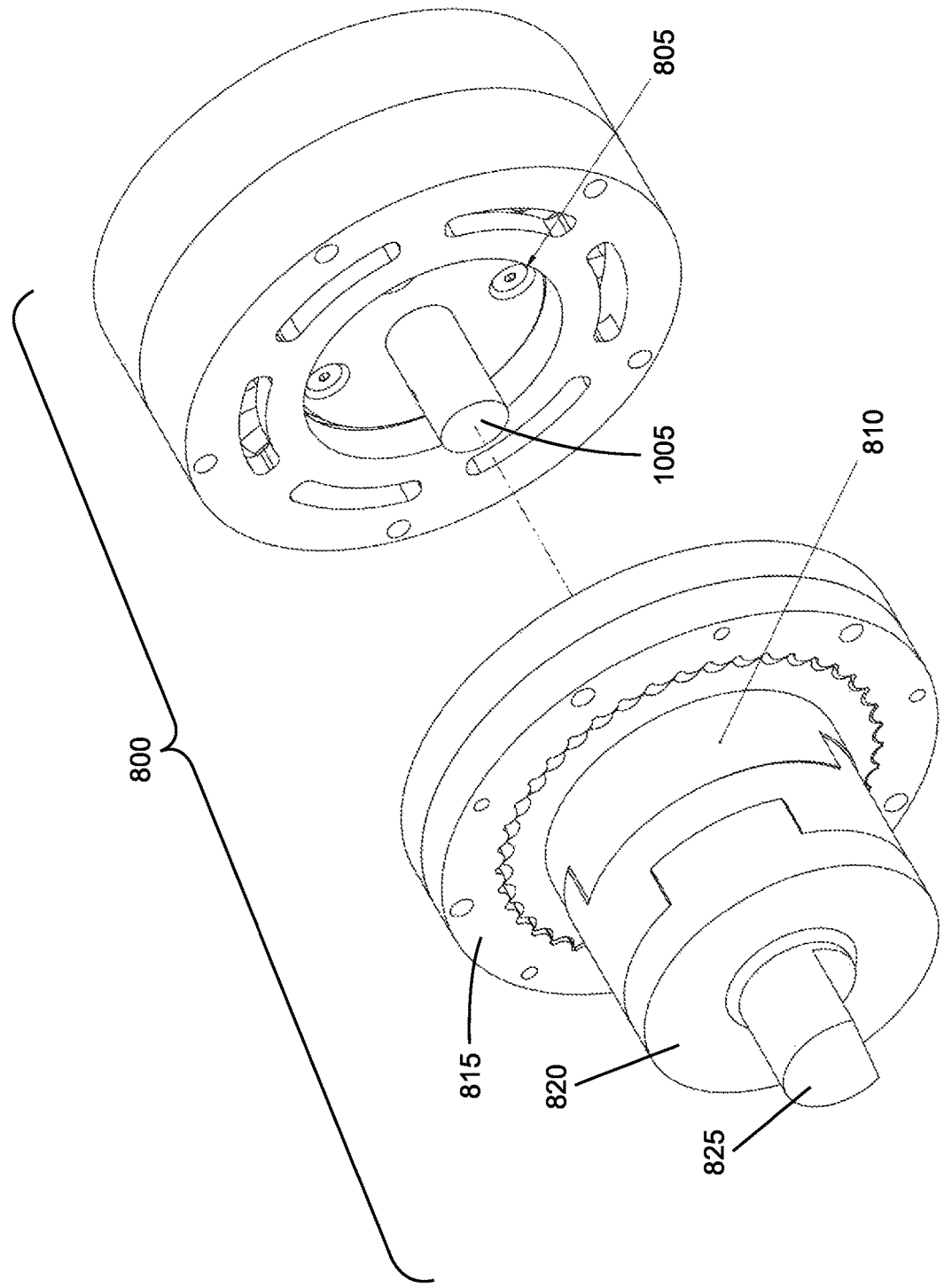
FIG. 10 is an exploded view of the FIG. 8 electric motor assembly.
Figure 11:
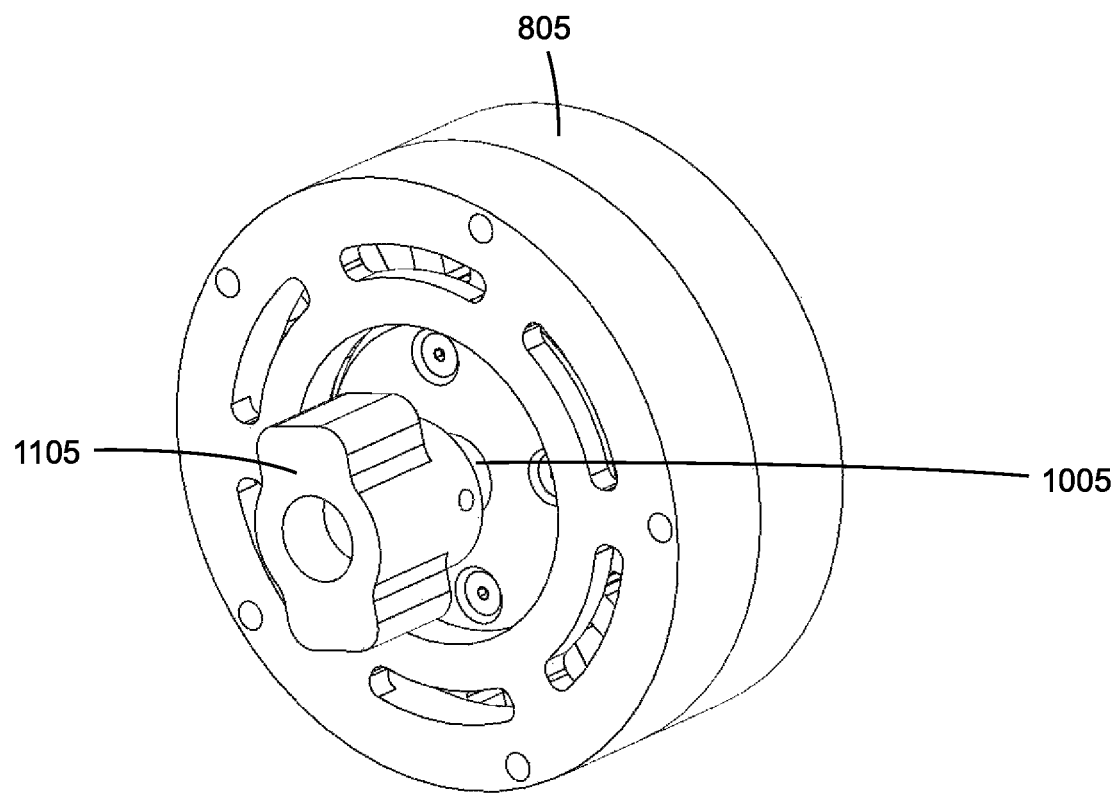
FIG. 11 is a perspective view of an electric motor of the FIG. 8 electric motor assembly.
Figure 12:
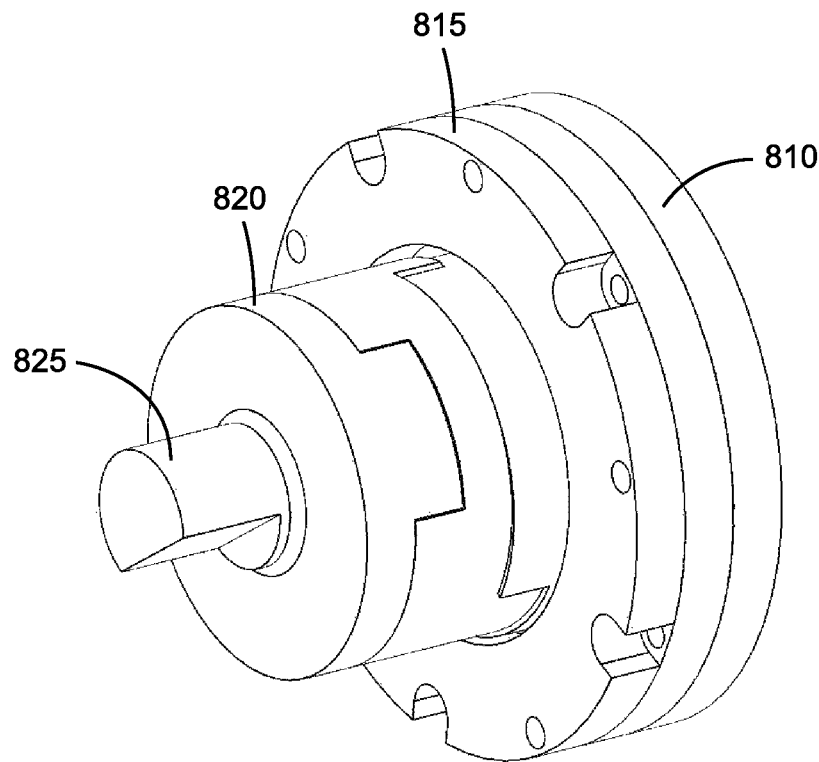
FIG. 12 is a perspective view of a transmission assembly of the FIG. 8 electric motor assembly.

An example of another electric motor assembly 800 that can be used as the electric motor assembly 115 in the electric motor system 100 of FIG. 1 will be initially described with reference to FIGS. 8, 9, and 10. The electric motor assembly 800 includes an electric motor 805 and a transmission assembly 810. The transmission assembly 810 includes an indexing mechanism 815 operatively connected to the electric motor 805 and a universal joint ("U joint") 820 with an output shaft 825 configured to directly or indirectly connect to the mechanical load 120. Looking at FIG. 10, the universal joint 820 is configured to compensate for the eccentric mechanical motion of a drive shaft 1005 of the electric motor 805. Turning to FIGS. 11 and 12, the transmission assembly 810 has a planet-base adapter 1105 that forms a mechanical connection between the drive shaft 1005 of the electric motor 805 and the transmission assembly 810. The planet-base adapter 1105 can be secured to the drive shaft 1005 in a number of manners, such as via a friction fit, fasteners, and/or adhesives.

Figure 13:
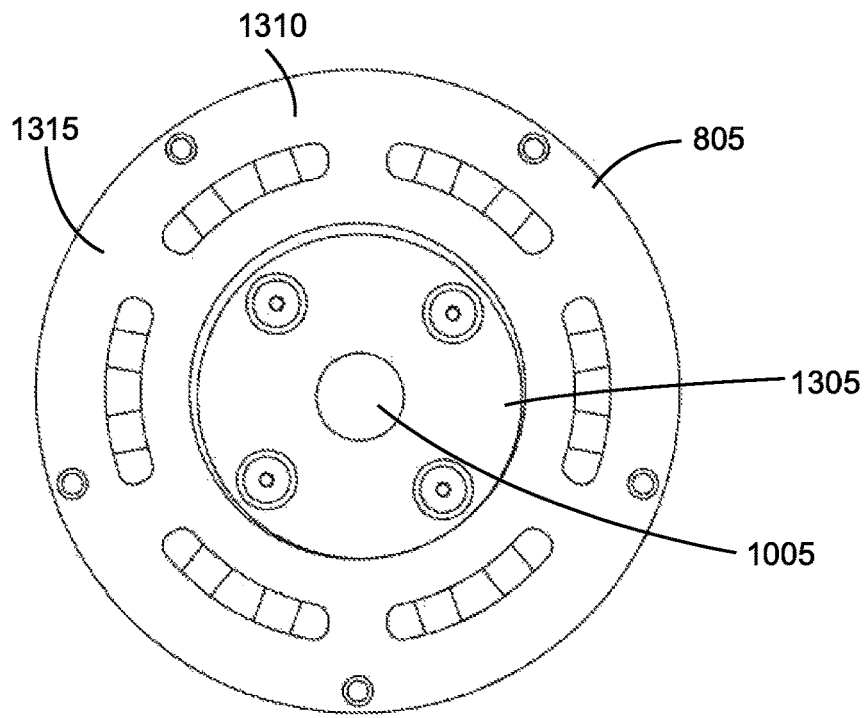
FIG. 13 is a front view of the electric motor.
Figure 14:
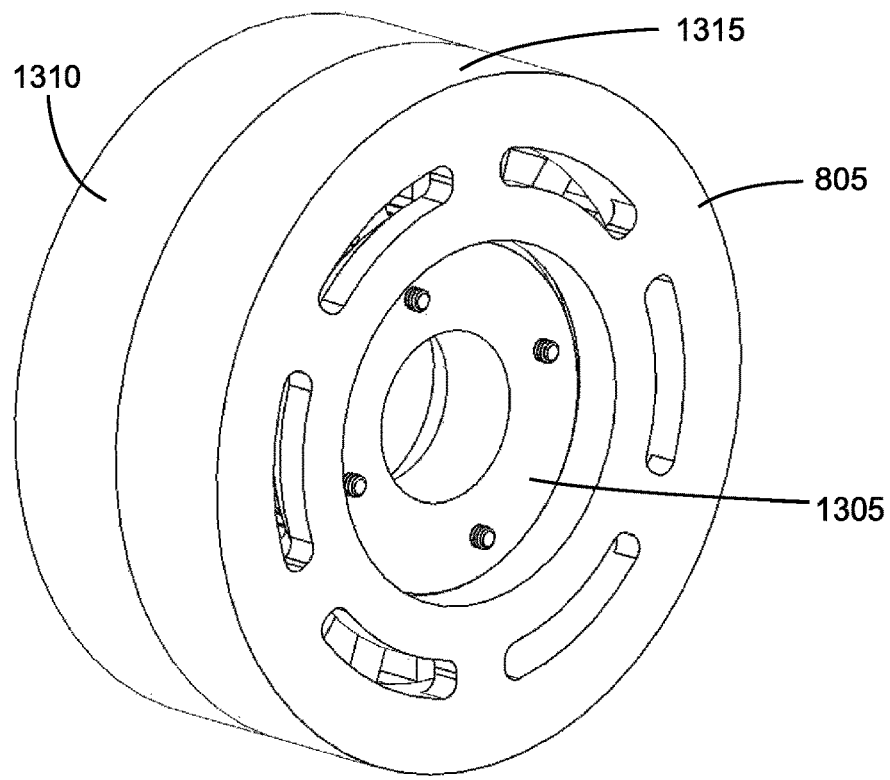
FIG. 14 is a rear perspective view of the electric motor.

As shown in FIGS. 13 and 14, the electric motor 805 like the previous examples includes a rotor 1305 that is eccentrically disposed inside a stator 1310. The drive shaft 1005 extends from the rotor 1305. The stator 1310 has a stator housing 1315.

Figure 15:
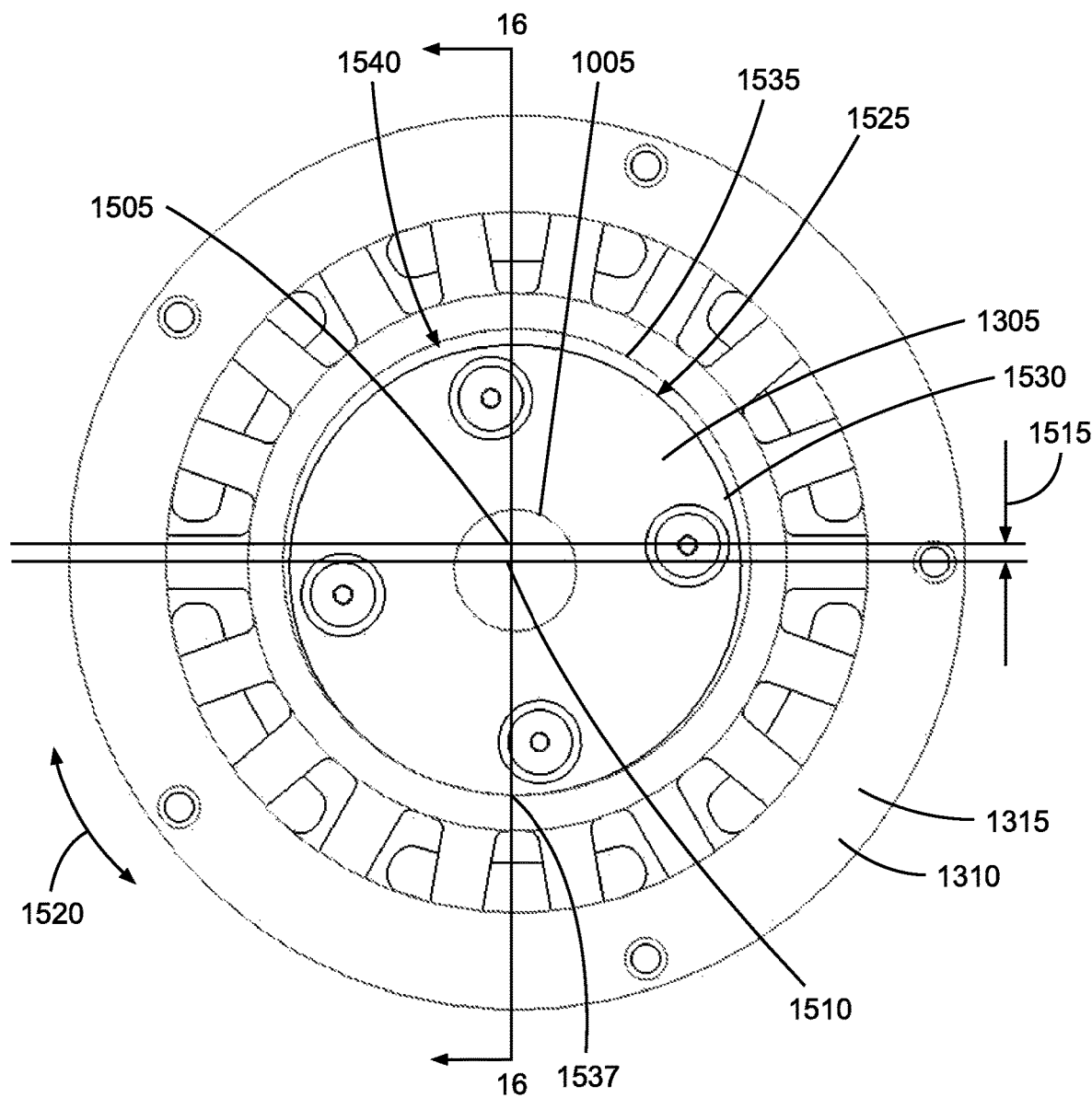
FIG. 15 is a partial cross-sectional view of the electric motor.

Referring to FIG. 15, the stator housing 1315 of the stator 1310 has a central stator axis 1505. The drive shaft 1005 of the rotor 1305 is located radially offset from the central stator axis 1505 so that the rotor 1305 is located in an eccentric manner relative to the stator 1310. As shown, the rotor 1305 has a rotor axis 1510 that is radially offset from the central stator axis 1505 by a throw or displacement distance 1515. As indicated by arrow 1520, the rotor 1305 is able to roll or otherwise move in a clockwise or counterclockwise direction within a rotor cavity 1525 defined in the stator housing 1315. The rotor 1305 has a rotor outer surface 1530 that contacts and rolls against a stator inner surface 1535 of the stator 1310. As shown, the rotor outer surface 1530 contacts the stator inner surface 1535 at a contact area 1537. Generally opposite the contact area 1537, a gap 1540 is formed between the rotor outer surface 1530 and stator inner surface 1535 such that the rotor 1305 is eccentrically disposed inside the stator 1310. In one example, this gap 1540 is greater than 1 mm.

Figure 16:
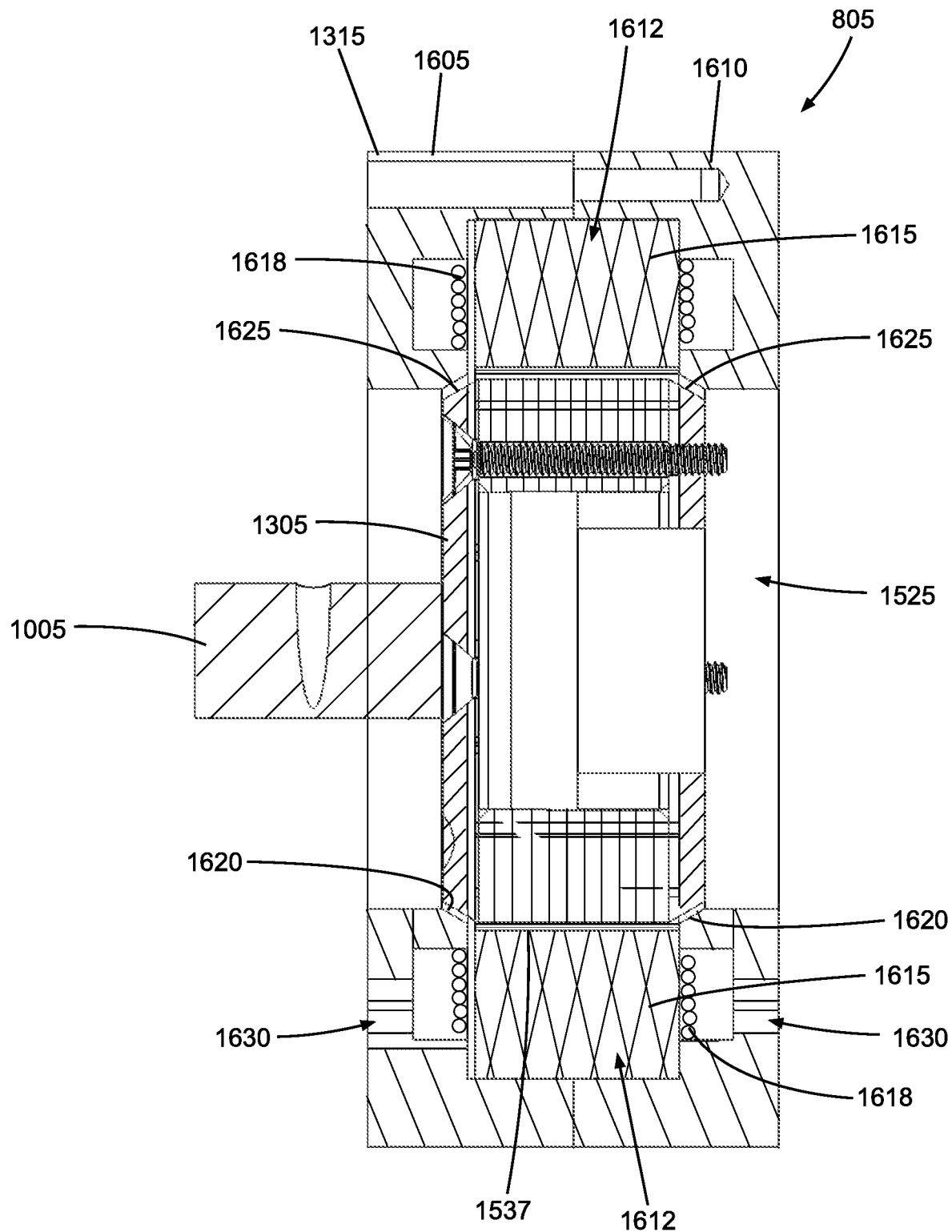
FIG. 16 is a cross-sectional view of the electric motor as taken along line 16-16 in FIG. 15.
Figure 17:
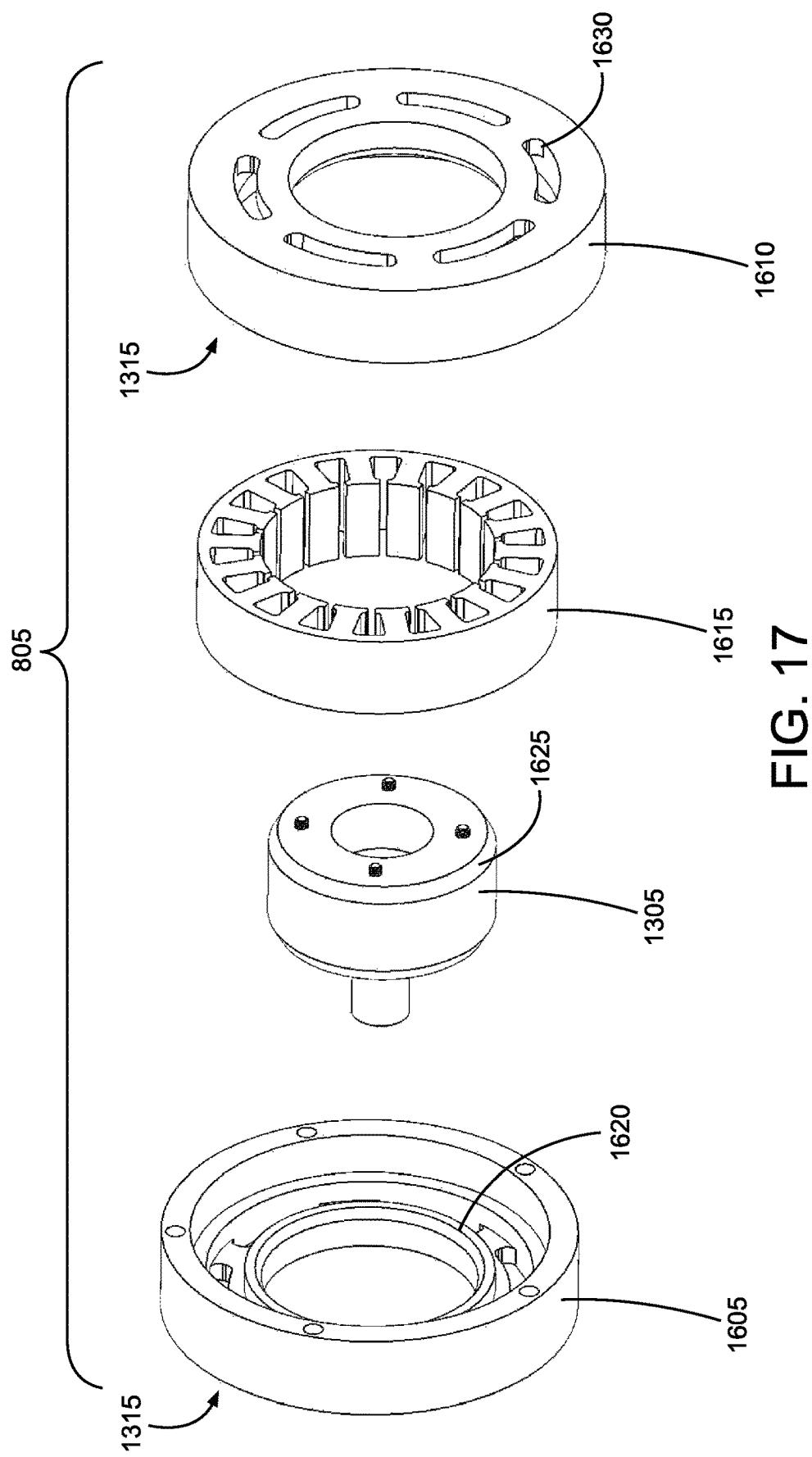
FIG. 17 is an exploded view of the electric motor.

The stator housing 1315 in FIGS. 16 and 17 includes a first housing shell 1605 and a second housing shell 1610 with the rotor 1305 generally sandwiched in between. Between the first housing shell 1605 and the second housing shell 1610, the stator 1310 has one or more electromagnets 1612 circumferentially arranged around the rotor cavity 1525. As illustrated, the electromagnets 1612 each include one or more cores 1615 and coils 1618 wrapped around corresponding cores 1615. In one example, the coils 1618 for all of the electromagnets 1612 are wrapped in the same direction (i.e., clockwise or counterclockwise) around the cores 1615 so that the electromagnets 1612 all have the same polarity. In another example, the neighboring coils 1618 around the circumference of the stator 1310 are wrapped in opposite manners (i.e., one clockwise and the other counterclockwise) forming polar pairs such that the electromagnets 1612 around the circumference of the stator 1310 have alternating polarities. Around the rotor cavity 1525, the first housing shell 1605 and second housing shell 1610 each have a stator raceway 1620 configured to guide the rotor 1305. As depicted, the stator raceways 1620 are angled to engage corresponding beveled edges 1625 when the rotor 1305 contacts the stator 1310 at the contact area 1537. In one form, the rotor outer surface 1530 directly contacts the stator inner surface 1535 at the contact area 1537. In other examples, the rotor 1305 is slightly spaced away from the stator inner surface 1535 at the contact area 1537 by 1 mm or less (at most 0.040 inches) to reduce the risk of wear and/or electrical shorts. For instance, the rotor 1305 can be spaced away from the stator 1310 at the contact area 1537 by an air gap and/or insulative material. To facilitate cooling of the electromagnets 1612, the stator housing 1315 defines one or more vent openings 1630 that promote air cooling of the coils 1618.

Figure 18:
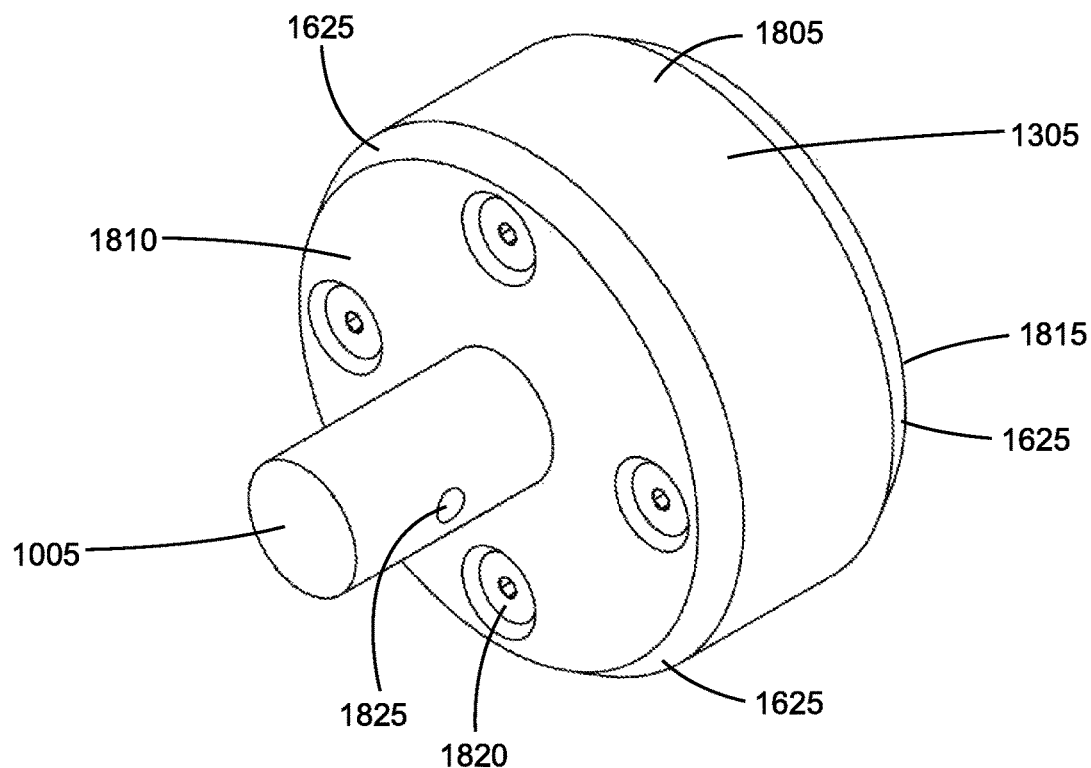
FIG. 18 is a perspective view of a rotor of the electric motor.
Figure 19:
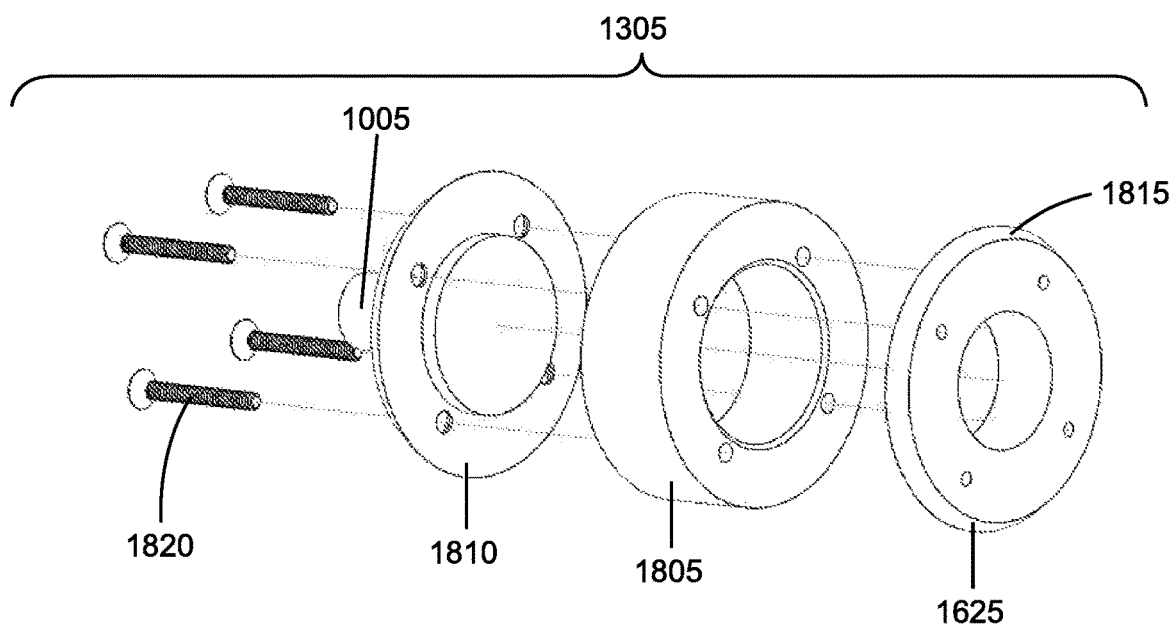
FIG. 19 is an exploded view of the rotor.

Turning to FIGS. 18 and 19, the rotor 1305 includes a rotor body 1805 that is sandwiched between a shaft cap 1810 and an end cap 1815. In one example, the rotor body 1805 is made of ferromagnetic, ferrimagnetic, and/or other materials that can be magnetized at least on a temporary basis. In one form, the winding of coils 1618 in the electric motor 805 is unique from traditional Direct Current (DC) motors in that pole pairs of coils 1618 in adjacent positions are wound in opposite manners along the stator 1310 to induce or create an electromagnetic force on a rotor body 1805 that does not use permanent magnets. In this example, the rotor body 1805 is made of metal, such as ferromagnetic and/or ferrimagnetic metals, but the rotor body 1805 does not have any permanent magnetic domains. In other words, the rotor 1305 does not include any permanent magnets. This differs from traditional motor windings, which position pole pairs on opposite sides of the stator. This halves the effective pole positions on the stator 1310 to allow use of a nonmagnetic rotor 1305. In other variations, the various domains or areas on the rotor body 1805 are induced or otherwise magnetic on a permanent or temporary basis. Neighboring magnetic areas in one example have alternating polarities. In another form, the rotor body 1805 includes permanent magnets with alternating polarities along the rotor outer surface 1530. As depicted, the drive shaft 1005 extends from the shaft cap 1810. In one form, the shaft cap 1810 and end cap 1815 are made of metal, such as steel. The shaft cap 1810 and end cap 1815 are joined to the rotor body 1805 via one or more fasteners 1820, but one or more of these components can be attached in other ways or integrally formed together as a single unit. The drive shaft 1005 has an adapter pin opening 1825 for receiving a fastener, like a screw or pin, to secure the planet-base adapter 1105 to the drive shaft 1005.

Figure 20:
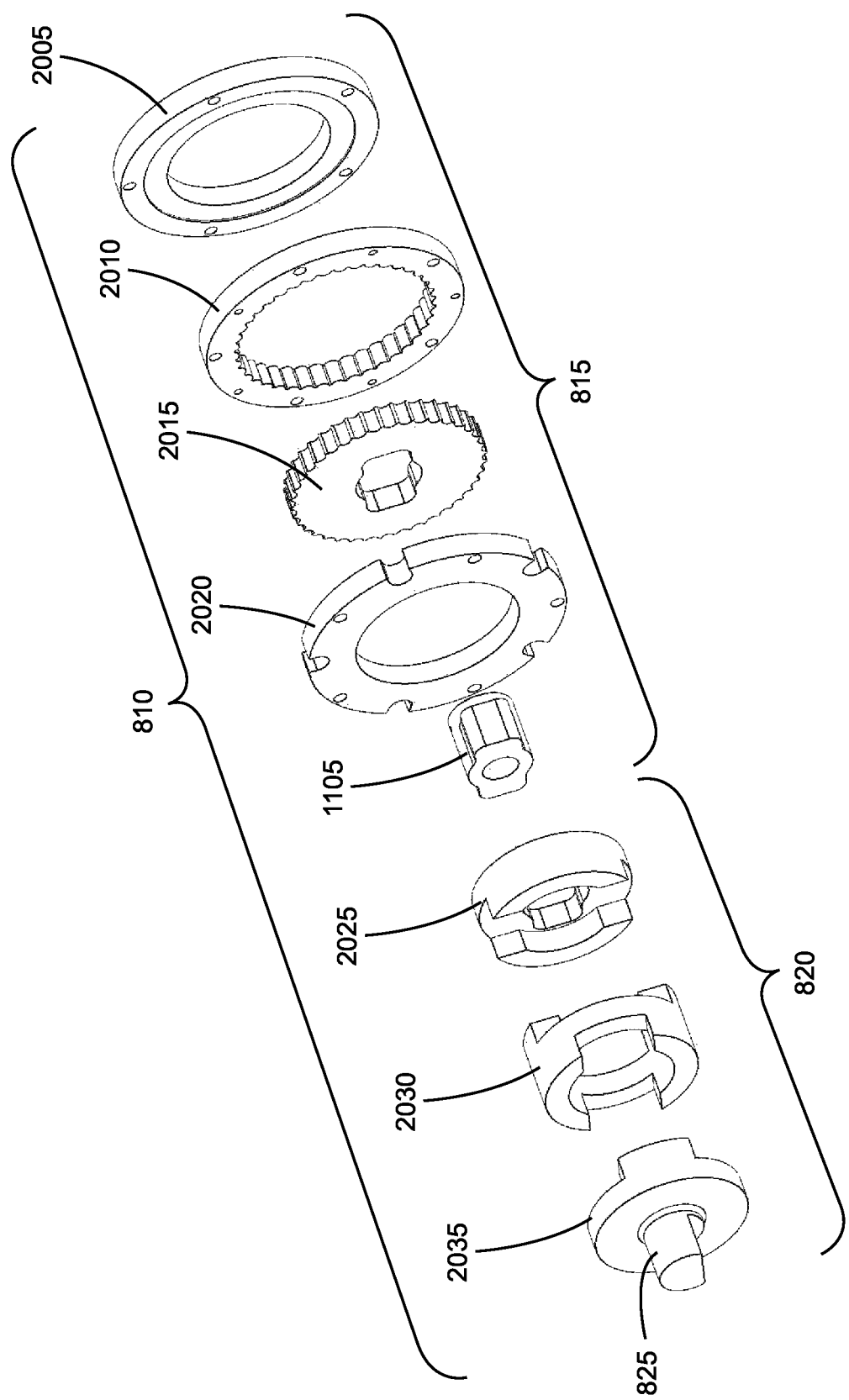
FIG. 20 is an exploded view of the transmission assembly.

The rotor 1305 and stator 1310 in the electric motor 805 operate in the same manner as the ones described before with respect to the FIG. 2 electric motor 200 and the FIG. 6 electric motor 600. For the sake of brevity and clarity, please refer to the previous descriptions of the FIG. 2 electric motor 200 and the FIG. 6 electric motor 600. As should be recognized, the drive shaft 1005 moves in an eccentric orbit like in the other motors. The transmission assembly 810 includes the indexing mechanism 815 to reduce the risk of detrimental rotational slippage between the rotor 1305 and the stator 1310. The transmission assembly 810 further includes the universal joint 820 to compensate for the eccentric motion of the rotor 1305. As depicted in FIG. 20, the indexing mechanism 815 includes a spacer 2005, a ring gear 2010, a planet gear 2015, a cover 2020, and the planet-base adapter 1105. The universal joint 820 includes a base link 2025, a mid-link 2030, and an output link 2035 with the output shaft 825.

Figure 21:
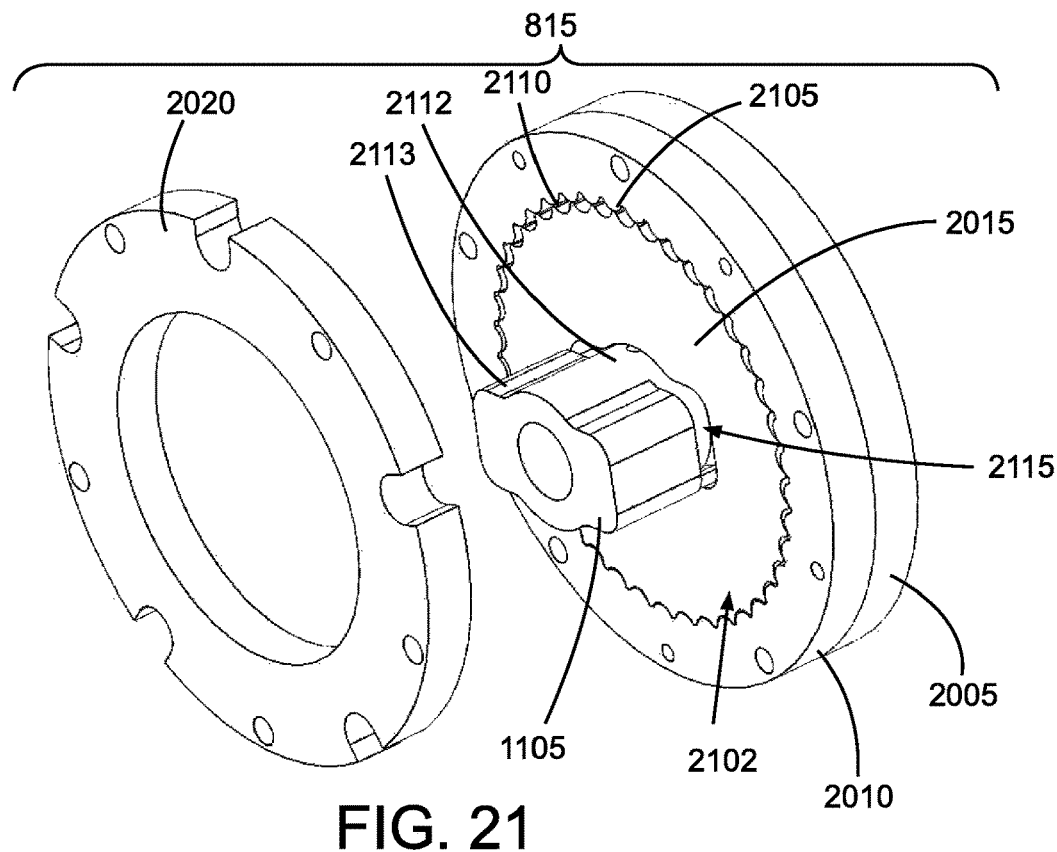
FIG. 21 is a front exploded view of an indexing mechanism of the transmission assembly.
Figure 22:
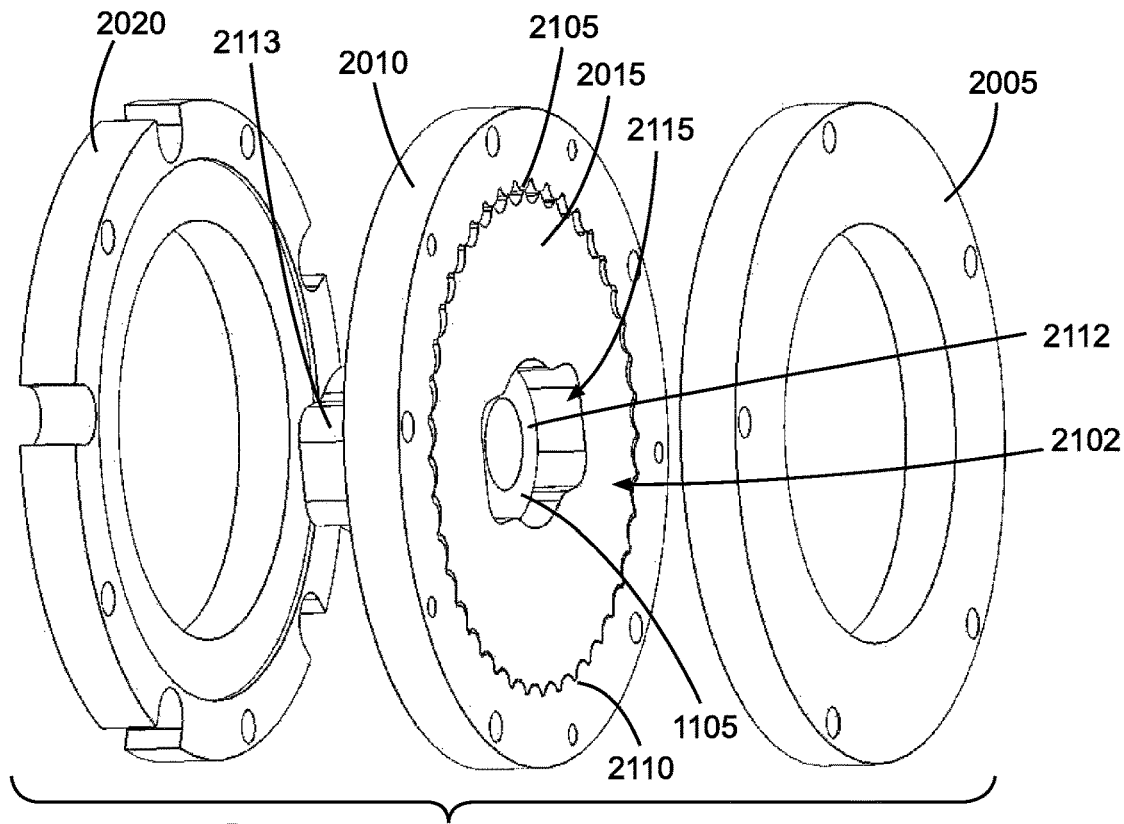
FIG. 22 is a rear exploded view of the indexing mechanism.

Looking now at FIGS. 21 and 22, the ring gear 2010 is sandwiched between the spacer 2005 and the cover 2020. The spacer 2005, ring gear 2010, and cover 2020 in one form are secured together with fasteners, like screws, but one or more of these components can be attached in other ways or integrally formed together as a single unit. The ring gear 2010 defines a planet gear cavity 2102 where the planet gear 2015 is disposed. Extending inside the planet gear cavity 2102, the ring gear 2010 has one or more ring teeth 2105 that engage planet teeth 2110 on the planet gear 2015. The planet-base adapter 1105 has an adapter body 2112 with one or more key tabs 2113 extending from the adapter body 2112. Once assembled, the key tabs 2113 are at least partially received in an adapter opening 2115 in the planet gear 2015 that is similarly shaped. The key tabs 2113 create a keying arrangement with the adapter opening 2115 of the planet gear 2015 such that the planet gear 2015 is generally locked to rotate in unison with the drive shaft 1005 of the electric motor 805.

Figure 23:
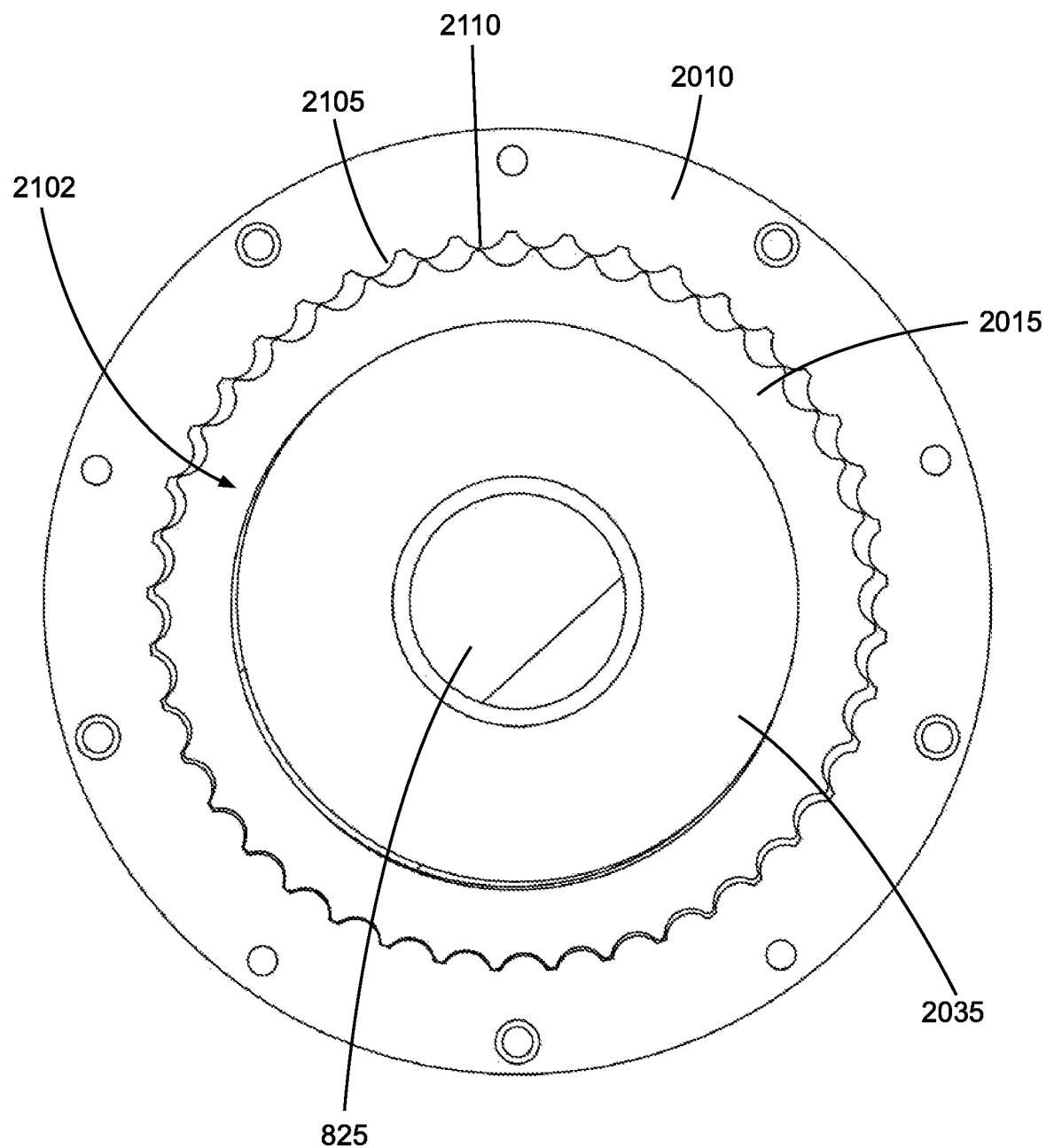
FIG. 23 is a front view of a planet gear received in a ring gear of the indexing mechanism.

With movement of the planet gear 2015 being generally locked with the eccentric movement of the rotor 1305, the planet gear 2015 moves with a similar eccentric motion, as is illustrated in FIG. 23. On one side of the planet gear cavity 2102, the planet teeth 2110 engage the ring teeth 2105, and on the opposite side, the planet teeth 2110 and ring teeth 2105 are separated to form a gap. Due to the high torques applied by the electric motor assembly 800, there is a risk that slippage can occur between the rotor 1305 and stator 1310 in the electric motor 805. With the ring teeth 2105 and planet teeth 2110 engaged or locked together, the risk of any detrimental slippage between the rotor 1305 and stator 1310 is reduced such that the electric motor assembly 800 is able to provide greater dynamic or static mechanical torques. In certain instances, such as in lower torque applications where the slippage risk is lower, the indexing mechanism 815 can be eliminated.

Figure 24:
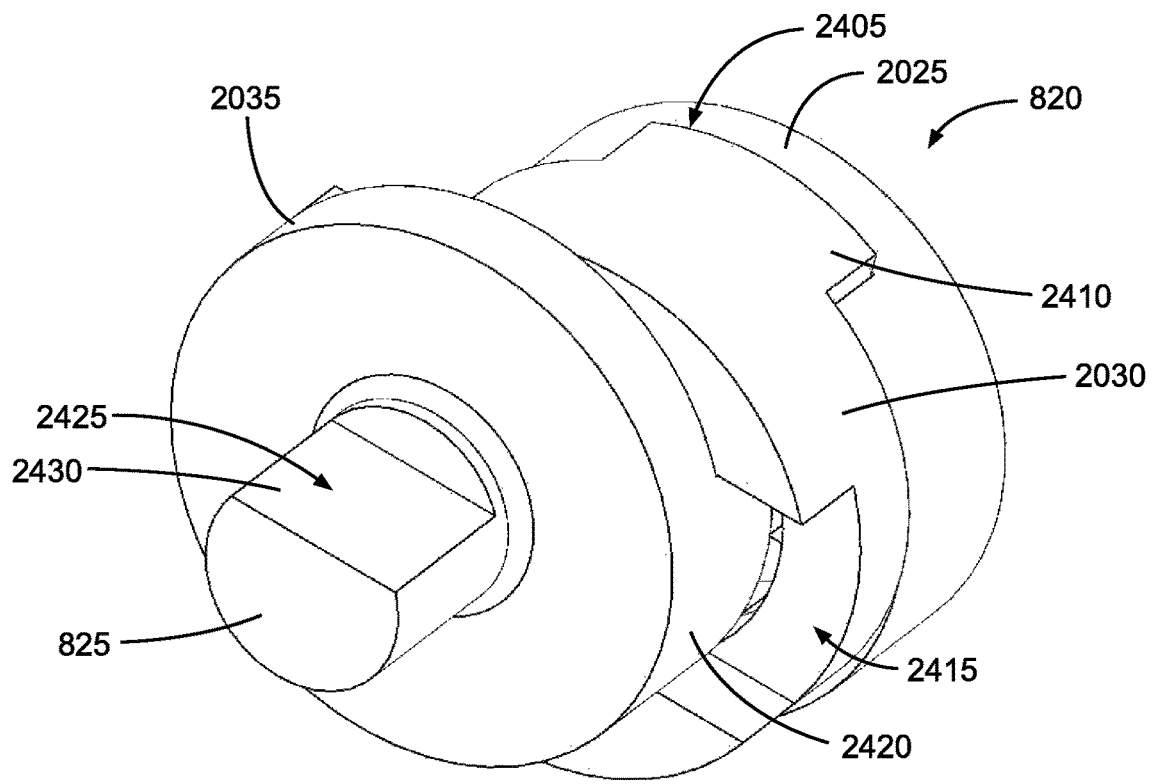
FIG. 24 is a perspective view of a universal joint of the FIG. 8 electric motor assembly.
Figure 25:
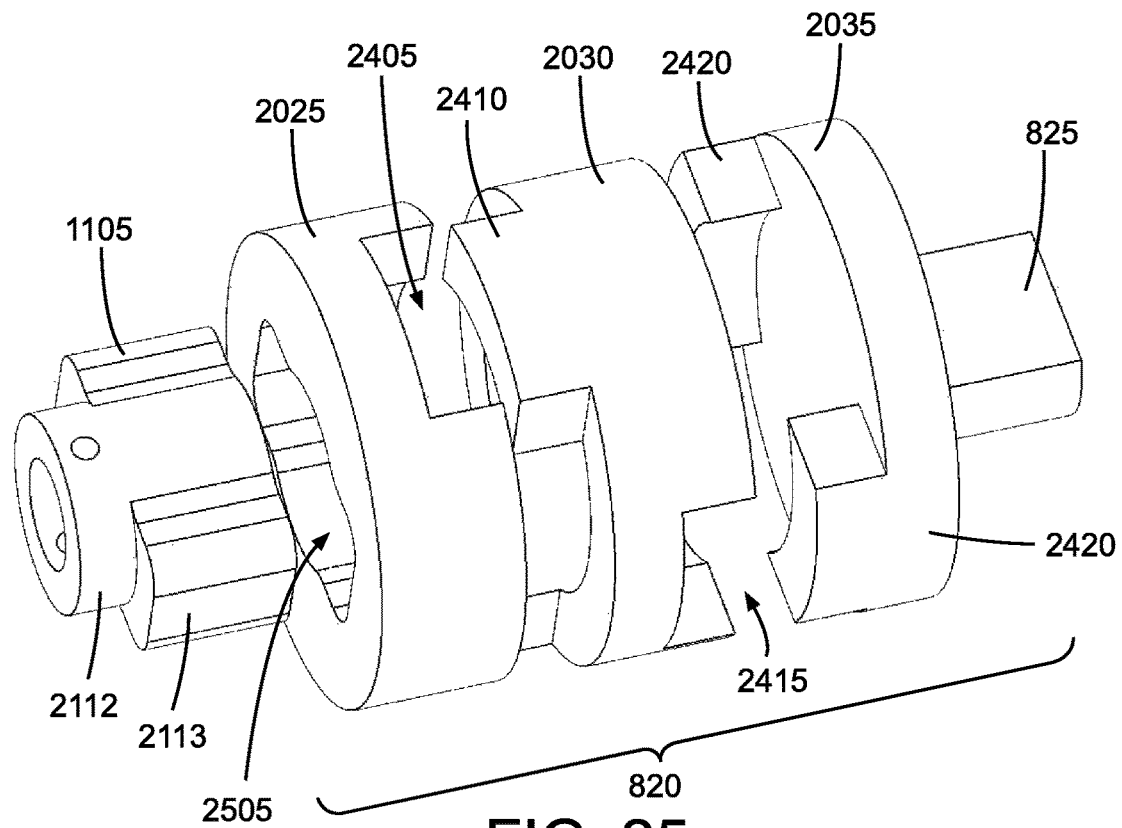
FIG. 25 is a rear exploded view of the universal joint.

Due to the eccentric motion of the electric motor 805, the electric motor assembly 800 includes the universal joint 820 that helps to ensure that the output shaft 825 rotates about the same general rotational axis as the mechanical load 120 and/or the central stator axis 1505 of the electric motor assembly 800. As shown in FIGS. 24 and 25, the base link 2025 of the universal joint 820 has one or more base link guide slots 2405. The mid-link 2030 has one or more mid-link guide tabs 2410 slidingly received in the base link guide slots 2405 of the base link 2025. On the side opposite the mid-link guide tabs 2410, the mid-link 2030 has one or more mid-link guide slots 2415 that face the output link 2035. The output link 2035 has one or more output link guide tabs 2420 slidingly received in the mid-link guide slots 2415 of the mid-link 2030. As can be seen, the mid-link guide tabs 2410 and mid-link guide slots 2415 of the mid-link 2030 are arranged in a transverse relationship (e.g., perpendicular orientation) relative to one another. Having this transverse relationship allows output shaft 825 of the output link 2035 to compensate in two dimensions or directions as the electric motor 805 through the planet-base adapter 1105 rotates the output shaft 825. As should be recognized, this arrangement is able to fully or partially remove the eccentric motion of the electric motor 805 from the output shaft 825. The output shaft 825 of the output link 2035 has a notch 2425 with a key surface 2430 that is shaped for transmitting torque to the mechanical load 120. In the illustrated example, the key surface 2430 is flat, but the output shaft 825 can be shaped differently to prevent slippage in other examples.

Looking at FIG. 25, the base link 2025 has a base adapter opening 2505 that is shaped to key with the key tabs 2113 of the planet-base adapter 1105 so that the torque from the electric motor 805 is transmitted to the base link 2025. Through the base link 2025, the mid-link 2030, and the output link 2035, the rotational movement and torque of the electric motor 805 is transferred to the output shaft 825. The combination of the indexing mechanism 815 and the universal joint 820 helps to minimize rotational slippage and compensates for the eccentric motion of the rotor 1305 in the electric motor 805. In applications where the eccentric motion is not a concern, such as for reciprocating motions, the universal joint 820 can be eliminated in certain forms. Alternatively or additionally, the indexing mechanism 815 can be eliminated for applications where rotational indexing or slippage inside the electric motor 805 is not a concern.

Figure 26:
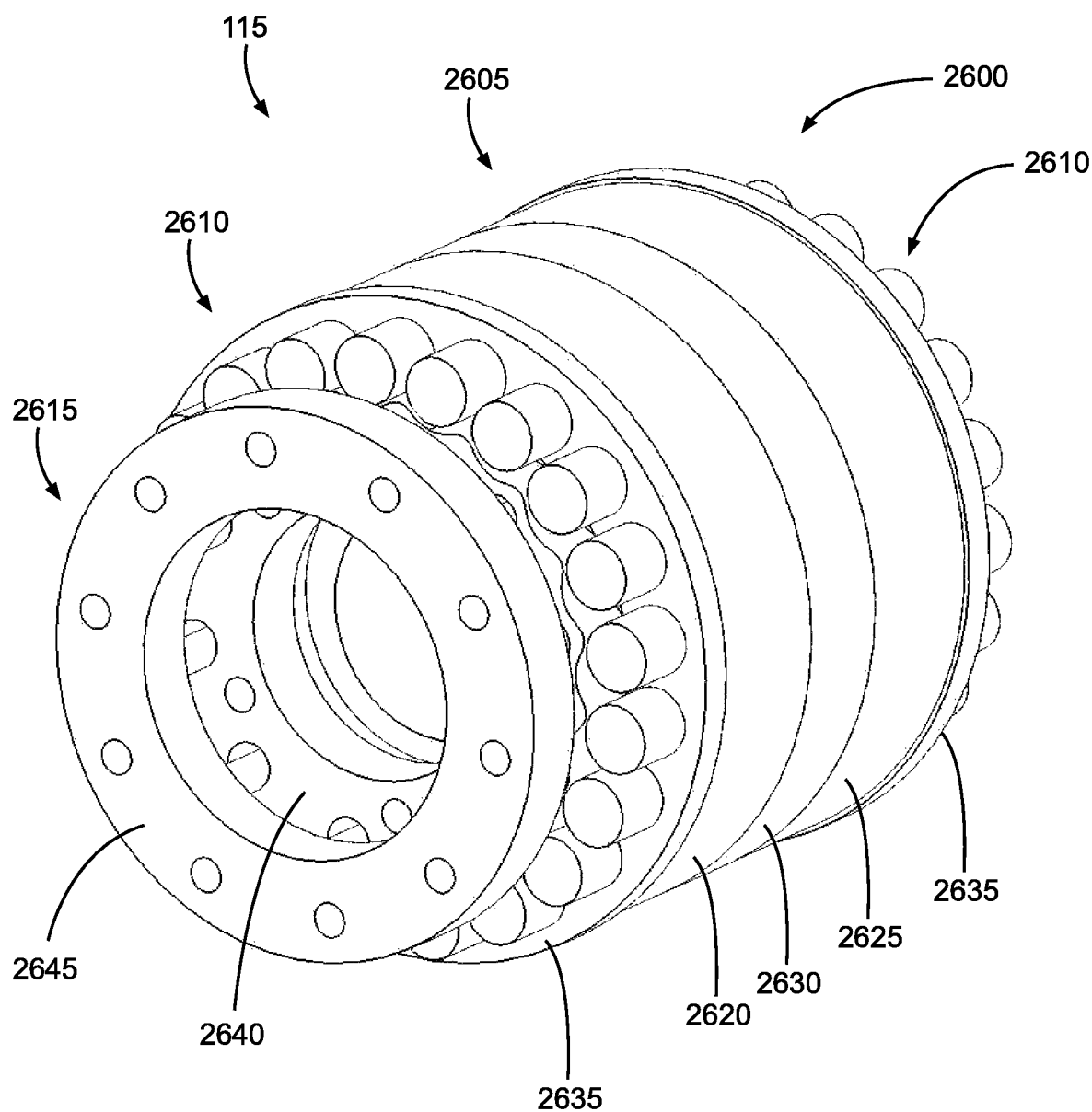
FIG. 26 is a front perspective view of an electric motor assembly that can be used in the FIG. 1 electric motor system.
Figure 27:
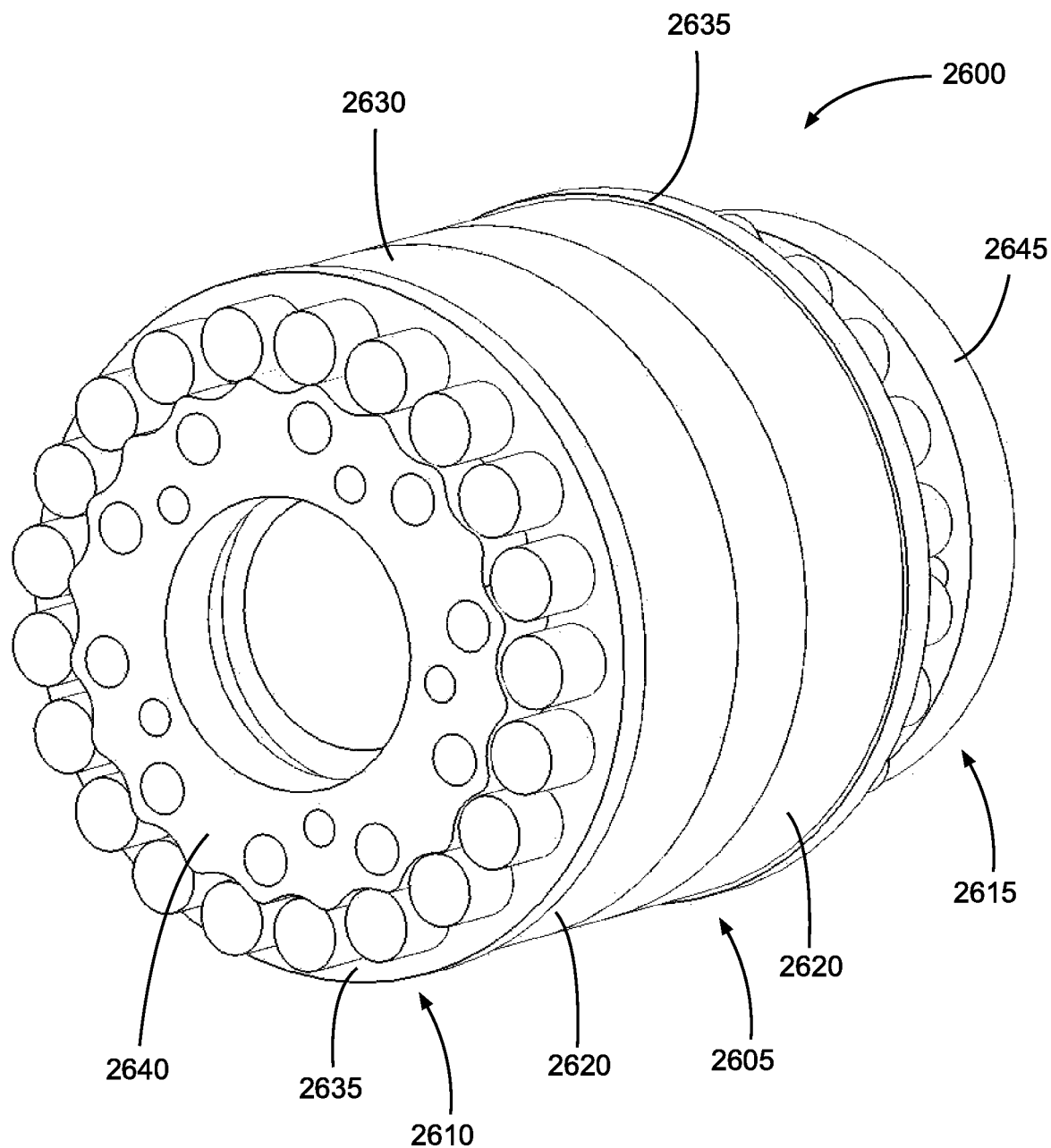
FIG. 27 is a rear perspective view of the electric motor assembly.

Another example of a dual lobe electric motor for the electric motor assembly 115 that can be used in the electric motor system 100 will now be described initially with reference to FIGS. 26 and 27. As shown, the electric motor assembly 115 in this example includes an electric motor assembly 2600. The electric motor assembly 2600 includes a drive section 2605, one or more indexing sections 2610, and an output section 2615. The drive section 2605 is sandwiched between the indexing sections 2610, and the output section 2615 is coupled to at least one of the indexing sections 2610.

As depicted, the drive section 2605 has a first electric motor lobe 2620 and a second electric motor lobe 2625 with a shield 2630 disposed between the first electric motor lobe 2620 and the second electric motor lobe 2625. Once more, having both the first electric motor lobe 2620 and the second electric motor lobe 2625 helps to provide a smoother mechanical output as motion of the first electric motor lobe 2620 and the second electric motor lobe 2625 counter one another so as to balance each other out. In other examples, the electric motor assembly 2600 can include more than two lobes so as to further smooth the output as well as to provide greater torque. In a general, the greater number of electric motor lobes helps to reduce the number of torque or power dead spots produced by the electric motor assembly 2600. The shield 2630 spaces apart and shields the first electric motor lobe 2620 and second electric motor lobe 2625 from one another so as to reduce electromagnetic interference. In one form, the shield 2630 is made of conductive or magnetic materials, such as copper and/or steel, to help minimize propagation of the electromagnetic fields between the first electric motor lobe 2620 and the second electric motor lobe 2625.

In the illustrated example, the indexing sections 2610 are located at both ends of the drive section 2605. In other examples, the electric motor assembly 2600 includes only a single indexing section 2610. As can be seen, each of the indexing sections 2610 include a ring gear 2635 and the planet gear 2640. The ring gear 2635 and the planet gear 2640 engage one another to ensure proper indexing of the drive section 2605. The output adapter 2645 is loosely coupled to the output adapter 2645. With this loose coupling, the output adapter 2645 acts a universal joint to remove the eccentric motion out of the final mechanical output of the electric motor assembly 2600. The output adapter 2645 is configured to directly or indirectly connect to the mechanical load 120.

Figure 28:
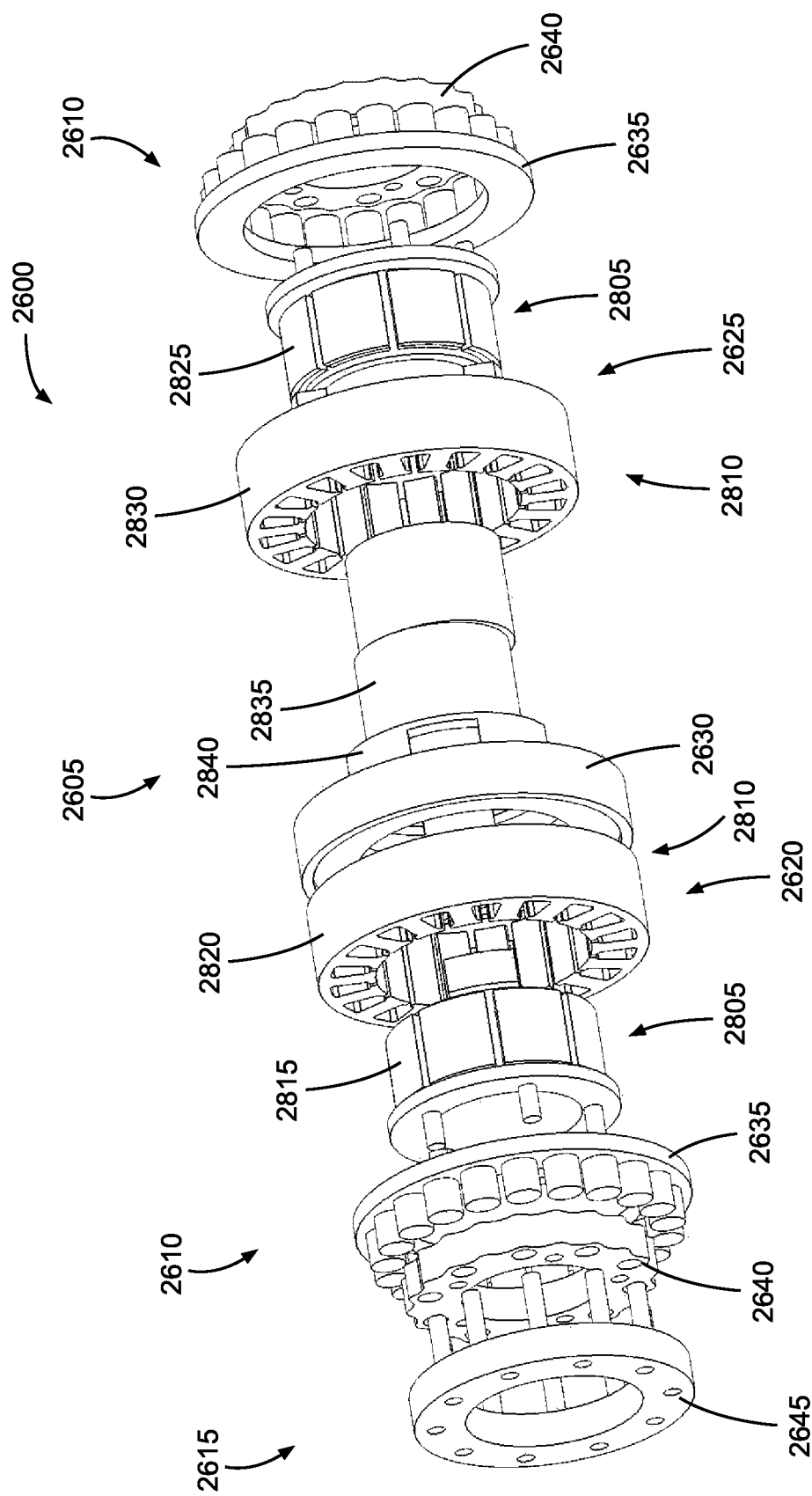
FIG. 28 is a front exploded view of the electric motor assembly.
Figure 29:
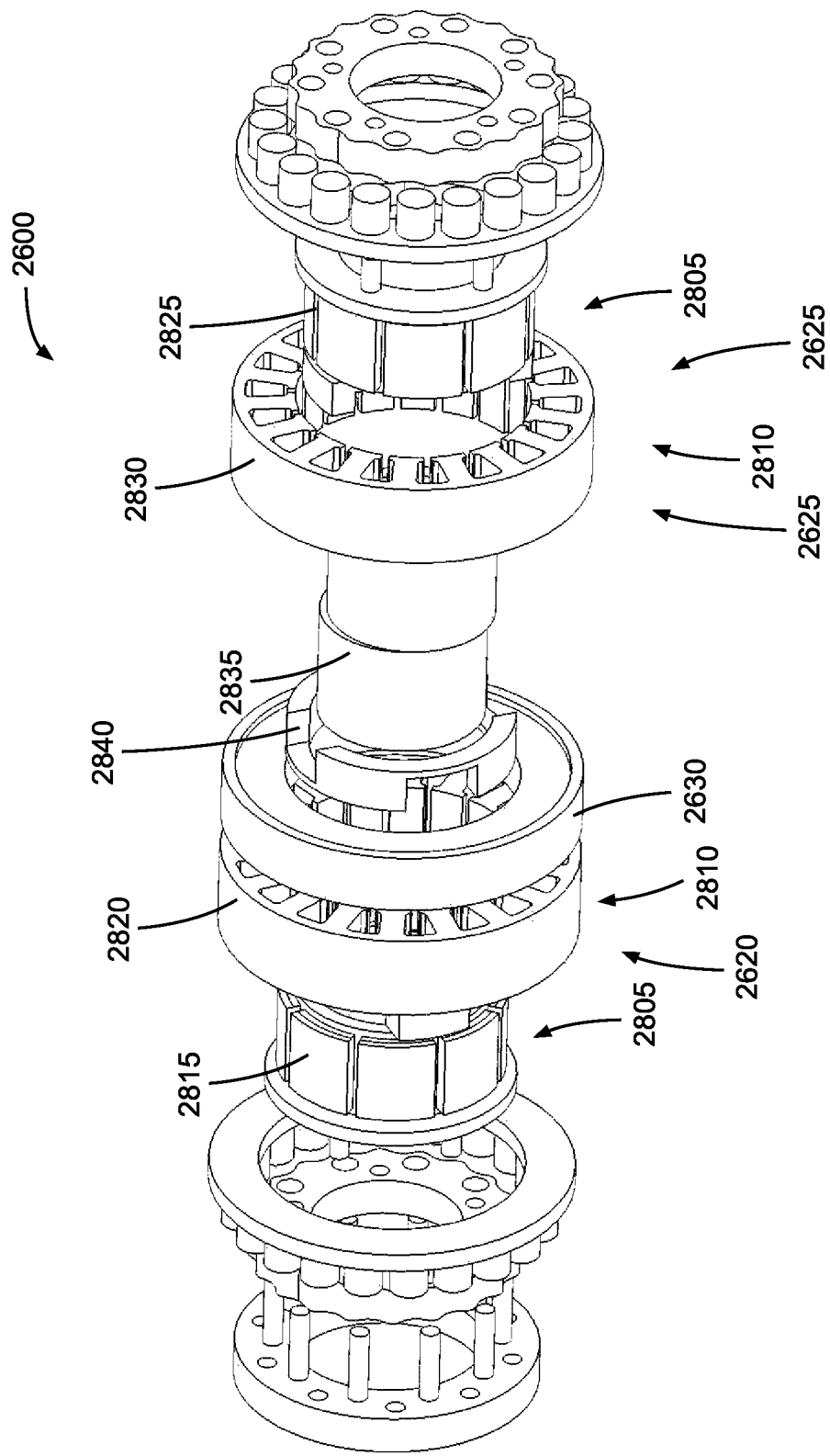
FIG. 29 is a rear perspective view of the electric motor assembly.

Turning to FIGS. 28 and 29, the first electric motor lobe 2620 and second electric motor lobe 2625 each include a rotor 2805 and a stator 2810. The first electric motor lobe 2620 has a first rotor 2815 received inside a first stator 2820, and the second electric motor lobe 2625 has a second rotor 2825 received inside a second stator 2830. As will be explained in greater detail below, the first electric motor lobe 2620 in one example acts as a southern pole electric motor in which the first rotor 2815 has the southern pole magnetic ends facing the first stator 2820, and the second electric motor lobe 2625 acts as a northern pole electric motor in which the second rotor 2825 has the northern pole magnetic ends facing the second stator 2830. The first rotor 2815 and second rotor 2825 can have different polarities and/or different pole arrangements in other examples. As depicted, the first rotor 2815 and second rotor 2825 are received around a crankshaft 2835. The first rotor 2815 and second rotor 2825 are mechanically coupled to one another through a mid-link 2840.

Figure 30:
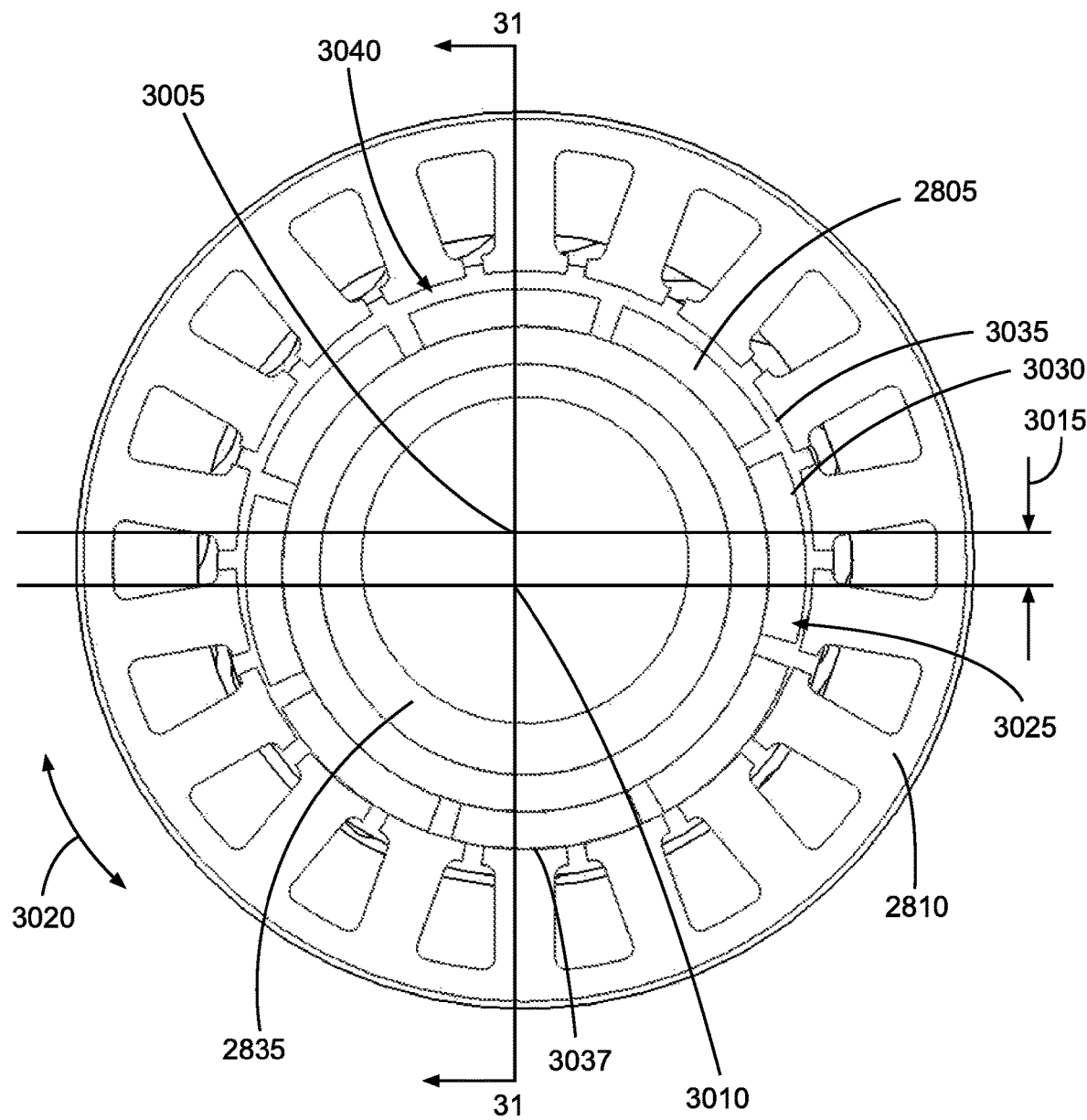
FIG. 30 is a partial cross-sectional view of the electric motor assembly.
Figure 31:
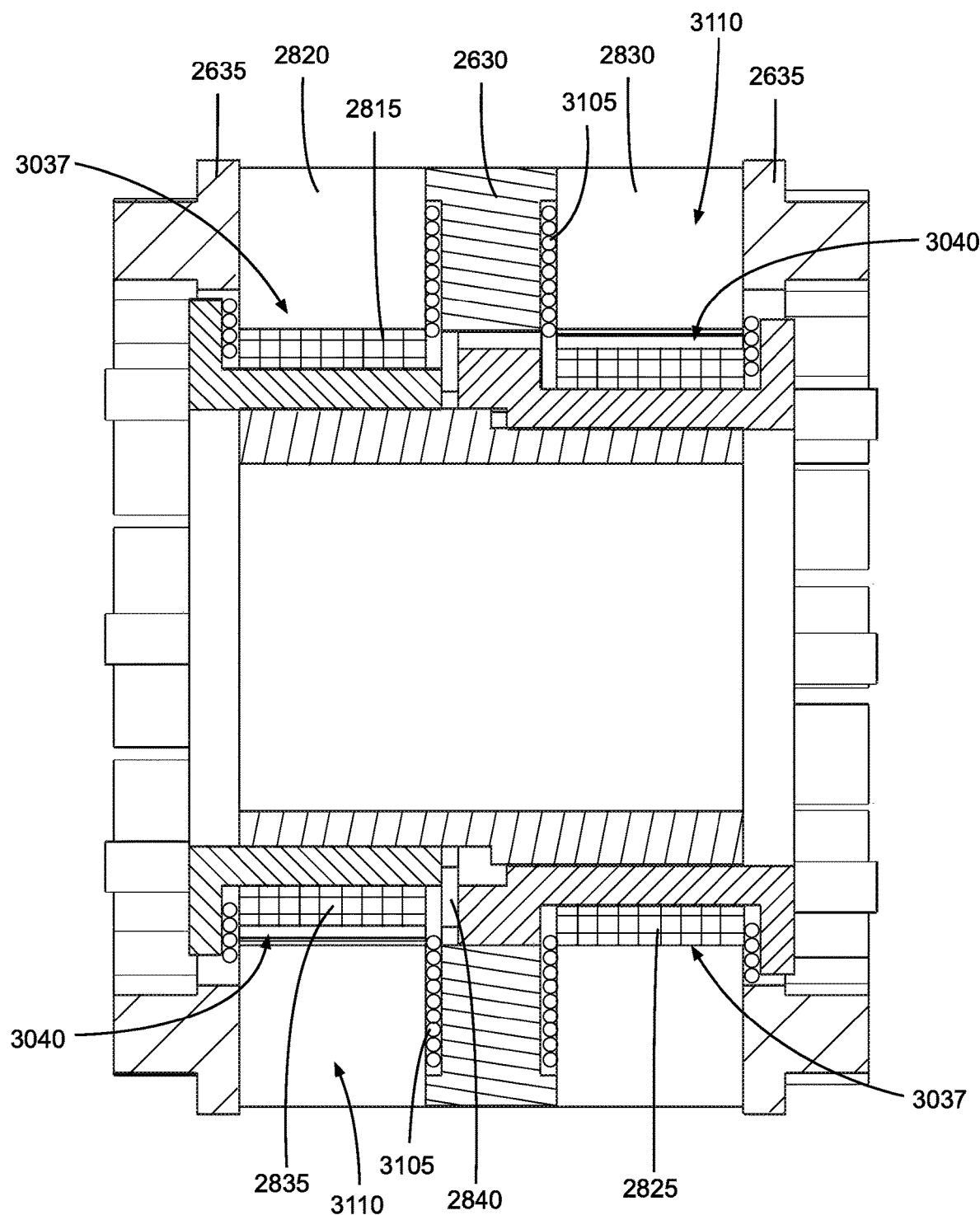
FIG. 31 is a perspective view of the electric motor assembly.

Referring now to FIGS. 30 and 31, the first electric motor lobe 2620 and second electric motor lobe 2625 operate in a similar fashion, but the rotor 2805 in each has a different stroke position relative to the crankshaft 2835 so that the motion of the first rotor 2815 and second rotor 2825 generally balance each other out. FIG. 30 shows the position of the rotor 2805 relative to the stator 2810 that can apply to both the first electric motor lobe 2620 and the second electric motor lobe 2625. As can be seen, the rotor 2805 is eccentrically oriented relative to the stator 2810. The stator 2810 has a central stator axis 3005, and the rotor 2805 has a rotor axis 3010. Like in the previously described examples, the rotor axis 3010 of the rotor 2805 is located radially offset from the central stator axis 3005 of the stator 2810 by a displacement distance 3015.

As indicated by arrow 3020, the rotor 2805 is able to roll or otherwise move in a clockwise or counterclockwise direction within a rotor cavity 3025 defined in the stator 2810. The rotor 2805 has a rotor outer surface 3030 that contacts and rolls against a stator inner surface 3035 of the stator 2810. As illustrated in FIGS. 30 and 31, the rotor outer surface 3030 contacts the stator inner surface 3035 at a contact area 3037. Generally opposite the contact area 3037, a gap 3040 is formed between the rotor outer surface 3030 and stator inner surface 3035 such that the rotor 2805 is eccentrically disposed inside the stator 2810. In one example, this gap 3040 is greater than 1 mm. Generally speaking, the rotor 2805 in rolls inside against the stator 2810 of the first electric motor lobe 2620 and second electric motor lobe 2625 in an eccentric manner. In one form, the rotor 2805 directly contacts the stator 2810 at the contact area 3037. In other examples, the rotor 2805 is slightly spaced away from the stator 2810 at the contact area 3037 by 1 mm or less (at most 0.040 inches) to reduce the risk of wear and/or electrical shorts. This spacing can be in the form of an air gap and/or insulation material.

Figure 32:
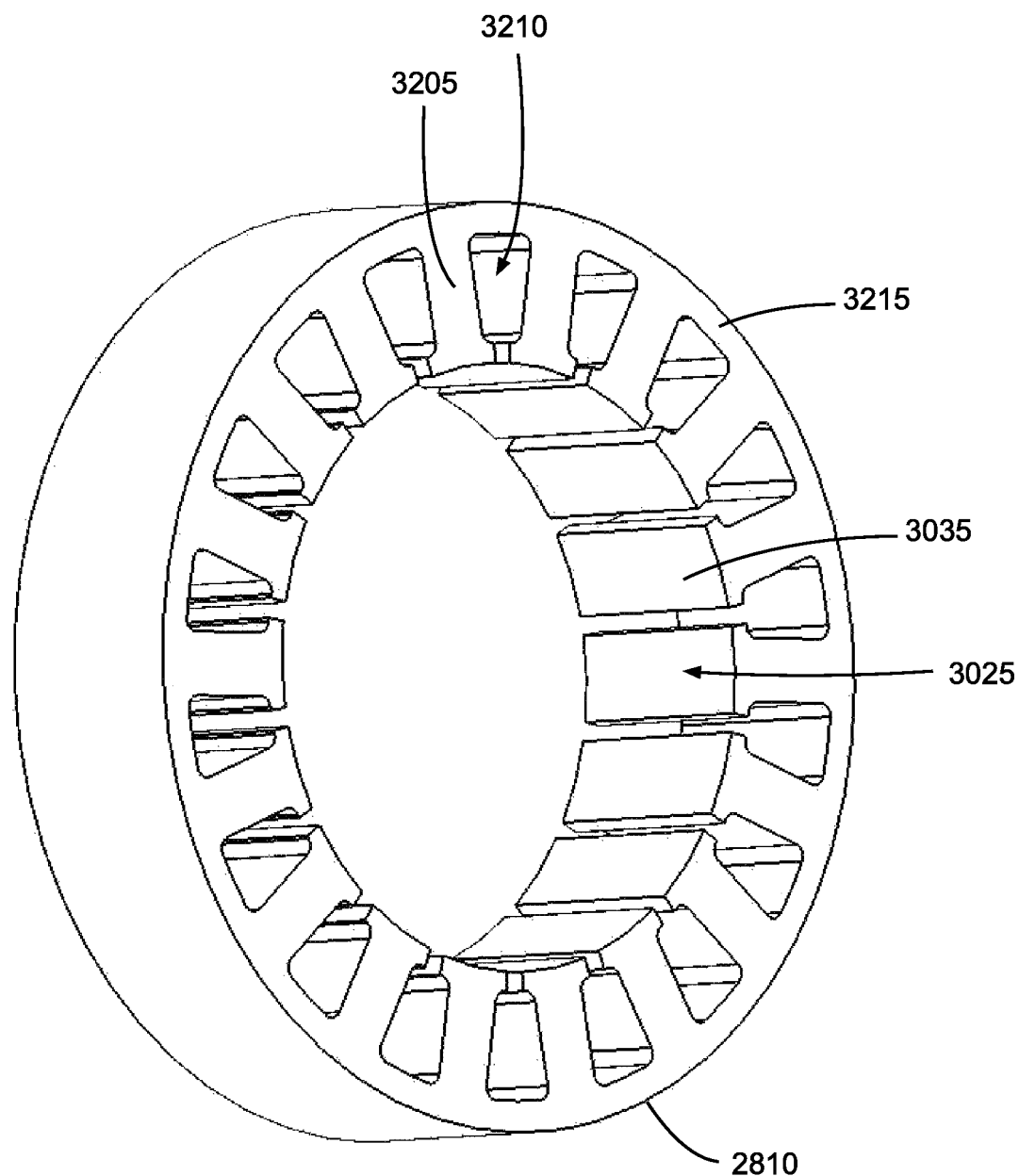
FIG. 32 is a perspective view of a stator of the FIG. 26 electric motor assembly.

As shown in FIG. 31, the first stator 2820 and second stator 2830 each have one or more coils 3105 that form one or more electromagnets 3110. Looking at FIG. 32, the stator 2810 has one or more core members 3205 around which the coils 3105 are wrapped to form the electromagnets 3110. Between the core members 3205, the stator 2810 has one or more coil cavities 3210 where the coils 3105 are received. The core members 3205 extend in an inner radial direction from a core ring 3215. The ends of the core members 3205 opposite of the core ring 3215 have a T-shape end forming the stator inner surface 3035 that surrounds the rotor cavity 3025. In other examples, the stator inner surface 3035 can be covered with an insulative material to reduce the risk of any shorting as well as to minimize wear. In one example, the coils 3105 for all of the electromagnets 3110 are wrapped in the same direction (i.e., clockwise or counterclockwise) around the core members 3205 so that the electromagnets 3110 all have the same polarity facing the rotor 2805 when the same current is applied. In another example, the neighboring coils 3105 around the circumference of the stator 2810 are wrapped in opposite manners (i.e., one clockwise and the other counterclockwise) such that the ends of the electromagnets 3110 around circumference of the stator 2810 have alternating polarities (i.e., polarity pairs) when the same current is applied.

Figure 33:
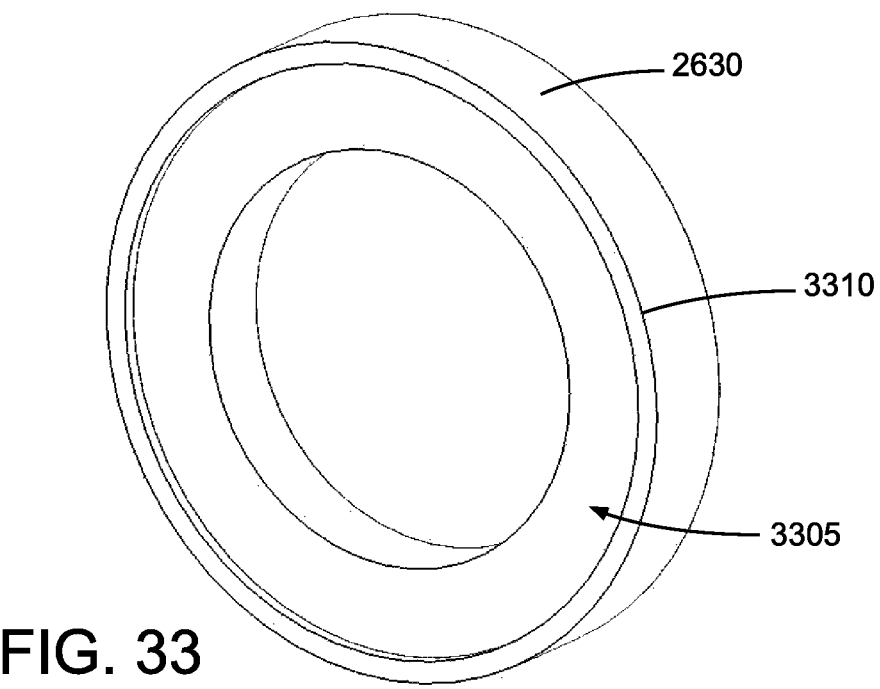
FIG. 33 is a front perspective view of a shield of the FIG. 26 electric motor assembly.
Figure 34:
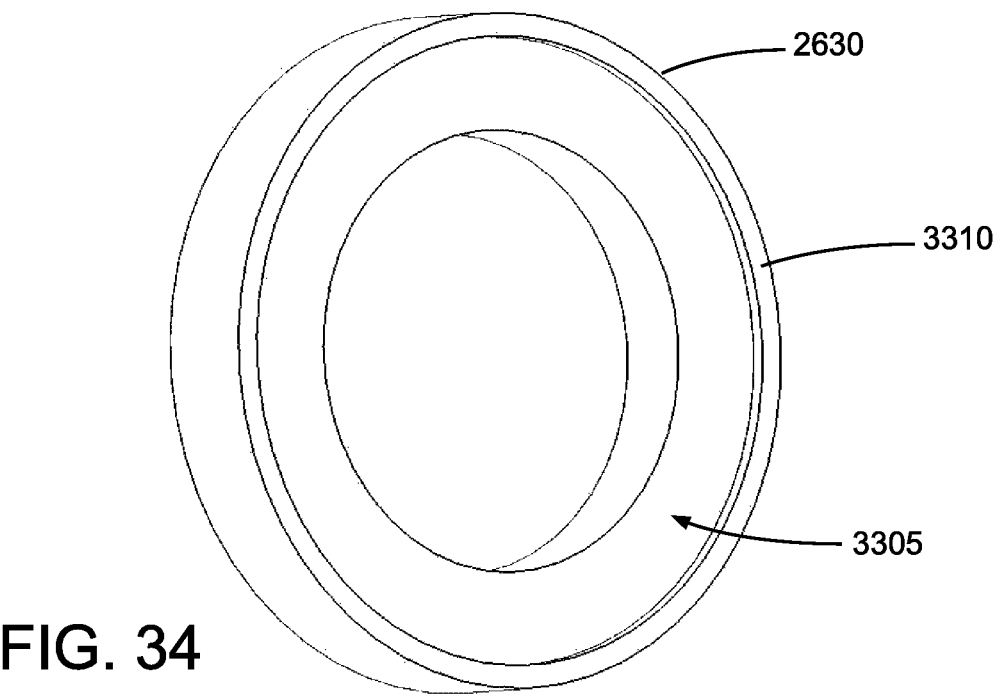
FIG. 34 is a rear perspective view of the shield.

The shield 2630 electromagnetically shields the first electric motor lobe 2620 from the second electric motor lobe 2625 so as to reduce the risk of any interference. The shield 2630, as is shown in FIGS. 33 and 34, has a ring shape. The shield 2630 has a spacer groove 3305 on each side that forms a space for receiving the coils 3105. As can be seen, a rim flange 3310 surrounds the spacer groove 3305.

Figure 35:
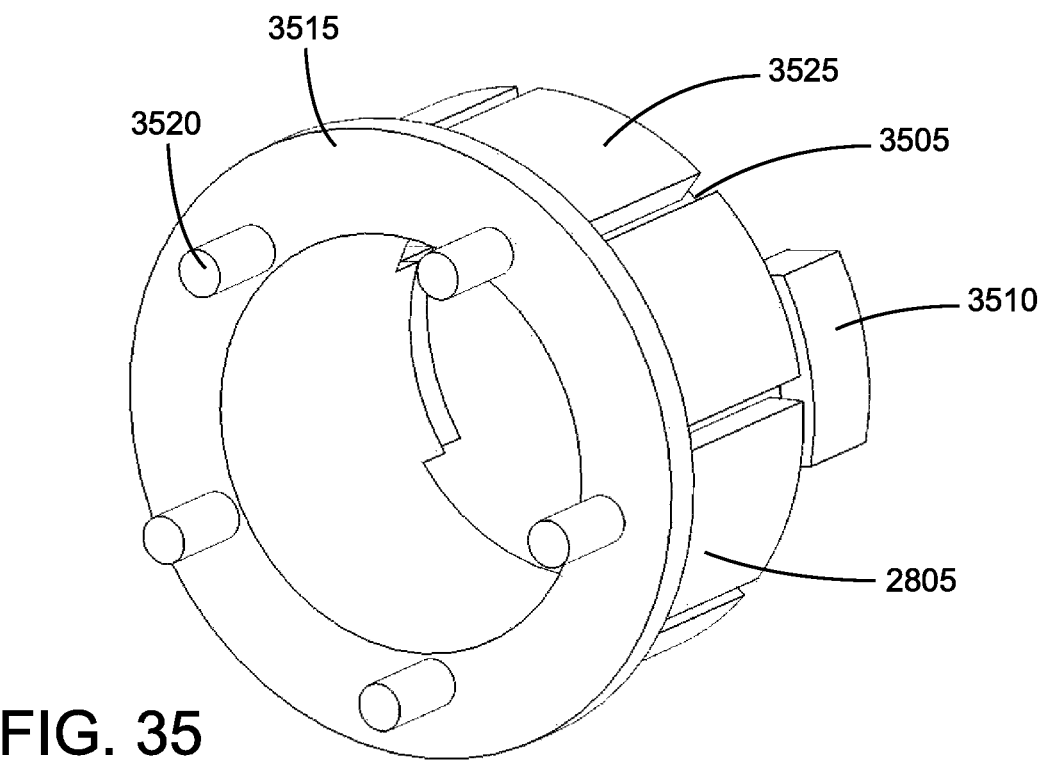
FIG. 35 is a front perspective view of a rotor of the FIG. 26 electric motor assembly.
Figure 36:
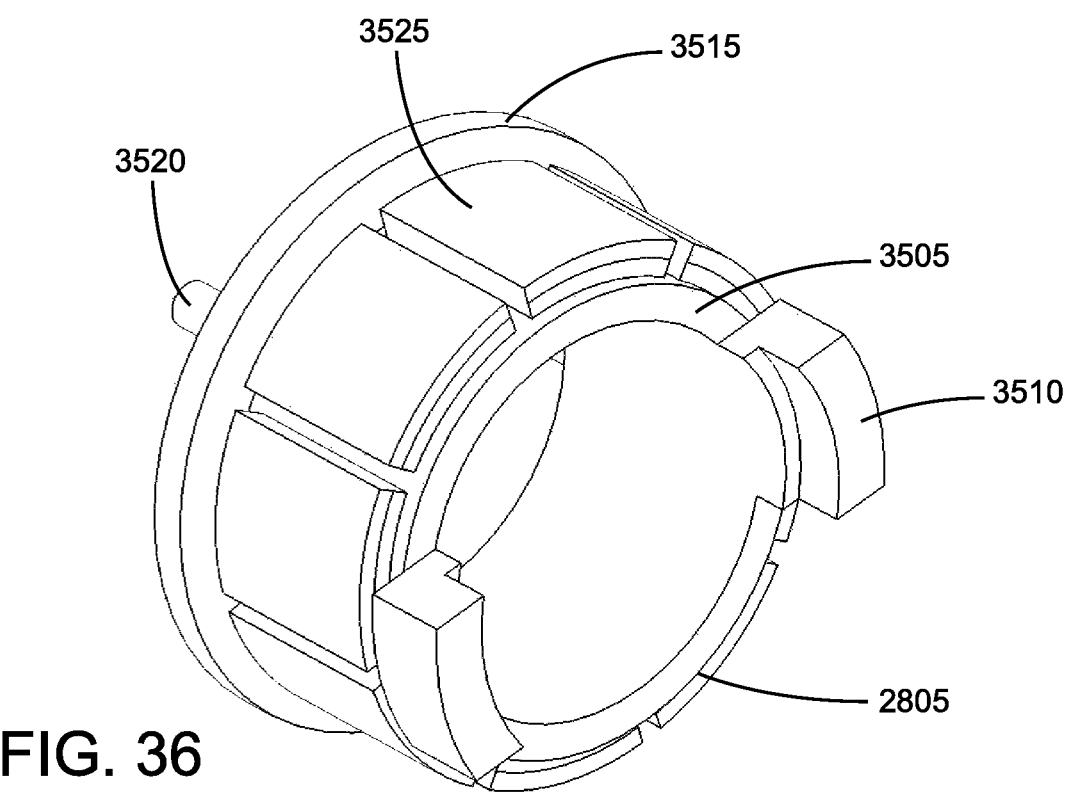
FIG. 36 is a rear perspective view of the rotor.

With the exception of the magnetic orientations, the first rotor 2815 and the second rotor 2825 have the same structure. As can be seen in FIGS. 35 and 36, the rotor 2805 for both the first electric motor lobe 2620 and second electric motor lobe 2625 has a rotor body 3505, one or more rotor guide tabs 3510 extending longitudinally from the rotor body 3505 at one end, and a rotor flange 3515 extending radially from the opposite end of the rotor body 3505. The rotor guide tabs 3510 are configured to mechanically link the rotor 2805 to the mid-link 2840 in a sliding manner. The rotor flange 3515 is designed to position and align the rotor 2805 within the stator 2810. As shown, one or more gear pins 3520 extend longitudinally from the rotor flange 3515. The gear pins 3520 are designed to engage with the planet gear 2640 so as to transmit torque from the rotor 2805 to the planet gear 2640.

Around the rotor body 3505, the rotor 2805 has one or more permanent magnets 3525. In the illustrated example, the permanent magnets 3525 have the same shape/dimensions and are generally evenly spaced from one another around the circumference of the rotor body 3505. The permanent magnets 3525 in other examples can be spaced differently, have different shapes, and/or have different dimensions from one another. In one example, the permanent magnets 3525 on each rotor 2805 have the same polarity facing the corresponding stator 2810. In other words, all of the permanent magnets 3525 on the particular rotor 2805 have the same pole (i.e., north or south pole) facing radially outward. The permanent magnets 3525 in both the first rotor 2815 and second rotor 2825 can have the same polarity arrangements or different polarity arrangements. For instance, the first rotor 2815 in one specific variation has permanent magnets 3525 with south poles facing outwards so as to make the first rotor 2815 a south type rotor, and the second rotor 2825 in one variation has permanent magnets 3525 with north poles facing outwards so as to make the first rotor 2815 a north type rotor. In other variations, the permanent magnets 3525 on the rotors 2805 do not have the same radial polarity arrangements. For example, the permanent magnets 3525 on each rotor 2805 can have alternating or other different polarity patterns around the circumference.

Figure 37:
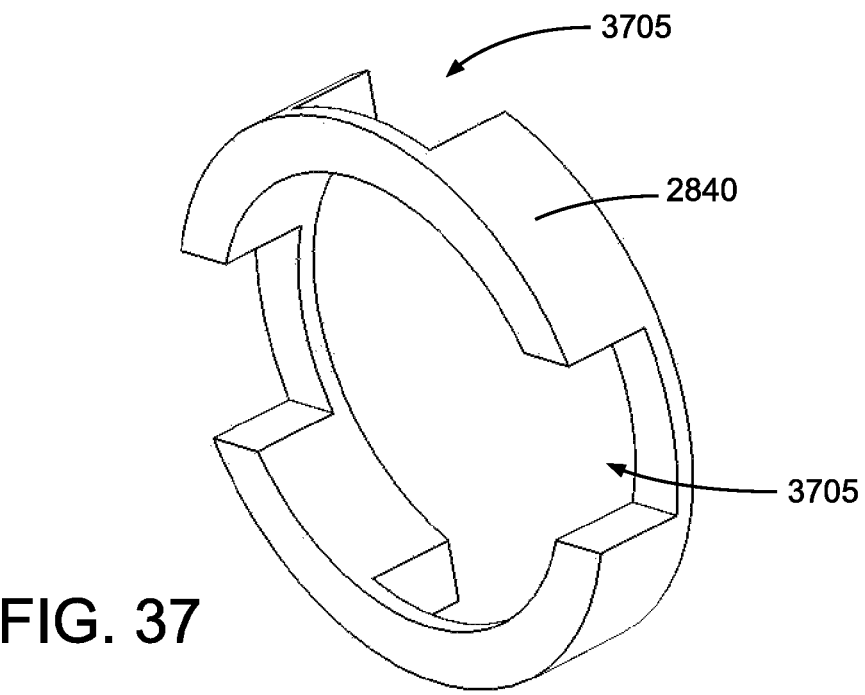
FIG. 37 is a front perspective view of a mid-link of the FIG. 26 electric motor assembly.
Figure 38:
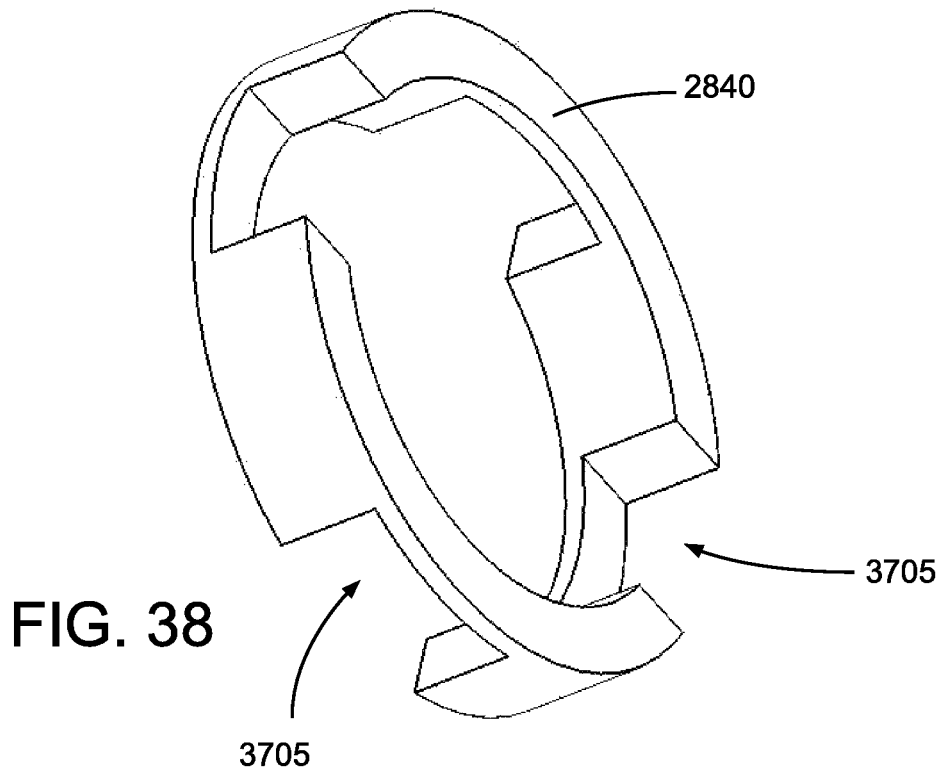
FIG. 38 is a rear perspective view of the mid-link.
Figure 39:
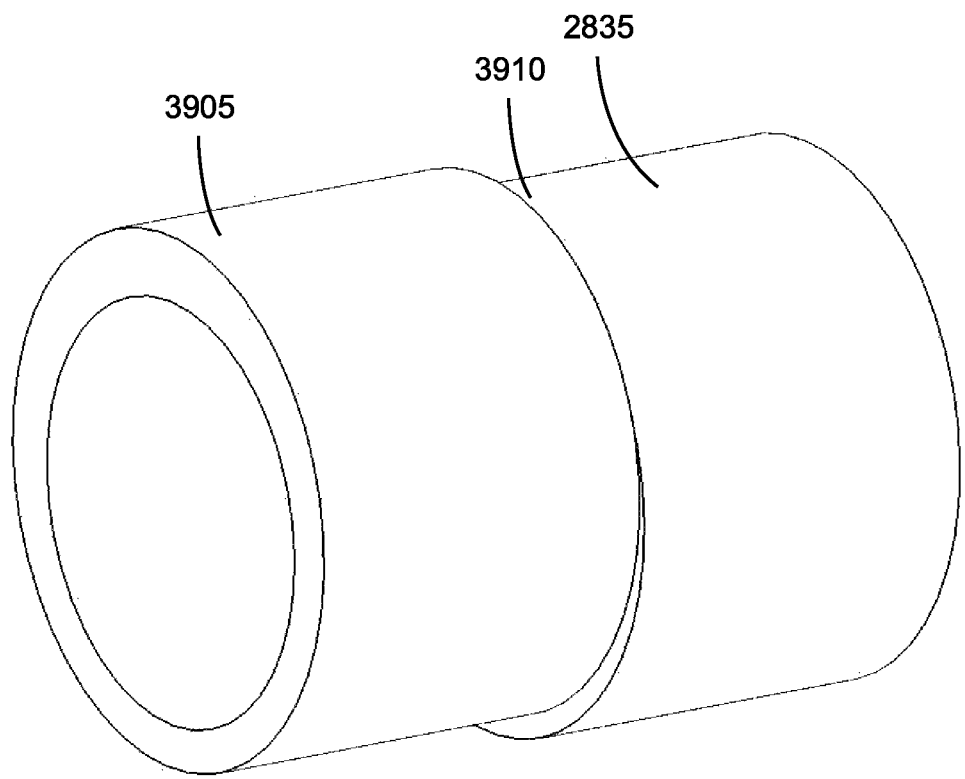
FIG. 39 is a perspective view of a crankshaft of the FIG. 26 electric motor assembly.
Figure 40:
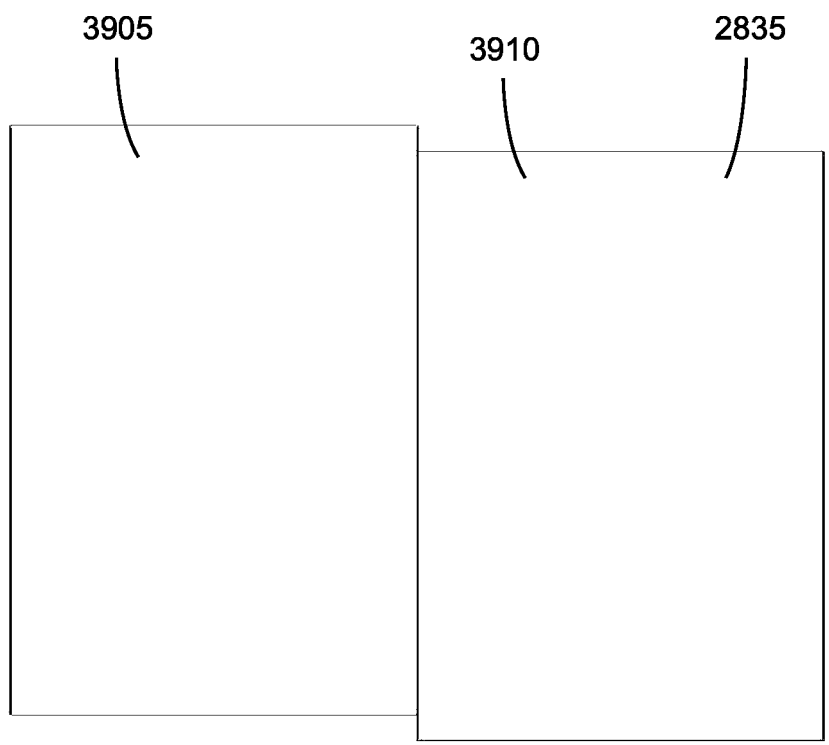
FIG. 40 is a side view of the crankshaft.

The mid-link 2840 forms a universal joint type connection between the first rotor 2815 and second rotor 2825. As illustrated in FIGS. 37 and 38, the mid-link 2840 has one or more mid-link guide slots 3705 defined on opposite sides. The mid-link guide slots 3705 are designed to receive the rotor guide tabs 3510 of the first rotor 2815 and second rotor 2825. The mid-link guide slots 3705 on opposite sides are arranged transverse (e.g., perpendicular) to one another so that the first rotor 2815 and second rotor 2825 are able to move or slide relative to one another with two (2) axes of freedom. In other variations, the mid-link 2840 holds the first rotor 2815 and second rotor 2825 in a fixed position relative to one another. Looking at FIGS. 39 and 40, the crankshaft 2835 has a first crank pin 3905 and second crank pin 3910 arranged in an offset or eccentric manner to coincide with the offset between the first rotor 2815 and second rotor 2825.

Figure 41:
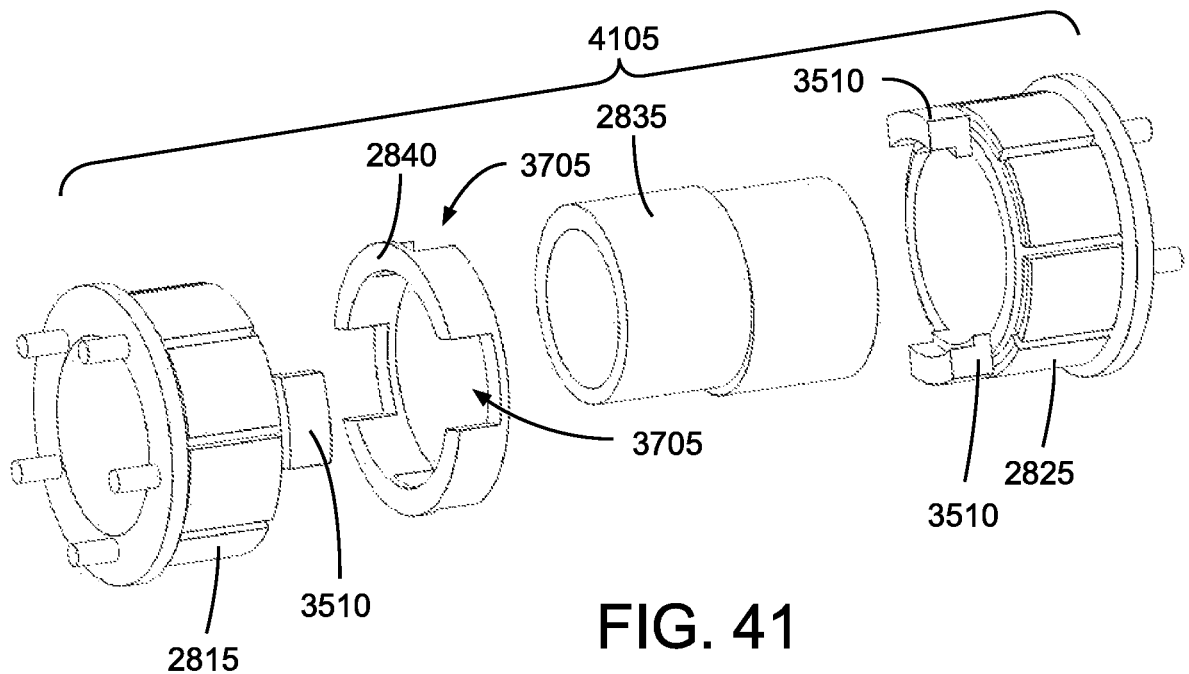
FIG. 41 is an exploded view of a rotor assembly of the FIG. 26 electric motor assembly.
Figure 42:
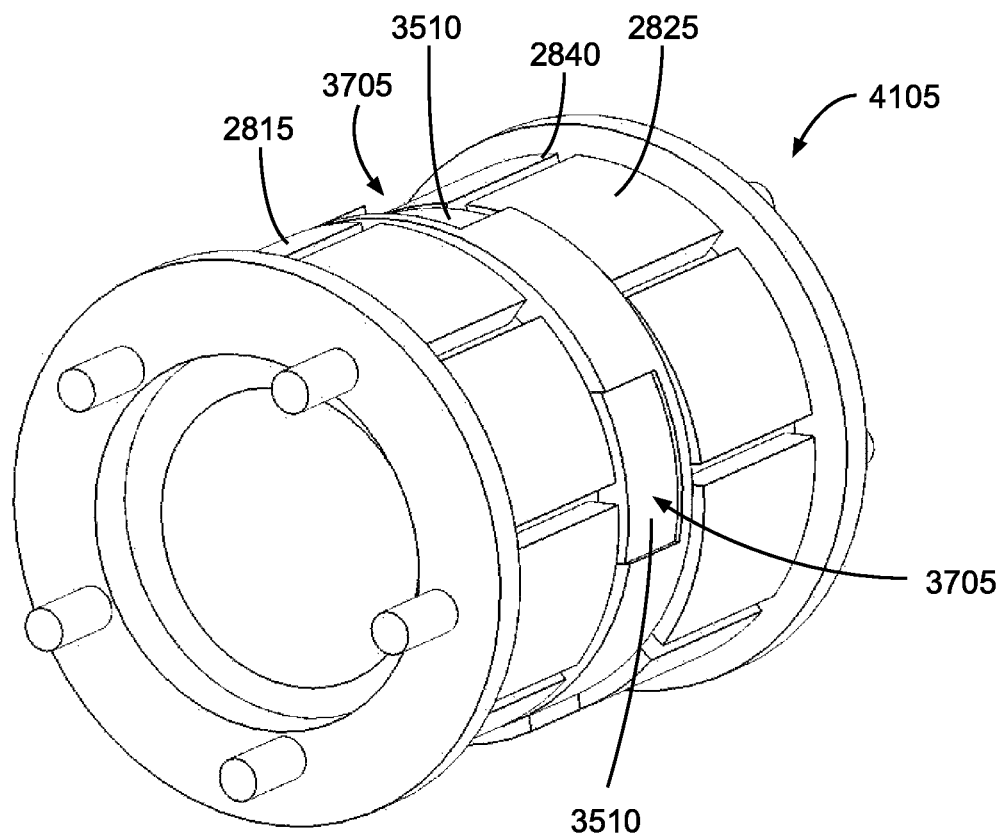
FIG. 42 is a perspective view of the rotor assembly.

As can be seen in FIGS. 41 and 42, the crankshaft 2835 is received inside the first rotor 2815 and second rotor 2825. The mid-link 2840 mechanically links the first rotor 2815 and second rotor 2825 together. As mentioned before, the mid-link guide slots 3705 on opposite sides of the mid-link 2840 are oriented transverse or perpendicular to one another to facilitate slight relative movement with two degrees of freedom. These components together form a rotor assembly 4105.

Figure 43:
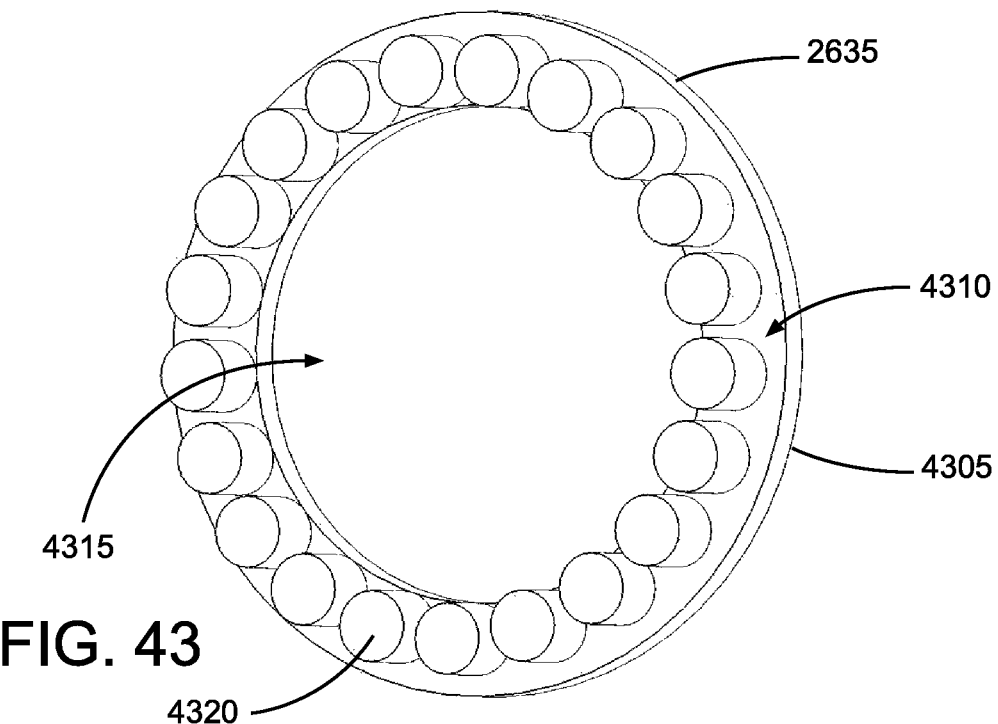
FIG. 43 is a front perspective view of a ring gear of the FIG. 26 electric motor assembly.
Figure 44:
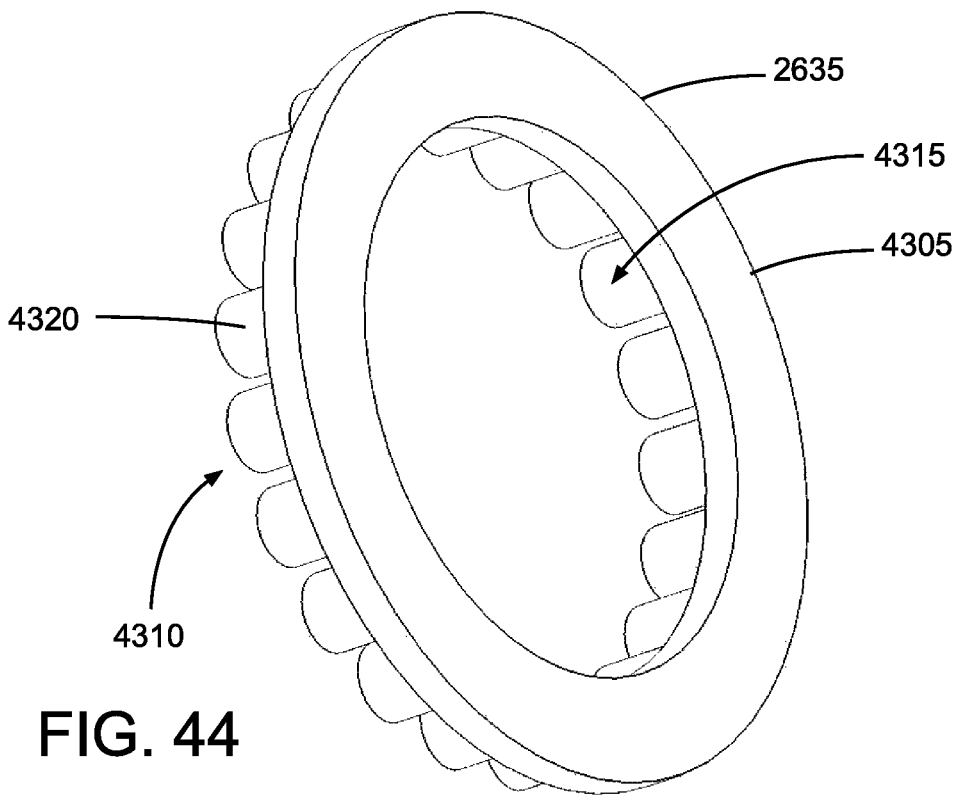
FIG. 44 is a rear perspective view of the ring gear.

Turning to FIGS. 43 and 44, the ring gear 2635 has a ring shape. The ring gear 2635 includes a ring body 4305 and one or more ring teeth 4310 extending from the ring body 4305. The ring gear 2635 further defines a ring gear opening 4315 in which the planet gear 2640 is received. In the illustrated example, the ring teeth 4310 are in the form of a series of pins 4320 extending longitudinally from the ring body 4305. In other examples, the ring teeth 4310 can have different shapes and/or configurations.

Figure 45:
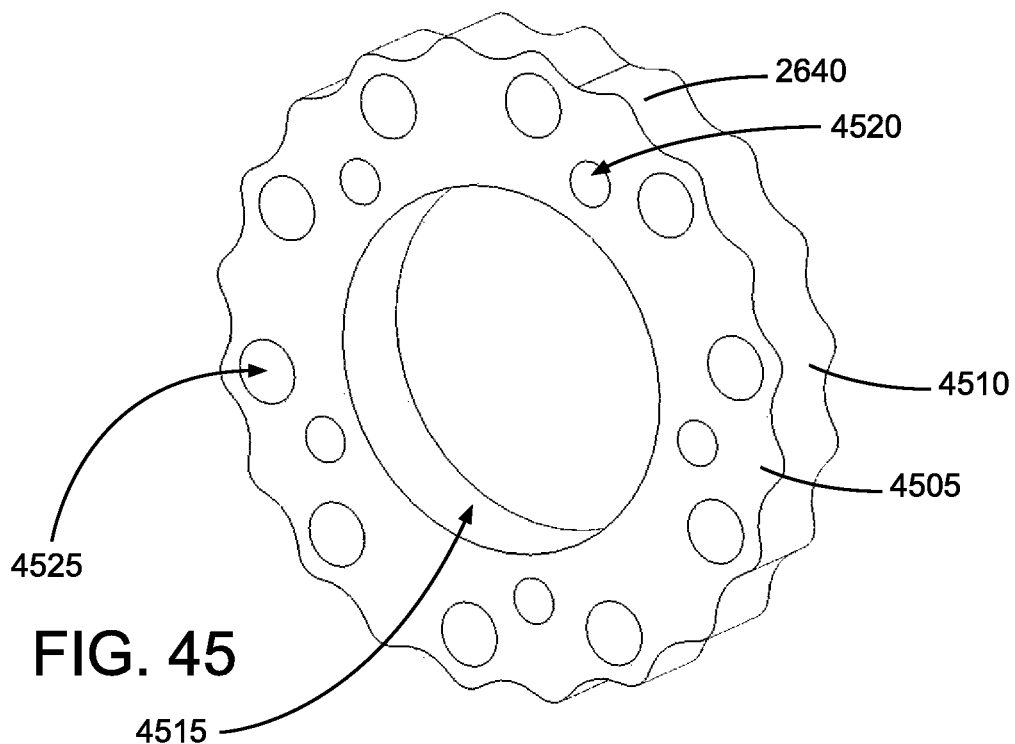
FIG. 45 is a front perspective view of a planet gear of the FIG. 26 electric motor assembly.
Figure 46:
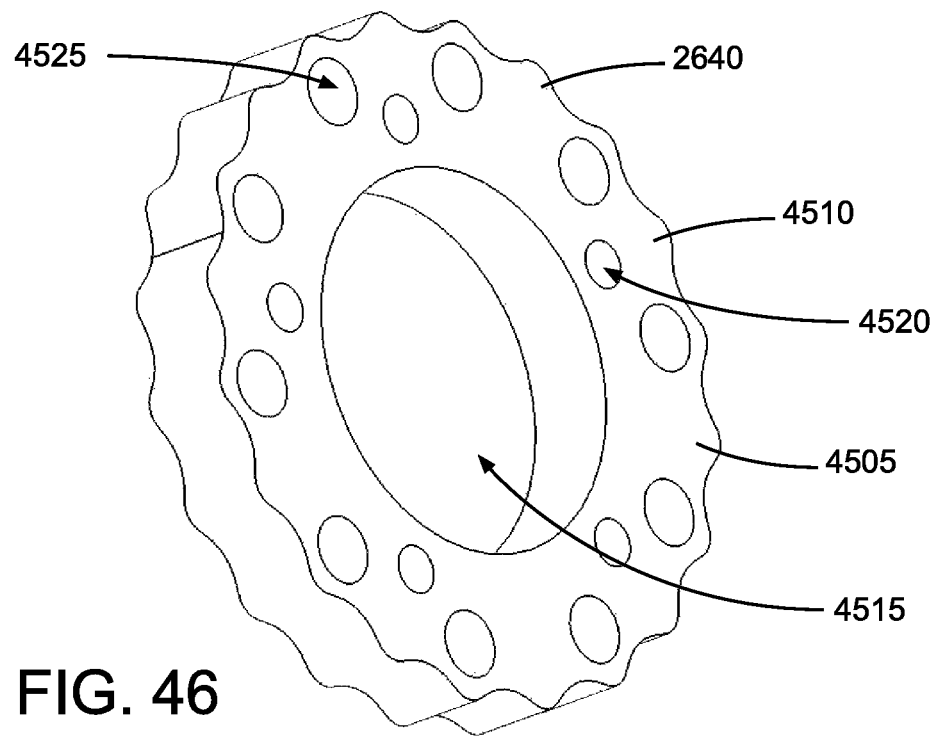
FIG. 46 is a rear perspective view of the planet gear.

The planet gear 2640 has a planet gear body 4505 and one or more planet teeth 4510 extending around the outer circumference of the planet gear body 4505, as is depicted in FIGS. 45 and 46. The planet teeth 4510 further define a planet gear opening 4515. In the illustrated example, the planet teeth 4510 are rounded to easily mesh with the round pins 4320 on the ring gear 2635 (FIG. 43). The planet gear body 4505 has one or more gear pin openings 4520 located at positions that coincide with the gear pins 3520 on the rotor 2805 (FIG. 35). The gear pins 3520 on the rotor 2805 are received in the gear pin openings 4520 in the planet gear 2640 to mechanically couple the rotor 2805 with the planet gear 2640 to transmit torque from the drive section 2605 to the indexing sections 2610. The planet gear body 4505 further defines one or more adapter pin openings 4525 where the output adapter 2645 is coupled to the planet gear 2640. As will be described in greater detail below, the adapter pin openings 4525 have enlarged diameters so as to provide give or play that allows output adapter 2645 to remove a significant amount of eccentric rotary motion from the drive section 2605.

Figure 47:
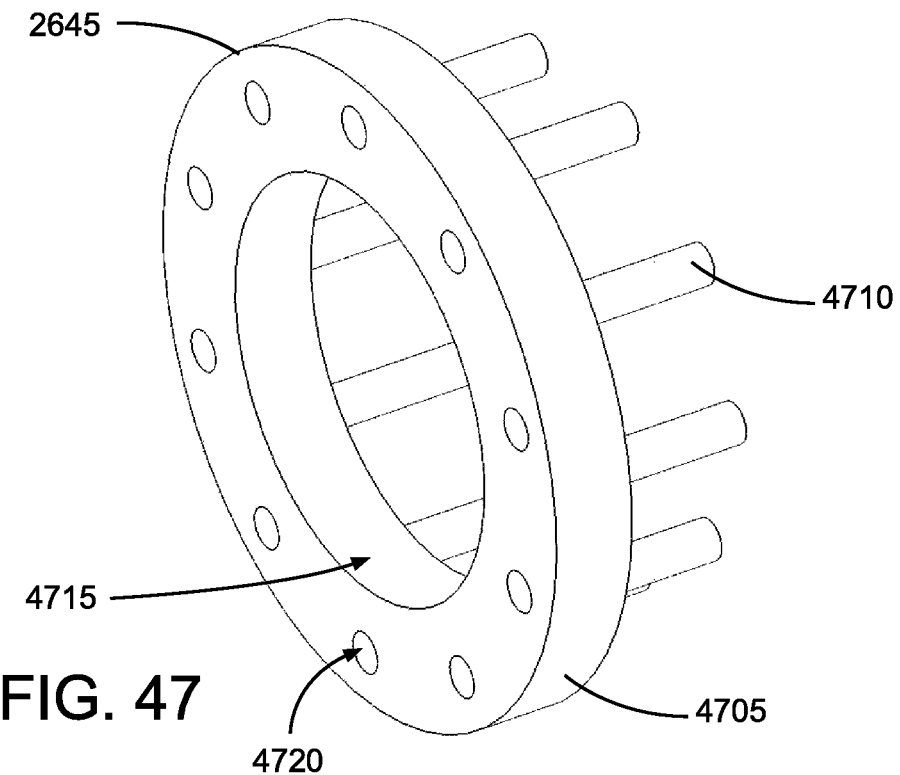
FIG. 47 is a front perspective view of an output adapter of the FIG. 26 electric motor assembly.
Figure 48:
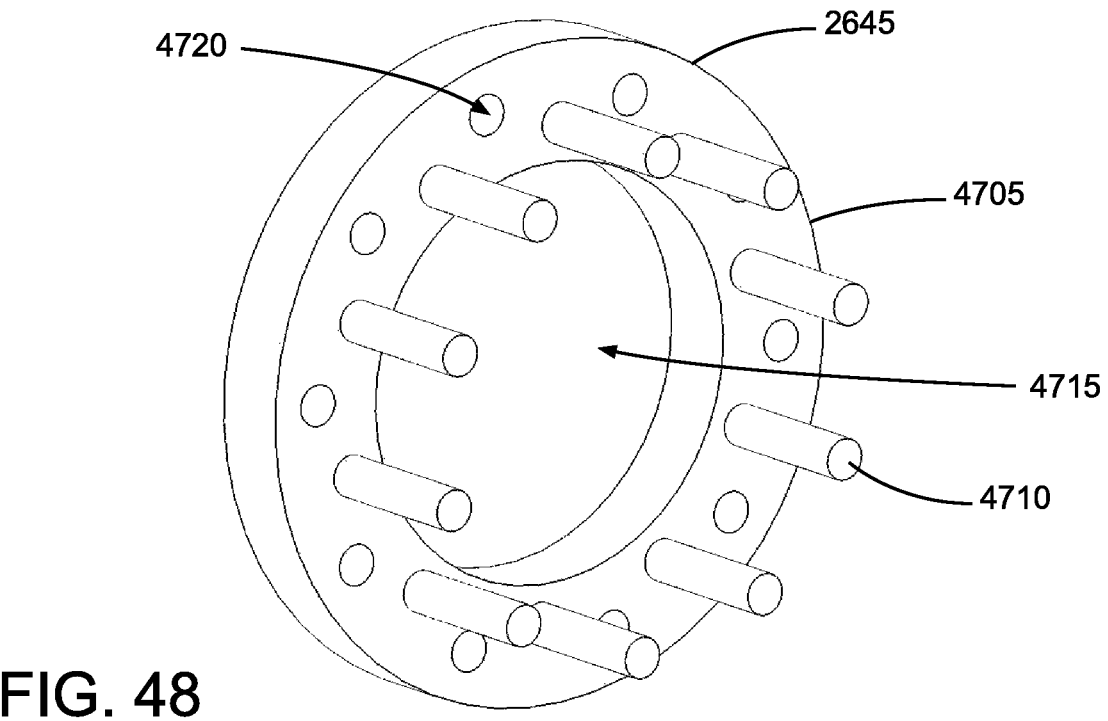
FIG. 48 is a rear perspective view of the output adapter.

Looking at FIGS. 47 and 48, the output adapter 2645 has an adapter body 4705 that is ring shaped. One or more adapter pins 4710 extend longitudinally from the side of the adapter body 4705 that faces the planet gear 2640. The adapter body 4705 further defines an adapter opening 4715. As alluded to before, the adapter pins 4710 of the output adapter 2645 are configured to be received in the adapter pin openings 4525 of the planet gear 2640. In the illustrated example, both the adapter pin openings 4525 and adapter pins 4710 have cylindrical shapes such that the adapter pins 4710 are able to move or orbit smoothly against the walls of the adapter pin openings 4525. The diameters of the adapter pins 4710 are significantly smaller (e.g., half the diameter) than the diameters of the adapter pin openings 4525 in the planet gear 2640 so that there is a significant amount of play so as to compensate for the eccentric movement or output from the drive section 2605. In one form, this gap formed between the adapter pins 4710 and the walls inside the adapter pin openings 4525 is generally the same as the displacement distance 3015 (FIG. 30) so as to substantially eliminate any eccentric movement. The adapter body 4705 further has one or more bolt openings 4720 where the mechanical load 120 or some intermediate device is secured to the electric motor assembly 2600. The mechanical load 120 can be directly or indirectly secured to the output adapter 2645 through fasteners, such as bolts, but in other examples, the mechanical load 120 can be coupled to the electric motor assembly 2600 in other manners, such as via welding, adhesives, etc.

Figure 49:
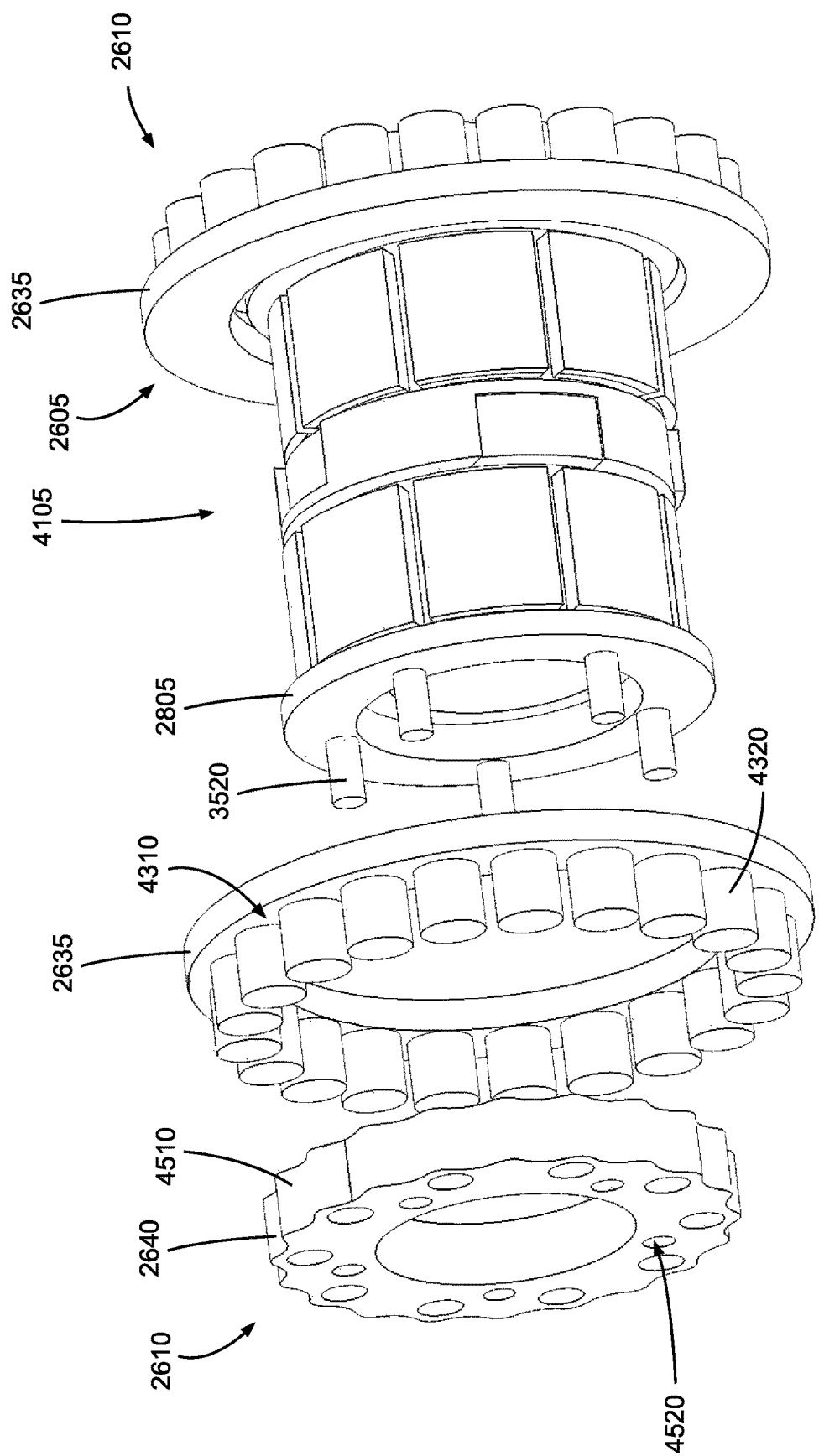
FIG. 49 is an exploded view of the output adapter and the ring gear being coupled to the rotor assembly.

Referring to FIG. 49, the planet gear 2640 is coupled to the rotor assembly 4105 by inserting the gear pins 3520 into the gear pin openings 4520 in the planet gear 2640. When the planet gear 2640 and rotor assembly 4105 are coupled together, the ring gear 2635 is generally sandwiched in between. During operation, the planet teeth 4510 of the planet gear 2640 engage the ring teeth 4310 of the ring gear 2635 at one side corresponding to the contact area 3037 of the connected rotor 2805 to promote proper indexed movement of the rotor assembly 4105. Again, the planet teeth 4510 of the planet gear 2640 are rounded so as to coincide with the rounded shape of the pins 4320 forming the ring teeth 4310 on the ring gear 2635. This rounded interface promotes smoother movement and reduces friction or wear inside the electric motor assembly 2600. As noted before, under such high torque loads, there is a risk that slippage can occur between the rotor 2805 and stator 2810. Any slippage can in turn result in damages to the electric motor assembly 2600 because of the resulting misalignment or mistiming in energizing of the electromagnets in the stator 2810. With the illustrated dual lobe construction, the electric motor assembly 2600 has indexing sections 2610 at both ends of the rotor assembly 4105 to further ensure proper indexing of the rotor assembly 4105. In other variations where misindexing is not a concern, the ring gear 2635 and planet gear 2640 can be eliminated.

Figure 50:
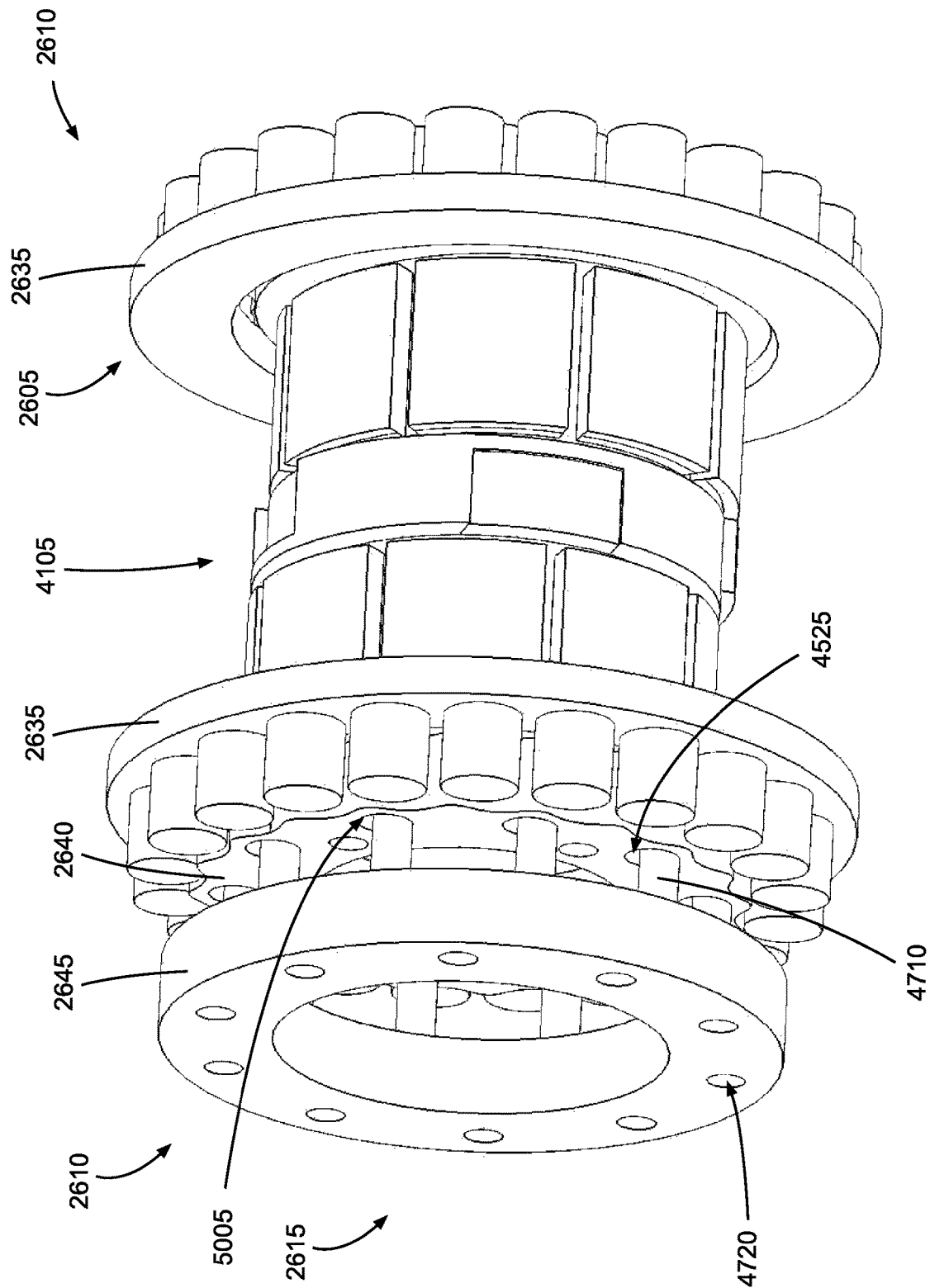
FIG. 50 is a perspective view of the output adapter coupled to the planet gear.

As shown in FIG. 50, the adapter pins 4710 of the output adapter 2645 are received in the adapter pin openings 4525 of the planet gear 2640. The diameters of the adapter pins 4710 are significantly smaller than the diameters of the adapter pin openings 4525 in the planet gear 2640 so that there is a significant amount of play so as to compensate for the eccentric movement or output from the drive section 2605. Consequently, a gap 5005 is formed between the adapter pins 4710 and the walls of the adapter pin openings 4525 in the planet gear 2640. This interface forms a universal type joint that reduces or eliminates the eccentric motion produced by the rotor assembly 4105. Once more, the mechanical load 120 or some intermediate device is secured to the electric motor assembly 2600 via the bolt openings 4720. The mechanical load 120 can be directly or indirectly secured to the output adapter 2645 such as through bolts. In other applications, such as where a reciprocating action is desired over a purely rotational action, the universal joint between the planet gear 2640 and output adapter 2645 can be eliminated such that the output from the electric motor assembly 2600 still has the eccentric motion component.

Figure 8:
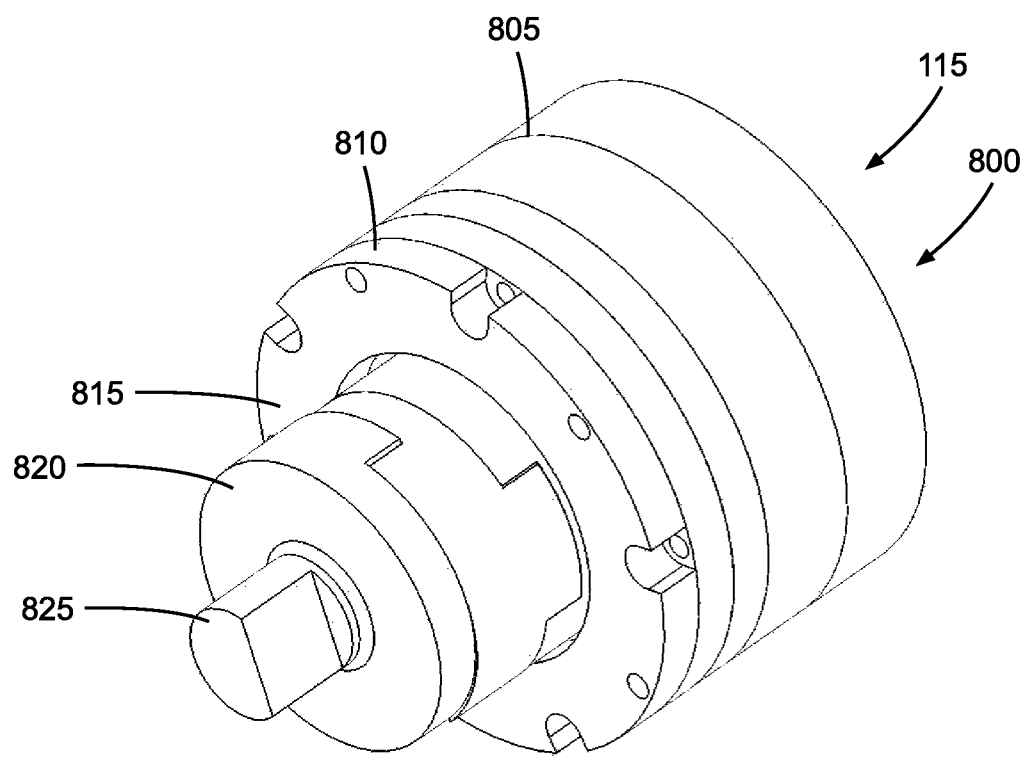
FIG. 8 is a perspective view of an electric motor assembly that can be used in the FIG. 1 electric motor system.

Referring to FIGS. 26, 28, 30, 31, 49 and 50, the rotor 2805 and stator 2810 in the first electric motor lobe 2620 and second electric motor lobe 2625 operate in a similar fashion as the ones described before with respect to the FIG. 2 electric motor 200, the FIG. 6 electric motor 600, and the FIG. 8 electric motor assembly 800. For the sake of brevity as well as clarity, please refer to the previous descriptions of the operation of the FIG. 2 electric motor 200, the FIG. 6 electric motor 600, and the FIG. 8 electric motor assembly 800. Generally speaking, the rotor 2805 rolls inside against the stator 2810 of the first electric motor lobe 2620 and second electric motor lobe 2625 in an eccentric manner. In one form, the rotor 2805 directly contacts the stator 2810 at the contact area 3037. In other examples, the rotor 2805 is slightly spaced away from the stator 2810 at the contact area 3037 by 1 mm or less (at most 0.040 inches) to reduce the risk of wear and/or electrical shorts. For example, this spacing can be in the form of an air gap and/or insulation material.

Once more, the rotor 2805 is oriented in an eccentric manner relative to the stator 2810 so that the rotor 2805 is able to maintain rolling contact or near rolling contact with the stator 2810 to produce high torques. This causes the rotor axis 3010 of the rotor 2805 to travel parallel to the central stator axis 3005 of the stator 2810 and traces a circular path around the central stator axis 3005 of the stator 2810. During operation, the controller 110 energizes various sets of the electromagnets 3110 to cause the rotor 2805 to roll around inside the stator 2810. The electromagnets 3110 produce a magnetic field that attracts the rotor 2805 to the stator 2810. This magnetic field acts axially to the coils 3105 of the electromagnets 3110. The controller 110 excites successive coils 3105 of the electromagnets 3110 to cause the rotor outer surface 3030 of the rotor 2805 to roll along the stator inner surface 3035 of the stator 2810. The mechanical output or torque of the drive section 2605 is then transferred to the planet gear 2640 via the gear pins 3520 of the rotor 2805. As should be recognized, the controller 110 can cause the drive section 2605 to rotate in a clockwise or counterclockwise direction. Moreover, the controller 110 can change the speed of rotation and/or the torque supplied by the drive section 2605 by varying the energization sequence and/or power of the coils 3105 in the stators 2810. As should be recognized, the planet gears 2640 move in an eccentric orbit like in the other motors. Once more, the indexing sections 2610 reduce the risk of detrimental rotational slippage between the rotor 2805 and the stator 2810 in both the first electric motor lobe 2620 and second electric motor lobe 2625. The loose coupling between the output adapter 2645 of the output section 2615 and the planet gear 2640 compensates for the eccentric motion of the first rotor 2815 and second rotor 2825 in the drive section 2605. Although FIG. 50 shows a single output adapter 2645 attached to one end of the drive section 2605, the electric motor assembly 2600 can have two output adapters 2645 attached at opposite ends of the drive section 2605.

Figure 51:
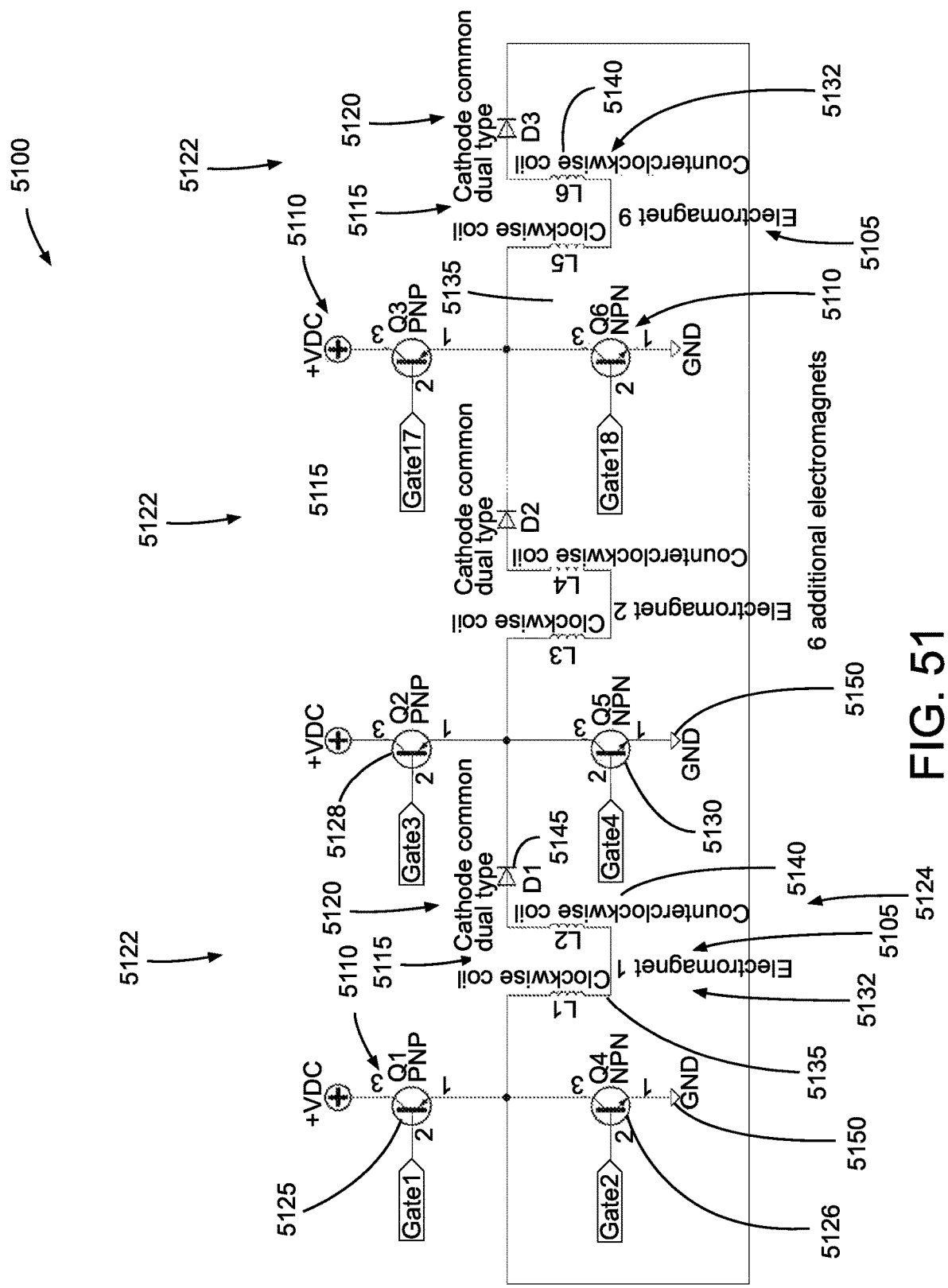
FIG. 51 is a circuit diagram of a motor drive circuit used in an electric motor system of the FIG. 1 electric motor system.

FIG. 51 is a circuit diagram of a motor drive circuit 5100 of one example for the controller 110. While the motor drive circuit 5100 in FIG. 51 will be described with reference to the FIG. 8 electric motor assembly 800, the FIG. 51 motor drive circuit 5100 in the mechanical load 120 can be adapted for use with the FIG. 2 electric motor 200, FIG. 6 electric motor 600, FIG. 26 electric motor assembly 2600, and other types of electric motor assemblies.

Looking at FIGS. 8 and 16, the windings of the coils 1618 for this example of the electric motor 805 are unique from traditional DC motors in that pairs of the coils 1618 are wound in adjacent positions along the stator 1310 to induce or create an electromagnetic force on the rotor 1305 that does not use permanent magnets. This differs from traditional motor windings, which position pole pairs on opposite sides of the stator. This arrangement halves the effective pole positions in the stator 1310 to allow use of the nonmagnetic rotor 1305.

As mentioned before, the electric motor assembly 800 as well as the other previously described motor assemblies are designed to generate higher mechanical torques as compared to traditional electric motor designs. The mechanical load 120 with the motor drive circuit 5100 shown in FIG. 51 uses a unique driving technique to drive the electric motor 805 of the electric motor assembly 800. This motor driving method differs from traditional DC drivers in that the pole pairs are excited in series between driven nodes rather than in parallel between driven nodes and ground. This divides the voltage between the coils 1618 while maintaining current, rather than the division of current and maintaining of voltage seen in traditional DC motor drivers. Maintaining current at the expense of speed facilitates low speed, high torque applications for the electric motor assembly 800.

As shown in FIG. 51, the motor drive circuit 5100 in the mechanical load 120 includes a series of electromagnets 5105, which in the FIG. 8 example correspond to the electromagnets 1612 shown in FIG. 16, along with one or more gates 5110, coils 5115, and diodes 5120. As can be seen, each electromagnet 5105 has an electromagnetic control subcircuit 5122 to control the energization of the electromagnet 5105. For example, the electromagnetic control subcircuits 5122 include a first electromagnetic control subcircuit 5124 for controlling a first electromagnet 5105. As depicted, the first electromagnetic control subcircuit 5124 includes a first gate 5125, second gate 5126, third gate 5128, and fourth gate 5130. In one form, the first gate 5125 and third gate 5128 each include PNP type Metal-Oxide Semiconductor Field-Effect Transistors (MOSFETs), and the second gate 5126 and fourth gate 5130 include NPN type MOSFETs. Each electromagnet 5105 has a pole pair 5132. In the illustrated example, the pole pairs 5132 include a clockwise coil 5135 where the coil 5115 is wound in a clockwise direction and a counterclockwise coil 5140 where the coil 5115 is wound in a counterclockwise direction. It should be recognized that the windings in the pole pairs 5132 can be reversed in other examples. Like the other electromagnetic control subcircuits 5122, the first electromagnetic control subcircuit 5124 has a first diode 5145 and a ground 5150. The other electromagnetic control subcircuits 5122 have a similar construction. In FIG. 51, the electromagnetic control subcircuits 5122 are shown for the first, second, and ninth electromagnets 5105, but in this example, the motor drive circuit 5100 has electromagnetic control subcircuits 5122 for six (6) additional electromagnetic control subcircuits 5122 constructed in a similar fashion. It should be recognized that the number of electromagnetic control subcircuits 5122 can vary in other examples depending on the number of electromagnets 5105 being controlled.

In each of the pole pairs 5132 for the electromagnets 5105, the clockwise coil 5135 and counterclockwise coil 5140 in the stator 1310 are wound in opposing directions with one wire such that when current is passed through the wire, one pole sees a clockwise current flow and the other sees a counterclockwise current flow. This creates opposite polarities in the two coils 5115. Current can be driven through any series set of pole pairs 5132 by activating one PNP MOSFET and one NPN MOSFET. For example, triggering first gate 5125 and fourth gate 5130 in FIG. 51 causes current to flow through the first gate 5125 transistor (Q1), through the clockwise coil 5135 (L1) and counterclockwise coil 5140 (L2), and reaching ground 5150 through fourth gate 5130 transistor (Q5). This causes the first electromagnet 5105 (Electromagnet 1), which is formed by the adjacent pole pair 5132 of the clockwise coil 5135 and counterclockwise coil 5140 to attract the rotor 1305. For the other electromagnets 5105, the current at the same time flows in the reverse direction through the other eight (8) pole pairs 5132. This would sap half of the current, so the motor drive circuit 5100 in this example includes the diodes 5120 arranged in series with the pole pairs 5132 to stop reverse flow of the current. In one form, at least one of the diodes 5120 is in series with every coil 5115 in the motor drive circuit 5100 to maintain flexibility. Due to high current, a cathode common dual type diode can be used in place of a single channel diode in some examples. The number of diodes 5120 in other examples can be reduced in accordance with Equation 1.

$$D = N/P \qquad \text{Equation 1}$$

where:
N=number of coils activated simultaneously;
P=number of poles; and
D=a whole number (of diodes).

In one form, the rotor body 1805 of the rotor 1305 is not a permanent magnet, but the rotor body 1805 is made of ferromagnetic, ferrimagnetic, and/or other magnetically attractive materials that are magnetically attracted to the energized first electromagnet 5105. With the rotor 1305 attracted to the first electromagnets 5105 in the stator 1310, the rotor 1305 contacts or comes in close proximity (e.g., within 1 mm or less) to the stator 1310 at the contact area 1537, as is depicted in FIG. 15. As explained before, the rotor 1305 is eccentrically oriented inside the stator 1310. Energizing the electromagnets 5105 (e.g., electromagnets 1612) in such a manner allows greater mechanical torque to be generated. The close proximity between the rotor 1305 and stator 1310 at the contact area 1537 allows very large magnetic forces to be utilized to produce torque without increasing the size of the coils 5115 (e.g., coils 1618) relative to traditional motors. To cause the rotor 1305 to move and produce mechanical torque, the electromagnetic control subcircuit 5122 of one of the adjacent or neighboring electromagnets 5105 is energized in the same fashion to attract the rotor 1305 towards the neighboring electromagnet 5105. The eccentric motion of the rotor 1305 and the torque produced is translated into pure rotary motion via the transmission assembly 810 (FIG. 8). Subsequent electromagnetic control subcircuits 5122 can be activated in a similar manner to cause the output shaft 825 of the electric motor assembly 800 to continue to rotate. The mechanical torque generated by the electric motor assembly 800 is directly or indirectly provided to the mechanical load 120 through the output shaft 825. The direction of the rotational mechanical output from the output shaft 825 can be changed by changing the sequence in which the electromagnets 5105 are energized. Moreover, as explained before, the indexing mechanism 815 in conjunction with the eccentric orientation of the rotor 1305 allows the output shaft 825 of the electric motor assembly 800 to be held at a fixed position or rotational orientation without slipping, even under high torque conditions.

Once more this motor drive circuit 5100 can be used in the controller 110 of FIG. 1 or other types of controllers. Moreover, in other examples, different or other types of circuits can be used to power and control the eccentric high torque electric motors described above. One or more features from these different motor examples can be incorporated into the other motor assemblies. The torque-speed characteristics of these motors in other variations can be altered electromagnetically, such as by changing the number of turns on their coils, and/or mechanically, such as by changing the difference in the diameters between their rotors and the stators. In other examples where permanent magnets are utilized on the rotor, the torque can be applied to the crankshaft or other structure to allow the device to generate electric power. This effect can also be used when the motor is slowing down to generate power using regenerative techniques (e.g., regenerative braking). These motors can also be operated such that the coils attract their rotor causing the rotor to roll along the stator and push the rotor tangentially along the stator in a method similar to traditional electric motors. In broad terms, this technique is generally a superposition of the rolling contact of this motor and the sliding contact of the rotor magnets tangent to the diameter of the stator found in traditional electric motors.

In other variations, the eccentric motor assemblies can include multiple rotors and stators (i.e., lobes). The lobes can be utilized and placed out of phase relative to each other so that the motors can operate at high speeds without excessive vibration due to unbalanced rotating mass. Moreover, the rotors and stators in the lobes do not necessarily have to maintain the same size and/or speed characteristics in other variations.

This eccentric high torque electric motor drive system can be used in a wide variety of applications that require lightweight motors with high torque outputs. For example, these applications include, but are not limited to, robotic systems including robotic arms, automated ground vehicles, material handling shuttles, and/or powered exoskeletons. Other use cases include motorized drive rollers like those found in material handling systems, forklifts, and electric vehicles.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Axis" generally refers to a straight line about which a body, object, and/or a geometric figure rotates or may be conceived to rotate.

"Bearing" refers generally to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Coil" generally refers to a length of something wound or arranged in a spiral, helical pattern, and/or sequence of rings. In one non-limiting example, the coil includes a number of turns of a conductive wire wound around a core to create a magnetic field for an electromagnet and/or an induction coil. The coil can for example form a helical pattern, and the coil can be generally wrapped or wound in a clockwise or counterclockwise direction.

"Conductor" or "Conductive Material" generally refers to a material and/or object that allows the free flow of an electrical charge in one or more directions such that relatively significant electric currents will flow through the material under the influence of an electric field under normal operating conditions. By way of non-limiting examples, conductors include materials having low resistivity, such as most metals (e.g., copper, gold, aluminum, etc.), graphite, and conductive polymers.

"Controller" generally refers to a device, using mechanical, hydraulic, pneumatic electronic techniques, and/or a microprocessor or computer, which monitors and physically alters the operating conditions of a given dynamical system. In one nonlimiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry, and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Core" generally refers to a piece of material located in a coil and/or transformer that intensifies (or otherwise changes) the magnetic field produced by the coil windings. The core for example can be made of ferromagnetic and/or ferrimagnetic materials. By way of a non-limiting example, the core forms the center of an electromagnet and/or an induction coil. In one example, the core can be shaped in the form of a cylindrical rod, but the core in other examples can have different shapes.

"Couple" or "coupled" refers generally to an indirect and/or direct connection between the identified elements, components, and/or objects. Often the manner of the coupling will be related specifically to the manner in which the two coupled elements interact.

"Crankshaft" generally refers to a mechanical part that is able to perform a conversion between reciprocating motion and rotational motion (and vice-versa). Typically, but not always, the crankshaft has one or more crank throws or crankpins whose axes are offset from the central rotational axis of the crankshaft.

"Eccentric" generally refers to having an axis located elsewhere than at the geometric center of an object or relative an axis of another object. As one non-limiting example, when oriented in an eccentric manner, the object has an axis of revolution displaced from the center of the object (or relative to another object) so that the object is capable of imparting reciprocating motion. In other words, something is considered eccentric when it is not placed centrally or does not have its axis or other part placed centrally.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operates in the reverse direction, accepting mechanical energy and converting the mechanical energy into electrical energy.

"Electromagnet" generally refers to a type of magnet in which the magnetic field is produced by an electric current. Usually, but not always, the electromagnet includes wire wound into a coil, and a current is applied to the wire coil to create a magnetic field that is concentrated in a hole at the center of the coil. The wire coil is typically, but not always, wound around a core for example made from a ferromagnetic and/or ferrimagnetic material such as iron. The magnetic core concentrates the magnetic flux and makes a more powerful magnet.

"Electromagnetic Radiation" generally refers to energy radiated by electromagnetic waves. Electromagnetic radiation is produced from other types of energy and is converted to other types when it is destroyed. Electromagnetic radiation carries this energy as it travels moving away from its source at the speed of light (in a vacuum). Electromagnetic radiation also carries both momentum and angular momentum. These properties may all be imparted to matter with which the electromagnetic radiation interacts as it moves outwardly away from its source. Electromagnetic radiation changes speed as it passes from one medium to another. When transitioning from one media to the next, the physical properties of the new medium can cause some or all of the radiated energy to be reflected while the remaining energy passes into the new medium. This occurs at every junction between media that electromagnetic radiation encounters as it travels. The photon is the quantum of the electromagnetic interaction and is the basic constituent of all forms of electromagnetic radiation. The quantum nature of light becomes more apparent at high frequencies as electromagnetic radiation behaves more like particles and less like waves as its frequency increases.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Ferrimagnetic" generally refers to a type of material or material property that has populations of atoms with opposing magnetic moments, as in antiferromagnetism, that are unequal such that a spontaneous magnetization remains. In ferrimagnetic material, the magnetic fields associated with individual atoms spontaneously align themselves, some parallel, or in the same direction (as in ferromagnetism), and others generally antiparallel, or paired off in opposite directions (as in antiferromagnetism). The magnetic behavior of single crystals of ferrimagnetic materials may be attributed to the parallel alignment. The diluting effect of those atoms in the antiparallel arrangement makes the overall magnetic strength of these types of materials generally less than that of purely ferromagnetic solids such as metallic iron. Ferrimagnetism occurs chiefly in magnetic oxides known as ferrites. In one non-limiting example, the natural magnetism exhibited by lodestones is of a ferrite, the mineral magnetite, a compound containing negative oxygen ions $O2-$ and positive iron ions in two states, iron (II) ions, $Fe2+$, and iron (III) ions, $Fe3+$. The oxygen ions are not magnetic, but both iron ions are. In magnetite crystals, chemically formulated as $Fe3O4$, for every four oxygen ions, there are two iron (III) ions and one iron (II) ion. The iron (III) ions are paired off in opposite directions, producing no external magnetic field, but the iron (II) ions are all aligned in the same direction, accounting for the external magnetism.

"Ferromagnetic" generally refers to a type of material or a property of the material having a high susceptibility to magnetization, the strength of which depends on that of the applied magnetizing field, and that may persist after removal of the applied field. Ferromagnetism is associated with parallel magnetic alignment of neighboring atoms. Ferromagnetic materials exhibit a long-range ordering phenomenon at the atomic level which causes the unpaired electron spins to line up parallel with each other in a region called a domain. Ferromagnetism occurs when an externally imposed magnetic field causes the magnetic domains to line up with each other and the material is magnetized. By way of non-limiting examples, ferromagnetic materials can include iron, nickel, cobalt and some of their alloys, and some compounds of rare earth metals.

"Indexing Mechanism" generally refers to a system of mechanical elements or parts arranged and connected to transmit motion in a predetermined fashion. For instance, the indexing mechanism is able to generally convert rotating or oscillatory motion to a series of step movements of the output link or shaft, or otherwise resist non-discrete motions. Some non-limiting examples of indexing mechanisms include ratchet and pawl mechanisms as well as rack and pinion mechanisms.

"Insulator" or "Insulative Material" generally refers to a material and/or object whose internal electric charges do not flow freely such that very little electric current will flow through the material under the influence of an electric field under normal operating conditions. By way of non-limiting examples, insulator materials include materials having high resistivity, such as glass, paper, ceramics, rubber, and plastics.

"Lateral" generally refers to being situated on, directed toward, or coming from the side.

"Longitudinal" generally relates to length or lengthwise dimension of an object, rather than across.

"Magnet" generally refers to a material or object that produces a magnetic field external to itself. Types of magnets include permanent magnets and electromagnets. By way of non-limiting examples, magnets in certain circumstances are able to attract (or repel) objects such as those made of iron or steel.

"Permanent Magnet" generally refers to a type of magnet in which an object is made from a material that is magnetized and creates its own persistent magnetic field. Typically, but not always, permanent magnets are made from ferromagnetic materials, such as ferrite, that are subjected to specialized processing in a strong magnetic field during manufacture to align their internal microcrystalline structure, making them very hard to demagnetize.

"Pole Pair" generally refers to at least two (2) windings in a stator wound in opposing directions (e.g., generally one clockwise and the other counterclockwise) with the same wire or series of wires. With this pole pair construction, when current passes through the wire one, pole has a clockwise current flow and the other has a counterclockwise current flow. These opposing current flows create opposite polarities in the two coils.

"Power Supply" generally refers to an electrical device that provides electrical power to an electrical load, such as electrical machines and/or electronics.

"Rotor" generally refers to a part or portion in a machine that rotates in or around a stationary part, which is commonly referred to as a stator. The rotor is the moving or rotating part of a rotary system, such as found in electric generators, electric motors, sirens, mud motors, turbines, and/or biological rotors. In one particular non-limiting example, the rotor includes the rotating portion of an electric generator and/or motor, especially of an induction motor.

"Stator" generally refers to a stationary part or portion in a machine in or about which a rotating part revolves, which is commonly referred to as a rotor. The stator is the stationary part of a rotary system, such as found in electric generators, electric motors, sirens, mud motors, turbines, and/or biological rotors. In one particular non-limiting example, the stator includes the stationary portion of an electric generator and/or motor, especially of an induction motor.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Symmetric" or "Symmetrical" generally refers to a property of something having two sides or halves that are the same relative to one another, such as in shape, size, and/or style. In other words, symmetric describes something as having a mirror-image quality.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Universal Joint" or "U-joint" generally refers to a coupling connecting two rotating bodies with different axes of rotation. The axes of rotation can be parallel but offset from one another or transverse (i.e., non-parallel) to one another. Some nonlimiting examples of universal joints include double Cardan shafts, double Cardan joints, and Thompson couplings.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | electric motor system |
| 105 | power supply |
| 110 | controller |
| 115 | electric motor assembly |
| 120 | mechanical load |
| 200 | electric motor |
| 205 | rotor |
| 210 | stator |
| 215 | bearings |
| 220 | crankshaft |
| 225 | central stator axis |
| 230 | rotor axis |
| 235 | displacement distance |
| 240 | arrow |
| 245 | rotor cavity |
| 250 | rotor outer surface |
| 255 | stator inner surface |
| 257 | contact area |
| 260 | gap |
| 305 | permanent magnets |
| 310 | rotor housing |
| 312 | rotor groove |
| 315 | electromagnets |
| 320 | stator housing |
| 325 | coils |
| 330 | cores |
| 335 | stator raceway |
| 340 | rotor contact surface |
| 345 | rotor guide flanges |
| 350 | shaft |

-continued

| Reference Numbers | |
|---|---|
| 355 | crank throw |
| 360 | crank pin |
| 505 | north magnets |
| 510 | south magnets |
| 515 | core ring |
| 520 | coil cavities |
| 600 | electric motor |
| 601 | first electric motor lobe |
| 602 | second electric motor lobe |
| 605 | first rotor |
| 610 | second rotor |
| 615 | stator assembly |
| 620 | crankshaft |
| 705 | first stator |
| 710 | second stator |
| 715 | shaft |
| 720 | first crank throw |
| 725 | first crank pin |
| 730 | second crank throw |
| 735 | second crank pin |
| 740 | first rotor axis |
| 745 | second rotor axis |
| 750 | first displacement distance |
| 755 | second displacement distance |
| 800 | electric motor assembly |
| 805 | electric motor |
| 810 | transmission assembly |
| 815 | indexing mechanism |
| 820 | universal joint |
| 825 | output shaft |
| 1005 | drive shaft |
| 1105 | planet-base adapter |
| 1305 | rotor |
| 1310 | stator |
| 1315 | stator housing |
| 1505 | central stator axis |
| 1510 | rotor axis |
| 1515 | displacement distance |
| 1520 | arrow |
| 1525 | rotor cavity |
| 1530 | rotor outer surface |
| 1535 | stator inner surface |
| 1537 | contact area |
| 1540 | gap |
| 1605 | first housing shell |
| 1610 | second housing shell |
| 1612 | electromagnets |
| 1615 | cores |
| 1618 | coils |
| 1620 | stator raceway |
| 1625 | beveled edges |
| 1630 | vent openings |
| 1805 | rotor body |
| 1810 | shaft cap |
| 1815 | end cap |
| 1820 | fastener |
| 1825 | adapter pin opening |
| 2005 | spacer |
| 2010 | ring gear |
| 2015 | planet gear |
| 2020 | cover |
| 2025 | base link |
| 2030 | mid-link |
| 2035 | output link |
| 2102 | planet gear cavity |
| 2105 | ring teeth |
| 2110 | planet teeth |
| 2112 | adapter body |
| 2113 | key tabs |
| 2115 | adapter opening |
| 2405 | base link guide slots |
| 2410 | mid-link guide tabs |
| 2415 | mid-link guide slots |
| 2420 | output link guide tabs |
| 2425 | notch |
| 2430 | key surface |
| 2505 | base adapter opening |

-continued

| Reference Numbers | |
|---|---|
| 2600 | electric motor assembly |
| 2605 | drive section |
| 2610 | indexing sections |
| 2615 | output section |
| 2620 | first electric motor lobe |
| 2625 | second electric motor lobe |
| 2630 | shield |
| 2635 | ring gear |
| 2640 | planet gear |
| 2645 | output adapter |
| 2805 | rotor |
| 2810 | stator |
| 2815 | first rotor |
| 2820 | first stator |
| 2825 | second rotor |
| 2830 | second stator |
| 2835 | crankshaft |
| 2840 | mid-link |
| 3005 | central stator axis |
| 3010 | rotor axis |
| 3015 | displacement distance |
| 3020 | arrow |
| 3025 | rotor cavity |
| 3030 | rotor outer surface |
| 3035 | stator inner surface |
| 3037 | contact area |
| 3040 | gap |
| 3105 | coils |
| 3110 | electromagnets |
| 3205 | core members |
| 3210 | coil cavities |
| 3215 | core ring |
| 3305 | spacer groove |
| 3310 | rim flange |
| 3505 | rotor body |
| 3510 | rotor guide tabs |
| 3515 | rotor flange |
| 3520 | gear pins |
| 3525 | permanent magnets |
| 3705 | mid-link guide slots |
| 3905 | first crank pin |
| 3910 | second crank pin |
| 4105 | rotor assembly |
| 4305 | ring body |
| 4310 | ring teeth |
| 4315 | ring gear opening |
| 4320 | pins |
| 4505 | planet gear body |
| 4510 | planet teeth |
| 4515 | planet gear opening |
| 4520 | gear pin openings |
| 4525 | adapter pin openings |
| 4705 | adapter body |
| 4710 | adapter pins |
| 4715 | adapter opening |
| 4720 | bolt openings |
| 5005 | gap |
| 5100 | motor drive circuit |
| 5105 | electromagnets |
| 5110 | gates |
| 5115 | coils |
| 5120 | diodes |
| 5122 | electromagnetic control subcircuits |
| 5124 | first electromagnetic control subcircuit |
| 5125 | first gate |
| 5126 | second gate |
| 5128 | third gate |
| 5130 | fourth gate |
| 5132 | pole pairs |
| 5135 | clockwise coil |
| 5140 | counterclockwise coil |
| 5145 | first diode |
| 5150 | ground |

What is claimed is:

1. An electric motor system, comprising:
a first lobe including a first rotor and a first stator; wherein the first rotor is configured to move in an eccentric manner relative to the first stator;
a second lobe including a second rotor and a second stator;
wherein the second rotor is configured to move in an eccentric manner relative to the second stator;
wherein the second rotor is eccentrically oriented in an opposite position to the first rotor;
a mid-link connecting the first rotor to the second rotor;
wherein the first rotor has a first rotor body;
wherein the first rotor has one or more rotor first guide tabs extending longitudinally from the first rotor body;
wherein the second rotor has a second rotor body;
wherein the second rotor has one or more second rotor guide tabs extending longitudinally from the second rotor body;
wherein the mid-link defines one or more first mid-link guide slots in which the first rotor guide tabs are slidingly received;
wherein the mid-link defines one or more second mid-link guide slots in which the second rotor guide tabs are slidingly received;
wherein the first mid-link guide slots and the second mid-link guide slots are located on opposite sides of the mid-link;
wherein the first mid-link guide slots and the second mid-link guide slots are arranged transverse to one another;
a shield disposed between the first lobe and the second lobe;
wherein the shield is configured to electromagnetically shield the first lobe from the second lobe; and
wherein the mid-link is disposed inside the shield.

2. The electric motor system of claim 1, wherein the first rotor is disposed inside the first stator and contacts the first stator at a contact area.

3. The electric motor system of claim 2, wherein the first rotor is spaced apart from the first stator by a gap opposite the contact area.

4. The electric motor system of claim 1, wherein the first rotor is spaced at most 1 mm from the first stator at a contact area.

5. The electric motor system of claim 4, wherein the first rotor is spaced apart from the first stator by a gap opposite the contact area that is greater than 1 mm.

6. The electric motor system of claim 1, wherein the first rotor has a central rotor axis that is offset from a central stator axis of the first stator.

7. The electric motor system of claim 1, further comprising a crankshaft to which the first rotor is coupled.

8. The electric motor system of claim 7, further comprising a bearing disposed between the first rotor and the crankshaft.

9. The electric motor system of claim 1, further comprising at least two crank pins on a crankshaft.

10. The electric motor system of claim 1, wherein the first rotor is a south rotor having permanent magnets with south poles facing radially outward.

11. The electric motor system of claim 10, wherein the second rotor is a north rotor having one or more permanent magnets with north poles facing radially outward.

12. The electric motor system of claim 1, further comprising an indexing mechanism.

13. The electric motor system of claim 12, wherein the indexing mechanism includes a ring gear and a planet gear eccentrically disposed in the ring gear.

14. The electric motor system of claim 13, wherein the ring gear includes a ring body and a series of pins extending from the ring body in a longitudinal direction.

15. The electric motor system of claim 1, further comprising a universal joint configured to output power from the first lobe and the second lobe.

16. The electric motor system of claim 15, wherein the universal joint includes a planet gear with an opening and an output adapter pin in the opening.

17. The electric motor system of claim 1, wherein the first stator includes a series of electromagnets circumferentially disposed around the first rotor.

18. The electric motor system of claim 17, wherein the electromagnets each include a pole pair with at least two coils wound in opposing directions.

19. The electric motor system of claim 18, wherein the first rotor includes a rotor body made of material configured to be magnetically attracted by the pole pair.

20. The electric motor system of claim 17, wherein the electromagnets include a first pole pair and a second pole pair.

21. The electric motor system of claim 20, further comprising:
a controller having a drive circuit; and
wherein the drive circuit is configured to provide opposite currents to the first pole pair and the second pole pair.

22. The electric motor system of claim 1, wherein:
the first rotor is a south rotor having permanent magnets with south poles facing radially outward; and
the second rotor is a north rotor having permanent magnets with north poles facing radially outward.

* * * * *